United States Patent
Chen et al.

(10) Patent No.: US 12,153,280 B2
(45) Date of Patent: Nov. 26, 2024

(54) OPTICAL MEMBER DRIVING MECHANISM

(71) Applicant: TDK TAIWAN CORP., Taoyuan (TW)

(72) Inventors: Yen-Cheng Chen, Taoyuan (TW);
Meng-Ting Lin, Taoyuan (TW);
Guan-Bo Wang, Taoyuan (TW);
Sheng-Chang Lin, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 280 days.

(21) Appl. No.: 16/945,020

(22) Filed: Jul. 31, 2020

(65) Prior Publication Data
US 2021/0033818 A1    Feb. 4, 2021

Related U.S. Application Data

(60) Provisional application No. 62/932,625, filed on Nov. 8, 2019, provisional application No. 62/887,905, filed on Aug. 16, 2019, provisional application No. 62/882,165, filed on Aug. 2, 2019.

(51) Int. Cl.
*G02B 7/09*    (2021.01)
(52) U.S. Cl.
CPC ..................... *G02B 7/09* (2013.01)
(58) Field of Classification Search
CPC .......... G02B 7/09; G02B 7/08; H04N 5/2251; H04N 23/50; H04N 23/55; H02K 41/0356; H02K 11/215; H02K 11/225; H02K 41/035; G03B 13/36
USPC ...................... 359/824, 557, 554
See application file for complete search history.

(56) References Cited

U.S. PATENT DOCUMENTS

| 7,898,754 | B2* | 3/2011 | Liao | H02K 41/0356 |
| | | | | 359/827 |
| 11,294,140 | B2* | 4/2022 | Wu | G02B 7/08 |
| 2006/0203627 | A1* | 9/2006 | Osaka | G03B 13/36 |
| | | | | 369/44.16 |
| 2009/0297136 | A1* | 12/2009 | Lin | G02B 7/021 |
| | | | | 396/268 |

(Continued)

FOREIGN PATENT DOCUMENTS

| CN | 206804972 U | * 12/2017 |
| CN | 108627947 A | * 10/2018 |
| WO | WO2019/221021 A1 | 11/2019 |

OTHER PUBLICATIONS

English translation of CN206804972, (year 2017).*
Examination Report Application No. 202024032936, Feb. 5, 2021.

*Primary Examiner* — Jie Lei
*Assistant Examiner* — Kuei-Jen L Edenfield
(74) *Attorney, Agent, or Firm* — Muncy, Geissler, Olds & Lowe, P.C.

(57) ABSTRACT

An optical member driving mechanism is provided. The optical member driving mechanism includes a fixed portion, a movable portion, a driving assembly and a circuit assembly. The fixed portion has a main axis and a polygonal structure surrounding the main axis. The movable portion is configured to connect an optical member, and is movable relative to the fixed portion. The driving assembly drives the movable portion to move relative to the fixed portion. The circuit assembly is electrically connected to the driving assembly.

18 Claims, 43 Drawing Sheets

(56) References Cited

U.S. PATENT DOCUMENTS

| | | | |
|---|---|---|---|
| 2011/0129211 A1* | 6/2011 | Mizutani | G03B 17/02 |
| | | | 396/439 |
| 2016/0103331 A1* | 4/2016 | Lee | G02B 27/646 |
| | | | 359/557 |
| 2016/0231641 A1* | 8/2016 | Minamisawa | G03B 5/06 |
| 2018/0329277 A1* | 11/2018 | Han | G03B 43/00 |
| 2019/0235267 A1 | 8/2019 | Minamisawa | |
| 2021/0364733 A1* | 11/2021 | Lee | G03B 17/12 |
| 2021/0382263 A1* | 12/2021 | Lee | H02K 41/0356 |

\* cited by examiner

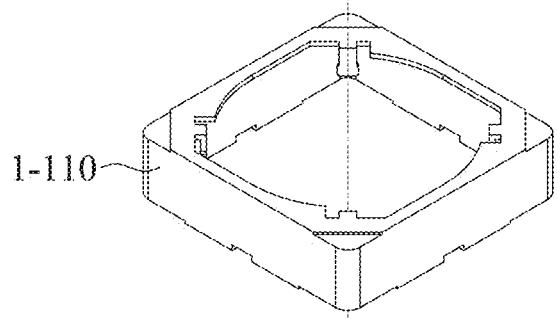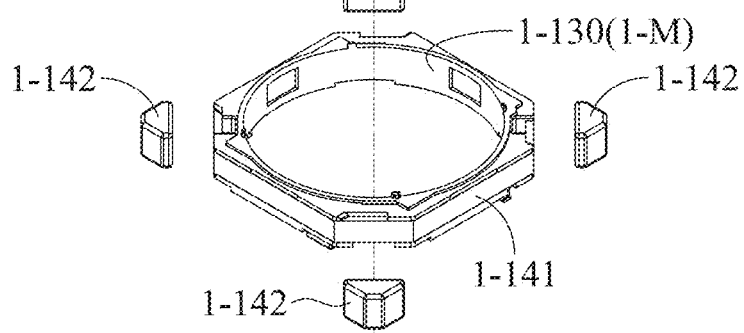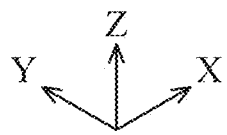
FIG. 2

OPTICAL MEMBER DRIVING MECHANISM

CROSS REFERENCE TO RELATED APPLICATIONS

This application claims the benefit of U.S. Provisional Application No. 62/882,165, filed Aug. 2, 2019, U.S. Provisional Application No. 62/887,905, filed Aug. 16, 2019, and U.S. Provisional Application No. 62/932,625, filed Nov. 8, 2019, the entirety of which are incorporated by reference herein.

BACKGROUND

Technical Field

The disclosure relates to an optical member driving mechanism, and in particular to an optical member driving mechanism including a circuit assembly that is embedded in the fixed portion.

Description of the Related Art

Technology has developed to the point that many electronic devices (such as smartphones and digital cameras) nowadays perform the functions of a camera or a video recorder. The use of such electronic devices has become increasingly widespread, and these electronic devices have been designed for convenience and miniaturization to provide users with more choices.

Electronic devices with a camera or video function usually have a lens driving module disposed therein to drive a lens to move along a main axis. Therefore, an autofocus (AF) function is achieved. Light may pass through the lens and form an image on a photosensitive member. However, the display size of the electronic devices has been increased to meet the requirements for users, such that the size of the lens driving module needs to be reduced. How to reduce the size of the lens driving module has become an important topic in order to meet market demand.

BRIEF SUMMARY

The present disclosure provides an optical member driving mechanism, which includes a fixed portion, a movable portion, a driving assembly, and a circuit assembly. The fixed portion has a main axis and a polygonal structure surrounding the main axis. The movable portion has a holder for holding an optical member, and is movable relative to the fixed portion. The driving assembly drives the movable portion to move relative to the fixed portion. The circuit assembly is electrically connected to the driving assembly.

In an embodiment, the circuit assembly is embedded in the housing. In an embodiment, the housing includes a top surface and a plurality of sidewalls, the top surface is perpendicular to the main axis, the sidewalls are not parallel to the top surface, and the circuit assembly is embedded in one of the sidewalls.

In an embodiment, the circuit assembly is disposed in at least one corner of the rectangular structure. In an embodiment, the optical member driving mechanism further includes an elastic element that is connected to the fixed portion and the movable portion, wherein when viewed along the main axis, the sidewalls of the housing and the elastic element overlap. In an embodiment, when viewed along the main axis, the elastic element is exposed from the base. In an embodiment, the housing further has a positioning column extending toward the base in the main axis, and the elastic element corresponds to the positioning column. In an embodiment, when viewed along the main axis, the base and the positioning column do not overlap.

In an embodiment, the movable portion includes a holder for holding the optical member, the holder has a wiring column extending toward the base in the main axis, the base has a recess, and when viewed along the main axis, the recess and the wiring column overlap. In an embodiment, the base has a stopper portion extending toward the housing in the main axis, and when viewed along the main axis, the stopper portion and the wiring column are located on the same side of the rectangular structure.

In an embodiment, a protruding portion is disposed on one side of the housing and protrudes toward the holder, the holder has a recessed portion, and the protruding portion is accommodated in the recessed portion. In an embodiment, when viewed along the main axis, the protruding portion protrudes inward from a sidewall of the housing.

In an embodiment, the driving assembly includes a magnetic element and a driving coil. Of the magnetic element and the driving coil, one is disposed on the fixed portion, and the other is disposed on the movable portion. In an embodiment, the optical member driving mechanism further includes a sensing assembly that detects the movement of the movable portion relative to the fixed portion, wherein the driving assembly is disposed at a corner of the rectangular structure, the sensing assembly is disposed at another corner of the rectangular structure, and the corner and the other corner are different corners of the rectangular structure.

In an embodiment, the circuit assembly further includes: a driving assembly connector and a sensing assembly connector. The driving assembly connector is embedded in the base and electrically connected to the driving assembly. The sensing assembly connector is embedded in the housing and electrically connected to the sensing assembly.

In an embodiment, when viewed along the main axis, the rectangular structure has an opening, a first side and a second side, the second side is opposite the first side, and the shortest distance between the opening and the first side is greater than the shortest distance between the opening and the second side. In an embodiment, an exposed portion of the circuit assembly is disposed on the first side of the rectangular structure.

In an embodiment, the optical member driving mechanism further includes an elastic element that is connected to the fixed portion and the movable portion, wherein a plurality of glue holes are formed in the elastic element, the glue holes are located on two sides of the rectangular structure, and when viewed along the main axis, the sides are perpendicular to the first side and the second side.

In an embodiment, the elastic element further includes a plurality of strings, and at least two of the strings extend to one of the glue holes. In an embodiment, when viewed along the main axis, the housing and the glue holes do not overlap.

The present disclosure provides an optical member driving mechanism, which includes a fixed portion, a movable portion, a driving assembly, a sensing assembly and a circuit assembly. The fixed portion has a main axis and a polygonal structure surrounding the main axis. The movable portion has a holder for holding an optical member, and is movable relative to the fixed portion. The driving assembly drives the movable portion to move relative to the fixed portion. The sensing assembly detects the movement of the movable portion relative to the fixed portion. The circuit assembly is electrically connected to the driving assembly and the sensing assembly.

In an embodiment, the circuit assembly further includes: a first driving assembly connector, a second driving assembly connector, a first sensing assembly connector, and a second sensing assembly connector. The first driving assembly connector and the second driving assembly connector are electrically connected to the driving assembly and partially exposed from the fixed portion. The first sensing assembly connector and the second sensing assembly connector are electrically connected to the sensing assembly and partially exposed from the fixed portion. When viewed along the main axis, the first driving assembly connector and the first sensing assembly connector are disposed on different sides of the polygonal structure.

In an embodiment, the first driving assembly connector is disposed between the first sensing assembly connector and the second sensing assembly connector. In an embodiment, the second sensing assembly connector is disposed between the first driving assembly connector and the second driving assembly connector. In an embodiment, when viewed along the main axis, the first sensing assembly connector and the second sensing assembly connector are disposed on different sides of the fixed portion.

In an embodiment, when viewed along a direction that is perpendicular to the main axis, the first driving assembly connector and the sensing assembly at least partially overlap. In an embodiment, when viewed along the main axis, the first driving assembly connector and the sensing assembly do not overlap. In an embodiment, when viewed along a direction that is perpendicular to the main axis, the first sensing assembly connector and the sensing assembly do not overlap. In an embodiment, when viewed along the main axis, the first sensing assembly connector and the sensing assembly at least partially overlap.

In an embodiment, the sensing assembly further includes a sensor that is disposed on the fixed portion, and the fixed portion further includes: a housing and a base. The housing has a top surface and extends in the main axis from an edge of the top surface. The base is fixedly connected to the housing and has: a base surface, a base opening, and a groove. The base surface faces the top surface. The base opening is formed in the base surface and corresponds to the optical member. The groove is recessed from the base surface. The sensor is disposed in the groove, and the shortest distance between the base surface and the movable portion is less than the shortest distance between the sensor and the movable portion. In an embodiment, the circuit assembly and the sensing assembly are disposed at the base.

In an embodiment, the first sensing assembly connector has a first elongated structure, the second sensing assembly connector has a second elongated structure, the first elongated structure and the second elongated structure extend in a direction that is not parallel to the main axis, and when viewed along the main axis, the first elongated structure and the second elongated structure extend in different directions.

In an embodiment, at most one of the first elongated structure and the second elongated structure is disposed on each side of the polygonal structure. In an embodiment, the first elongated structure and the second elongated structure include at least one of steel, nickel, copper, and aluminum.

In an embodiment, when viewed along the main axis, the first driving assembly connector, the first sensing assembly connector, and the second sensing assembly connector are disposed at the same corner of the fixed portion.

In an embodiment, the optical member driving mechanism further includes an elastic element, the movable portion is movably connected to the fixed portion via the elastic element, and when viewed along the main axis, the elastic element and the sensing assembly at least partially overlap.

In an embodiment, the optical member driving mechanism further includes an elastic element. The fixed portion further includes a housing, the housing has a top surface that is located over the movable portion. The holder has a plurality of contacts, the elastic element is connected to the holder via the contacts, and when viewed along the main axis, the top surface and the contacts do not overlap.

In an embodiment, the sensing assembly further includes a reference element, the reference element has a pair of magnetic poles, a connecting line connects the magnetic poles and is parallel to the main axis. In an embodiment, when viewed along a direction that is perpendicular to the main axis, the reference element is exposed from the holder. In an embodiment, when viewed along the main axis, the driving assembly and the sensing assembly are disposed at a corner of the fixed portion.

The present disclosure provides an optical member driving mechanism, which includes a fixed portion, a movable portion, a driving assembly, a sensing assembly and a damping material. The optical member driving mechanism has a main axis. The fixed portion has a polygonal structure surrounding the main axis. The movable portion includes a carrier for carrying an optical member, and is movable relative to the fixed portion. The driving assembly drives the movable portion to move relative to the fixed portion. The sensing assembly detects the movement of the movable portion relative to the fixed portion. The damping material is disposed between the fixed portion and the movable portion.

In an embodiment, the holder further has a groove disposed to accommodate the sensing assembly, and the damping material is disposed in the groove. In an embodiment, the sensing assembly is exposed from the side surface of the holder, and the side surface is substantially parallel to the main axis. In an embodiment, when viewed along the main axis, the damping material and the sensing assembly at least partially overlap.

In an embodiment, the fixed portion includes a base and a housing that is disposed on the base, and the damping material is disposed between the housing and the holder. In an embodiment, the damping material is disposed between the sensing assembly and the base. In an embodiment, when viewed along the main axis, the damping material, the housing, and the holder at least partially overlap.

In an embodiment, the holder and the housing each have a corresponding recess to accommodate the damping material. In an embodiment, the recesses are widened toward the base. In an embodiment, the size of the recess of the holder is different from the size of the recess of the housing.

In an embodiment, a protruding portion is disposed on one side of the housing and protrudes toward the holder, the holder has a recessed portion, and the protruding portion is accommodated in the recessed portion. In an embodiment, when viewed along the main axis, the damping material, the protruding portion, and the recessed portion do not overlap.

In an embodiment, the sensing assembly includes a reference element and a sensor. Of the reference element and the sensor, one is disposed on the fixed portion and the other is disposed on the movable portion. When viewed in the direction in which the movable portion moves, the reference element and the sensor at least partially overlap. In an embodiment, the reference element has two opposite magnetic poles. When viewed in the direction in which the movable portion moves, the magnetic poles and the sensor at least partially overlap. In an embodiment, the sensor detects the change of magnetic fields in at least two directions, and the directions are perpendicular to each other.

In an embodiment, the optical member driving mechanism further includes a plurality of driving assemblies disposed at four corners of the rectangular structure, and the sensing assembly is disposed between two of the driving assemblies.

In an embodiment, the optical member driving mechanism further includes an elastic element that is connected to the fixed portion and the movable portion, wherein the holder has a wiring column extending toward the base in the main axis, and when viewed along the main axis, the elastic element and the wiring column do not overlap. In an embodiment, when viewed along the main axis, the elastic element and the sensing assembly at least partially overlap. In an embodiment, when viewed along the main axis, the elastic element and the damping material at least partially overlap.

In an embodiment, the driving assembly includes a magnetic element and a driving coil. Of the magnetic element and the driving coil, one is disposed on the fixed portion, and the other is disposed on the movable portion.

According to some embodiments, an optical element drive mechanism is provided. The optical element drive mechanism includes an immovable part, a movable part, and a drive assembly. The immovable part includes a main axis. The immovable part includes a case and a bottom. The case is made of a non-metal material. The bottom is connected to the case. The case and the bottom are arranged along the main axis. The movable part is movable relative to the immovable part. The drive assembly drives the movable part to move relative to the immovable part.

According to some embodiments, the optical element drive mechanism further includes a sensing element sensing movement of the movable part relative to the immovable part. The optical element drive mechanism further includes a strengthening element disposed on the case, wherein part of the strengthening element is not revealed from the case. The strengthening element corresponds to the sensing element, and the strengthening element at least partially overlaps the sensing element when viewed from a direction that is perpendicular to the main axis. The optical element drive mechanism further includes a circuit assembly electrically connected to the sensing element, wherein the case includes a receiving structure receiving the circuit assembly, and the case at least partially overlaps the circuit assembly when viewed from the main axis. The receiving structure further includes a narrow portion corresponding to the circuit assembly. The case further includes an affixing structure affixing the drive assembly. The case includes a top wall and a sidewall, the top wall is perpendicular to the main axis, the sidewall extends in a direction that is parallel with the main axis from an edge of the top wall, and a gap is formed between the sidewall and the affixing structure.

According to some embodiments, the optical element drive mechanism further includes an elastic element, wherein the movable part is connected to the immovable part via the elastic element, and part of the elastic element is disposed in the gap. The optical element drive mechanism further includes an adhesion element disposed in the gap, wherein the adhesion element is in contact with the case, the drive assembly, and the elastic element. The case further includes a groove close to the bottom. The bottom includes a recess corresponding to the groove. Then, the adhesion element is disposed in the groove.

According to some embodiments, the case is polygonal, the case further includes a concavity, and the concavity is formed on a corner of the case when viewed from the main axis. There is more than one concavity, and the concavities are formed on different corners of the case when viewed from the main axis. The case includes a protrusion, the bottom further includes an opening corresponding to the protrusion, and the protrusion at least partially overlaps the opening when viewed from a direction that is perpendicular to the main axis. The optical element drive mechanism further includes an adhesion element disposed in the opening and the protrusion. The case includes a top wall and a sidewall, the top wall is perpendicular to the main axis, the sidewall extends in a direction that is parallel with the main axis from an edge of the top wall, and the protrusion is disposed on the sidewall, wherein the sidewall, the opening, and the protrusion are connected to each other by the adhesion element. The case further includes an inwardly sunken portion, and the adhesion element is disposed in the inwardly sunken portion. The protrusion further includes an inclined surface receiving the adhesion element.

According to some embodiments, an optical element drive mechanism is provided. The optical element drive mechanism includes an immovable part, a movable part, and a drive assembly. The immovable part includes a main axis. The immovable part includes a case and a bottom. The bottom is connected to the case. The case and the bottom are arranged along the main axis. The movable part is movable relative to the immovable part. The drive assembly drives the movable part to move relative to the immovable part. The bottom includes a first stop assembly restricting the range of movement of the movable part relative to the immovable part.

According to some embodiments, the optical element drive mechanism as claimed in claim 1, wherein the first stop assembly restricts the range of movement of the movable part relative to the immovable part in a direction that is not parallel with the main axis. The bottom further includes a second stop assembly restricting the range of movement of the movable part relative to the immovable part in a direction that is parallel with the main axis. The bottom further includes a third stop assembly restricting the range of movement of the movable part relative to the immovable part, wherein the first stop assembly and the third stop assembly are located on same side of the bottom and the first stop assembly and the third stop assembly are spaced apart by a distance.

According to some embodiments, the movable part includes an electrical connection portion and a lower stop portion, the electrical connection portion is electrically connected to the drive assembly, and the lower stop portion corresponds to the second stop assembly. The lower stop portion and the electrical connection portion are disposed on same side of the movable part when viewed from a direction that is perpendicular to the main axis, and the lower stop portion partially overlaps the electrical connection portion when viewed from a direction that is perpendicular to the main axis. A minimum distance between the electrical connection portion and a bottom surface of the bottom is less than a minimum distance between the lower stop portion and the bottom surface of the bottom. A minimum distance between the electrical connection portion and the bottom is greater than a minimum distance between the lower stop portion and the bottom.

According to some embodiments, the case includes a top wall and a sidewall, the top wall is perpendicular to the main axis, the sidewall extends in a direction that is parallel with the main axis from an edge of the top wall, and the first stop assembly includes a projecting portion extending toward the top wall of the case. The projecting portion is adjacent to the sidewall of the case. The sidewall at least partially overlaps the projecting portion when viewed from a direction that is perpendicular to the main axis. The optical element drive mechanism further includes a circuit assembly disposed between the side wall and the projecting portion. The optical element drive mechanism further includes an adhesion element disposed between the projecting portion and the circuit assembly or between the projecting portion and the case. The bottom further includes a support structure in contact with the circuit assembly, and the support structure at least partially overlaps the circuit assembly from a direction that is perpendicular to the main axis. The projecting portion and the support structure are disposed on same side of the bottom when viewed from the main axis. The projecting portion at least partially overlaps the support structure when viewed from the main axis.

According to some embodiments, the optical element drive mechanism further includes a reference element disposed on the movable part, wherein the movable part includes an upper stop portion, and the upper stop portion at least partially overlaps the reference element when viewed from the main axis. The movable part further includes a guidance structure and part of the drive assembly is located in the guidance structure. The guidance structure is adjacent to the drive assembly. The drive assembly does not overlap the guidance structure when viewed from a direction that is perpendicular to the main axis.

BRIEF DESCRIPTION OF THE DRAWINGS

The disclosure can be more fully understood by reading the subsequent detailed description and examples with references made to the accompanying drawings, wherein:

FIG. 2 is an exploded view illustrating the optical member driving mechanism shown in FIG. 1.

DETAILED DESCRIPTION OF THE INVENTION

The optical member driving mechanisms of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

In addition, relative terms such as "lower" or "bottom," "upper" or "top" may be used in the following embodiments in order to describe the relationship between one element and another element in the figures. It should be appreciated that if the device shown in the figures is flipped upside-down, the element located on the "lower" side may become the element located on the "upper" side.

It should be understood that although the terms "first," "second," etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure. In addition, for the sake of simplicity, the terms "first," "second," etc. for distinguishing different elements may be omitted herein. Without departing from the scope of the appended claims, the first element and/or the second element may be referred to as any element that conforms to the description in the present specification.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "approximately" or "about" may also be recited in the present disclosure, and these terms are intended to encompass situations or ranges that is substantially or exactly the same as the description herein. It should be noted that unless defined specifically, even if the above terms are not recited in the description, it should be read as the same meaning as those approximate terms are recited.

Figure 1:
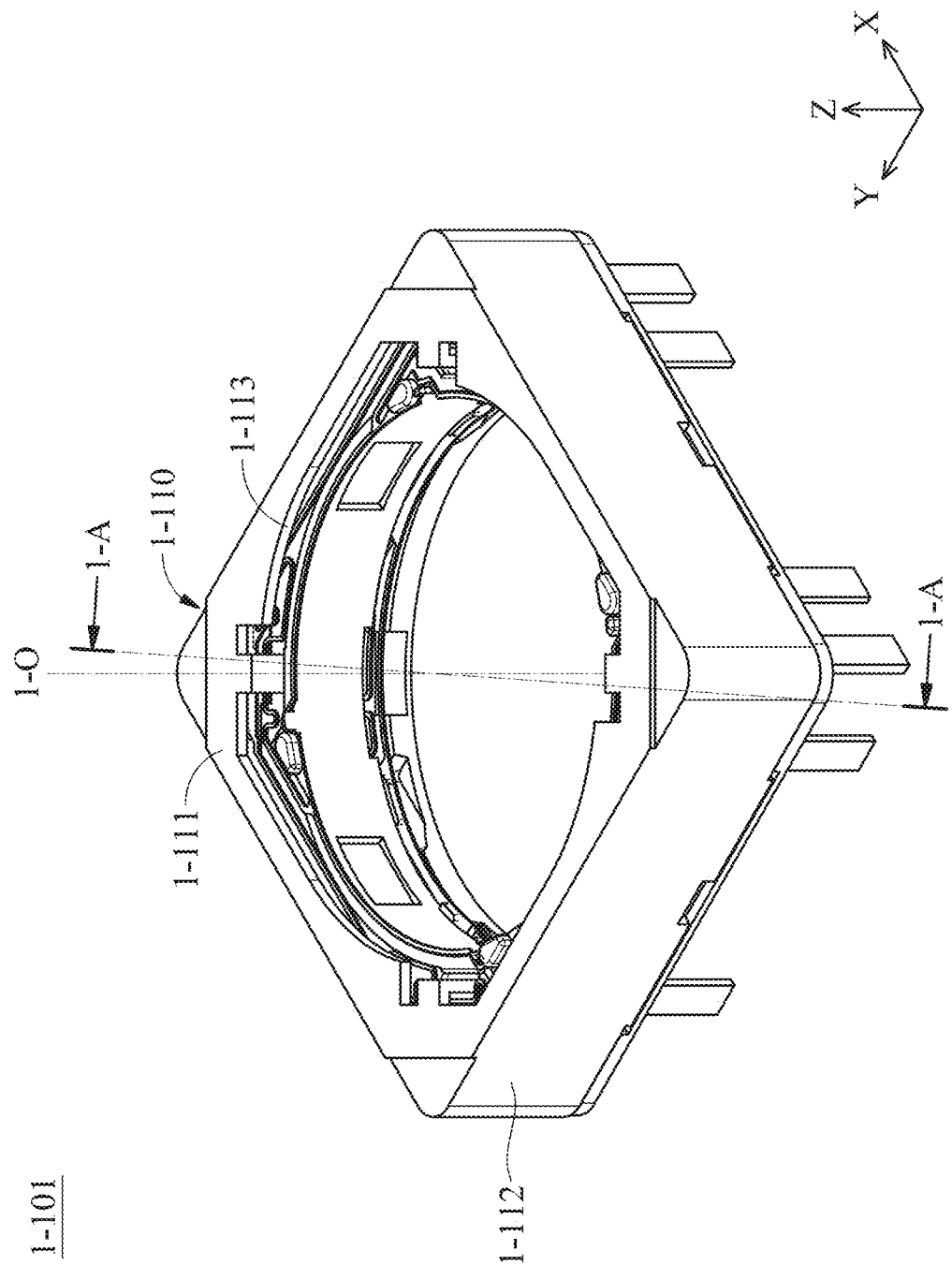
FIG. 1 is a perspective view illustrating an optical member driving mechanism in accordance with an embodiment of the present disclosure.

FIG. 1 is a perspective view illustrating an optical member driving mechanism 1-101 in accordance with an embodiment of the present disclosure. It should be noted that, in this embodiment, the optical member driving mechanism 1-101 may be, for example, a voice coil motor (VCM), which may be disposed in the electronic devices with camera function for driving an optical member (such as a lens), and can perform an autofocus (AF) function. In addition, in the present embodiment, the optical member driving mechanism 1-101 has a substantial rectangular structure, wherein a housing 1-110 of the optical member driving mechanism 1-101 has includes a top surface 1-111 and four sidewalls 1-112. An opening 1-113 is formed on the top surface 1-111 and corresponds to the optical member (not shown). That is, light may pass through the opening 1-113 via a main axis 1-O, such that the light may enter into the optical member driving mechanism 1-101. It should be noted that in other embodiments, the optical member driving mechanism 1-101 may have a polygonal structure surrounding the main axis 1-O.

FIG. 2 is an exploded view illustrating the optical member driving mechanism 1-101 shown in FIG. 1. As shown in FIG. 2, the optical member driving mechanism 1-101 includes a housing 1-110, a base 1-120, a holder 1-130, a driving assembly 1-140, a first elastic element 1-150, a second elastic element 1-160, and a circuit assembly 1-170. A fixed portion 1-F may include the housing 1-110 and the base 1-120, and the movable portion 1-M may include the holder 1-130 and an optical member held thereon.

The housing 1-110 and the base 1-120 may be connected and assembled as a hollow case. Therefore, the holder 1-130, the driving assembly 1-140, the first elastic element 1-150 and the second elastic element 1-160 may be surrounded by the housing 1-110, and thus may be contained in the case. Accordingly, the housing 1-110, the holder 1-130, and the base 1-120 are sequentially arranged along the main axis 1-O. In other words, the light may sequentially pass through the housing 1-110, the holder 1-130 and the base 1-120, and reach an image sensor (not shown) that is disposed out of the optical member driving mechanism 1-101 such that an image is generated.

The holder 1-130 has a hollow structure, and carries an optical member with an optical axis (which is parallel to the main axis 1-O). In addition, the holder 1-130 is movably connected to the housing 1-110 and the base 1-120. The first elastic element 1-150 is disposed between the housing 1-110 and the holder 1-130, and the second elastic element 1-160 is disposed between the holder 1-130 and the base 1-120. To be more specific, the holder 1-130 may be connected to the housing 1-110 and the base 1-120 through the first elastic element 1-150 and the second elastic element 1-160, which are made of metallic materials. Therefore, the holder 1-130 is movably suspended between the housing 1-110 and the base 1-120, and the holder 1-130 may move along the main axis 1-O between the housing 1-110 and the base 1-120.

The driving assembly 1-140 includes a driving coil 1-141 and magnetic elements 1-142. The driving coil 1-141 may be disposed around the holder 1-130, and the magnetic elements 1-142 may be disposed between the housing 1-110 and the holder 1-130. In some embodiments, the magnetic elements 1-142 are affixed to the housing 1-110. When a current is applied to the driving coil 1-141, an electromagnetic driving force may be generated by the driving coil 1-141 and the magnetic elements 1-142 to drive the holder 1-130 and the optical member carried therein to move along the Z-axis (i.e. the main axis 1-O) relative to the base 1-120. Therefore, the autofocus (AF) function is performed. In other embodiment, the positions of the driving coil 1-141 and the magnetic elements 1-142 are interchangeable. In other words, the driving coil 1-141 may be disposed between the housing 1-110 and the holder 1-130, and the magnetic elements 1-142 may be disposed on the holder 1-130. That way, the autofocus (AF) function may also be achieved.

The circuit assembly 1-170 is embedded in the base 1-120, and may extend outward (for example, in a direction that is parallel to the main axis 1-O) from the base 1-120. In addition, a sensor 1-181 is disposed on the circuit assembly 1-170, and the sensor 1-181 and a reference member 1-182 (shown in FIG. 3) that is disposed on the holder 1-130 constitute a sensing assembly 1-180. For example, the sensor 1-181 may be a Hall effect sensor, a magnetoresistance (MR) sensor (such as a tunnel magnetoresistance (TMR) sensor) or any other suitable sensor.

Figure 3:
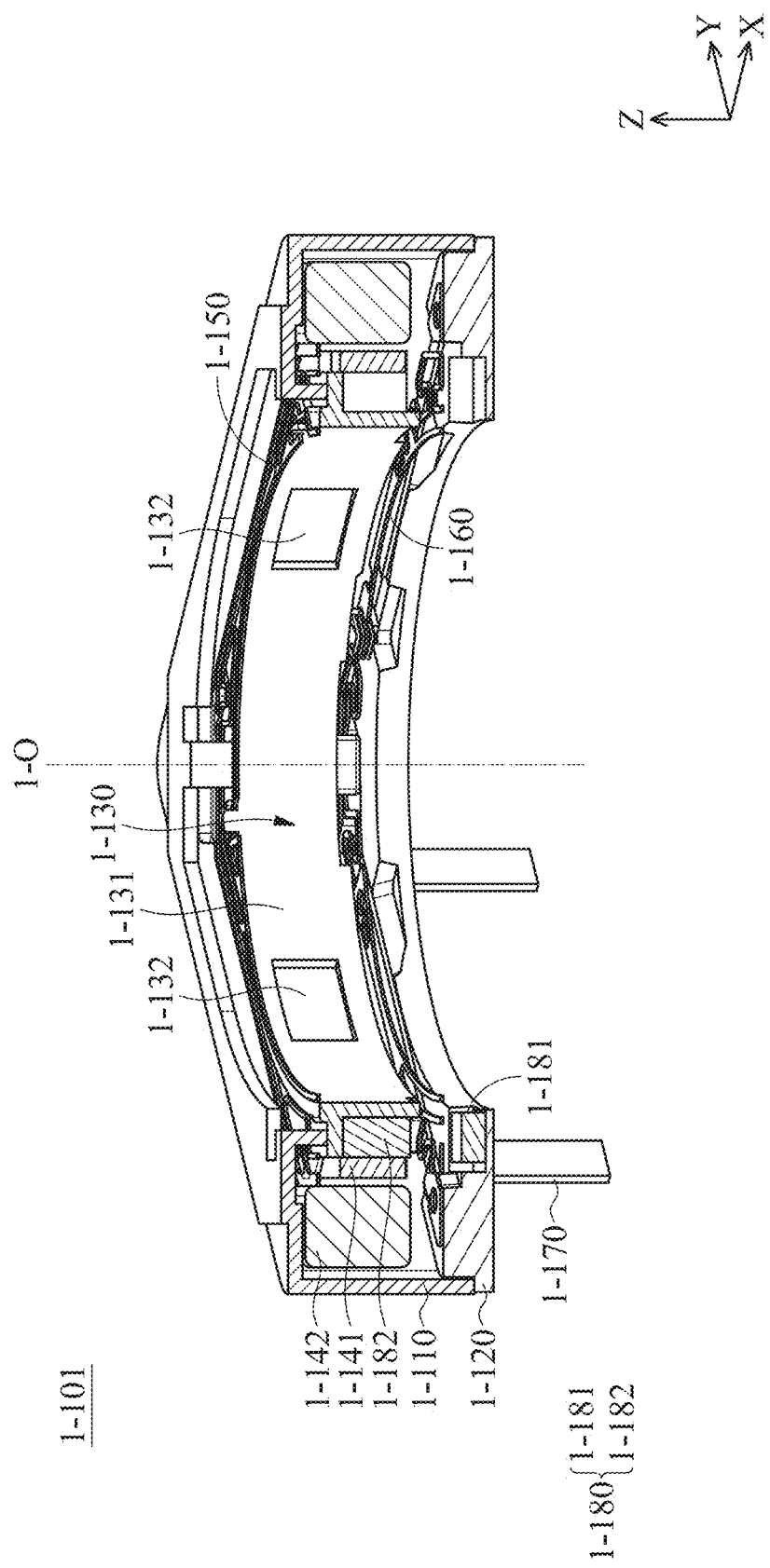
FIG. 3 is a cross-sectional view along line 1-A-1-A shown in FIG. 1.

FIG. 3 is a cross-sectional view along line 1-A-1-A shown in FIG. 1. As shown in FIG. 3, when viewed along the main axis 1-O, the magnetic elements 1-142 of the driving assembly 1-140 and the sensor 1-181 are disposed at a corner of the fixed portion 1-F. In some embodiments, the sensor 1-181 and the reference element 1-182 are arranged in the main axis 1-0, so that the sensor 1-181 may detect the position of the reference element 1-182, determining the position of the holder 1-130 and the optical member. In the present embodiment, the circuit assembly 1-170 may be electrically connected to the driving assembly 1-140 and the sensing assembly 1-180, and be configured to transmit electric signals.

In addition, the holder 1-130 includes a sidewall 1-131 that is configured to surround the optical member. A plurality of openings 1-132 are disposed on the sidewall 1-131, and the openings 1-132 may expose the driving coil 1-141 surrounding the holder 1-130. For example, the openings 1-132 are located on each side of the optical member driving mechanism 1-101, respectively. In some embodiments, the openings 1-132 located on opposite sides of the optical member driving mechanism 1-101 at least partially overlap, but the present disclosure is not limited thereto. The arrangement of the openings 1-132 may effectively reduce the size of the holder 1-130 on the X-Y plane, and the miniaturization of the optical member driving mechanism 1-101 may be achieved.

Figure 4:
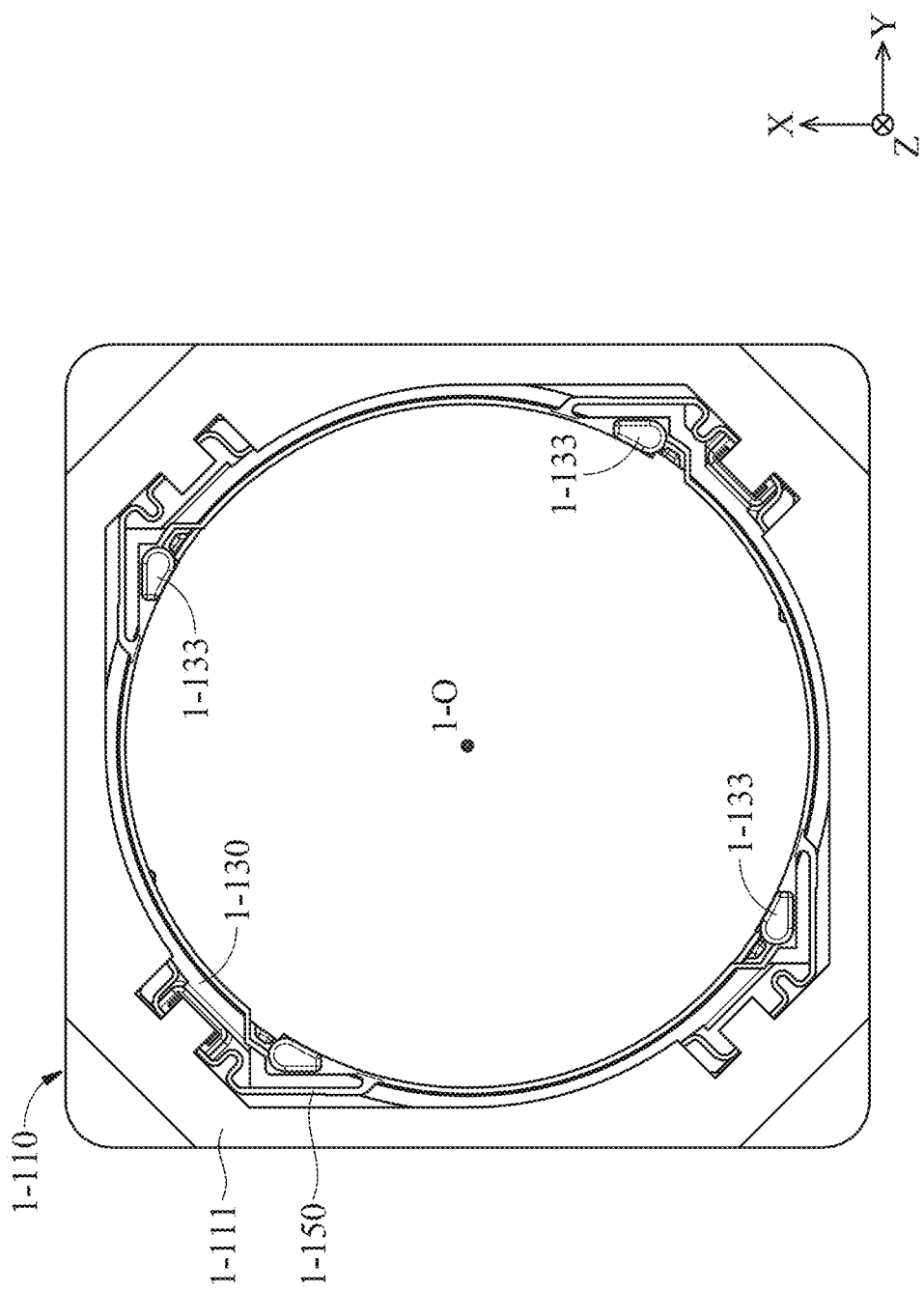
FIG. 4 is a top view illustrating the optical member driving mechanism shown in FIG. 1.

FIG. 4 is a top view illustrating the optical member driving mechanism 1-101 shown in FIG. 1. As shown in FIG. 4, the holder 1-130 has a plurality of contacts 1-133, and the first elastic element 1-150 is connected to the holder 1-130 via the contacts 1-133. In the present embodiment, when viewed along the main axis 1-O, the top surface 1-111 of the housing 1-110 and the contacts 1-133 do not overlap. Due to the above design, an adhesive may be disposed at the contacts 1-133 to bond the first elastic element 1-150 and the holder 1-130 without interfered by the housing 1-110.

Figure 5:
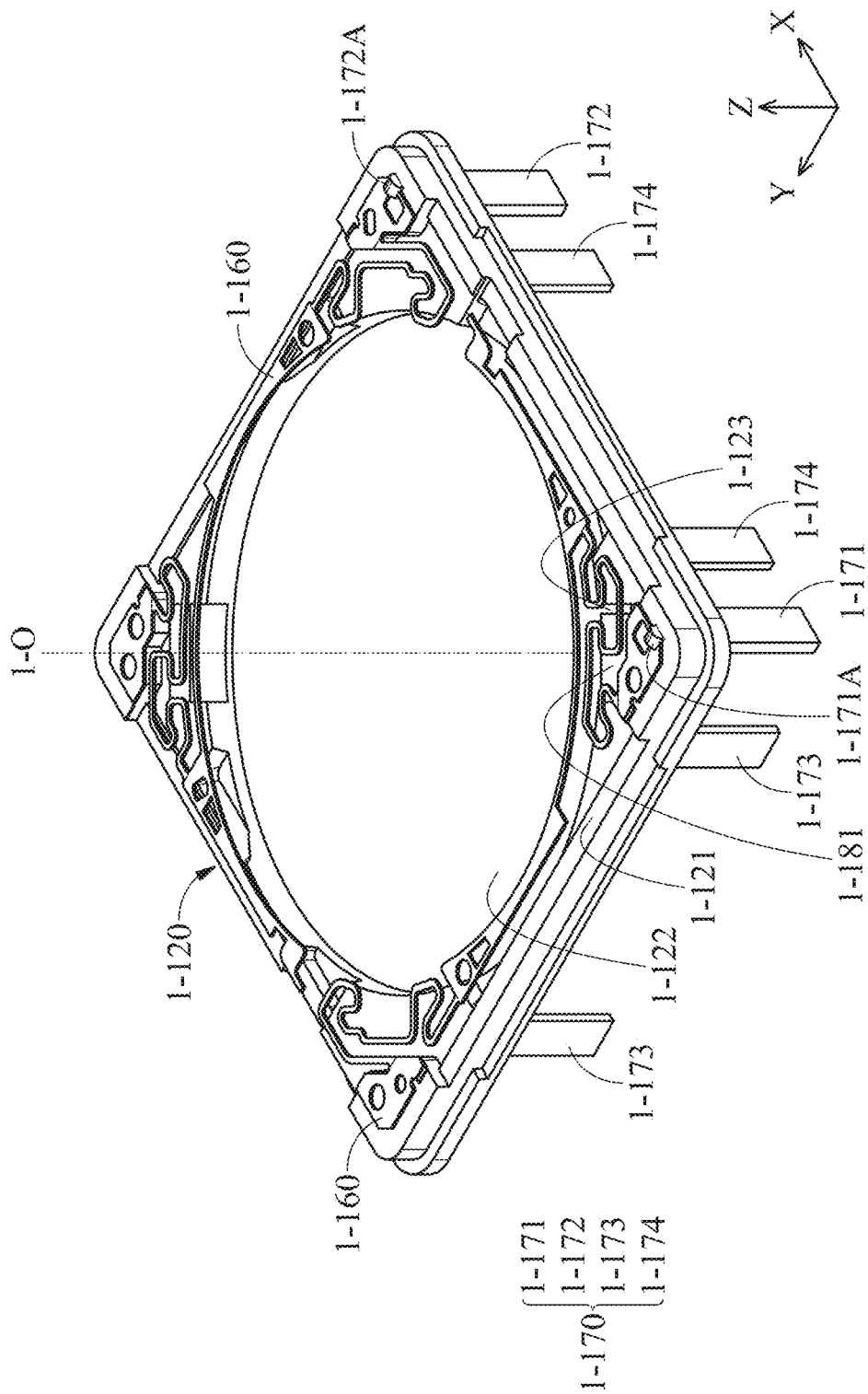
FIG. 5 is a perspective view illustrating the interior structure of the optical member driving mechanism in accordance with an embodiment of the present disclosure.

FIG. 5 is a perspective view illustrating the base 1-120, the second elastic element 1-160, and the circuit assembly 1-170 of the optical member driving mechanism in accordance with an embodiment of the present disclosure. As shown in FIG. 5, the circuit assembly 1-170 includes a first driving assembly connector 1-171, a second driving assembly connector 1-172, a first sensing assembly connector 1-173, and a second sensing assembly connector 1-174. The first driving assembly connector 1-171 and the second driving assembly connector 1-172 are electrically connected to the driving assembly 1-140. For example, the first driving assembly connector 1-171 is connected to the second elastic element 1-160 via an electrical contact 1-171A, and the second driving assembly connector 1-172 is connected to the second elastic element 1-160 via an electrical contact 1-172A. As such, the first driving assembly connector 1-171 and the second driving assembly connector 1-172 are electrically connected to the driving coil 1-141 of the driving assembly 1-140. The first sensing assembly connector 1-173 and the second sensing assembly connector 1-174 are electrically connected to the sensor 1-181 of the sensing assembly 1-180.

Figure 6:
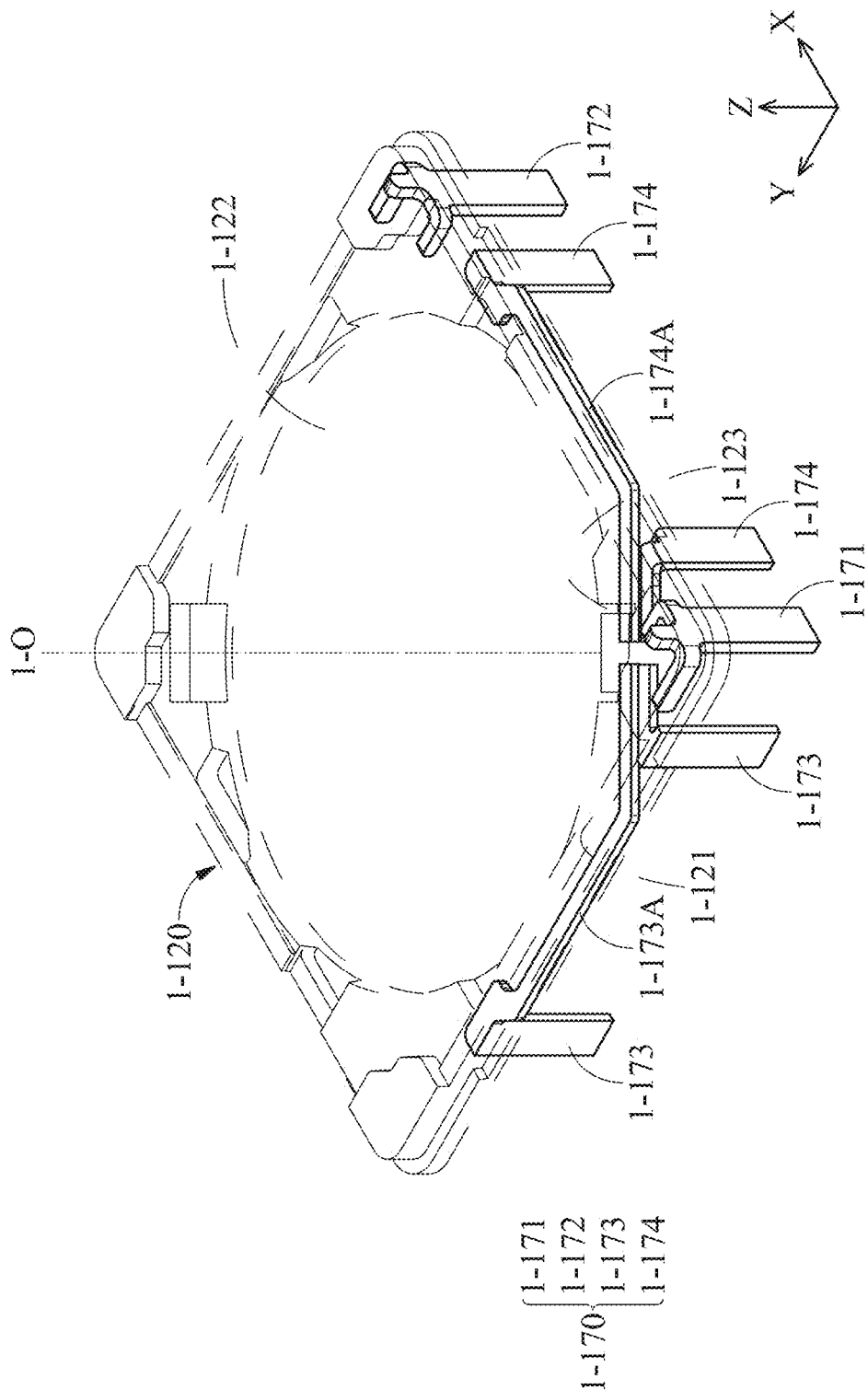
FIG. 6 is a perspective view illustrating the base and the circuit assembly in accordance with an embodiment of the present disclosure.

FIG. 6 is a perspective view illustrating the base 1-120 and the circuit assembly 1-170 in accordance with an embodiment of the present disclosure. As shown in FIG. 6, the first driving assembly connector 1-171 is disposed between the first sensing assembly connector 1-173 and the second sensing assembly connector 1-174. The second sensing assembly connector 1-174 is disposed between the first driving assembly connector 1-171 and the second driving assembly connector 1-172. In the present embodiment, when viewed along the main axis 1-O, the first sensing assembly connector 1-173 and the second sensing assembly connector 1-174 are each disposed on different sides of the base 1-120. In the present embodiment, the first driving assembly connector 1-171, the first sensing assembly connector 1-173 and the second sensing assembly connector 1-174 are disposed at the same corner of the base 1-120.

In addition, the first sensing assembly connector 1-173 has a first elongated structure 1-173A, and the second sensing assembly connector 1-174 has a second elongated structure 1-174A. In the present embodiment, the first elongated structure 1-173A and the second elongated structure 1-174A extend in a direction (such as along the X-Y plane) that is not parallel to the main axis 1-O. When viewed along the main axis 1-O, the first elongated structure 1-173A and the second elongated structure 1-174A each extend in different directions. For example, the first elongated structure 1-173A extends in the Y axis, and the second elongated structure 1-174A extends in the X axis. In some embodiments where the optical member driving mechanism 1-101 has an arbitrary polygonal structure, when viewed along the main axis 1-O, at most one of the first sensing assembly connector 1-173 and the second sensing assembly connector 1-174 is disposed on each side of the polygonal structure. In other words, each side may be arranged with the first sensing assembly connector 1-173 or the second sensing assembly connector 1-174, or none of the first sensing assembly connector 1-173 or the second sensing assembly connector 1-174 may be disposed on one side of the polygonal structure.

As shown in FIG. 6, the groove 1-123 of the base 1-120 may expose a portion of the first sensing assembly connector 1-173 and the second sensing assembly connector 1-174, so as to arrange the sensor 1-181 on the first sensing assembly connector 1-173 and the second sensing assembly connector 1-174. Therefore, the first sensing assembly connector 1-173 and the second sensing assembly connector 1-174 include low magnetic-conductivity or no magnetic-conductivity material, and thus the operation of the sensor 1-181 may not be interfered by the first sensing assembly connector 1-173 and the second sensing assembly connector 1-174. For example, the first sensing assembly connector 1-173 and the second sensing assembly connector 1-174 includes steel, nickel, copper, aluminum, any other suitable metal material, or a combination thereof. In some embodiments, under a magnetic field of 0.002T, the magnetic-conductivity of the first sensing assembly connector 1-173 and the second sensing assembly connector 1-174 may be less than 5000× 10-6 H/m. In the present embodiment, when viewed along a direction (such as the X axis and/or the Y axis) that is perpendicular to the main axis 1-O, the first sensing assembly connector 1-173, the second sensing assembly connector 1-174, and the sensing assembly 1-180 (including the sensor 1-181 and the reference element 1-182) do not overlap. When viewed along the main axis 1-O, the first sensing assembly connector 1-173, the second sensing assembly connector 1-174, and the sensing assembly 1-180 at least partially overlap.

Figure 7:
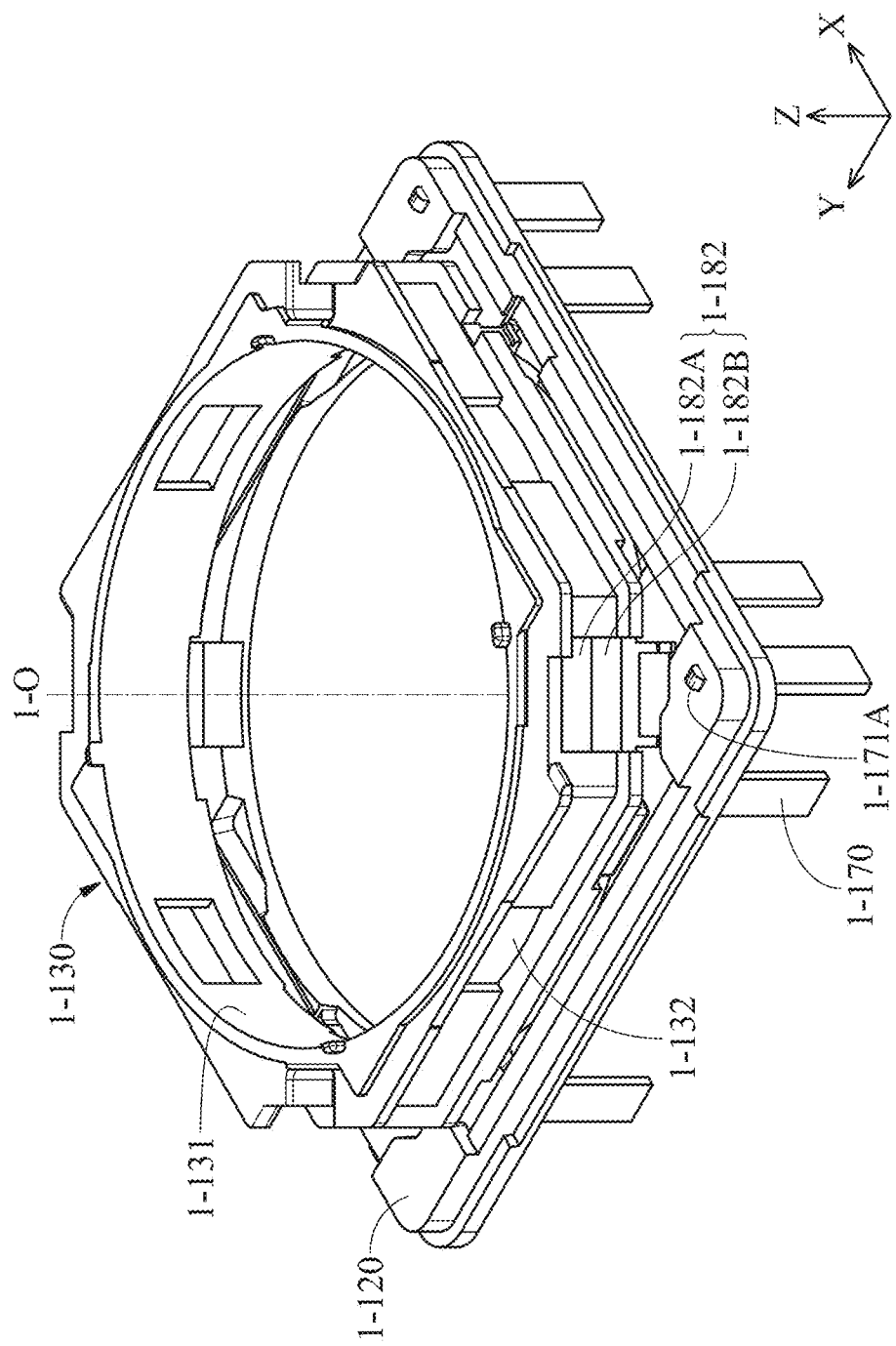
FIG. 7 is a perspective view illustrating the interior structure of the optical member driving mechanism in accordance with an embodiment of the present disclosure.

FIG. 7 is a perspective view illustrating the holder 1-130 and the base 1-120 in accordance with an embodiment of the present disclosure. As shown in FIG. 7, when viewed along a direction (such as viewed from the contact 1-171A to the center of the optical member driving mechanism 1-101) that is perpendicular to the main axis 1-O, the reference element 1-182 is exposed from the holder 1-130. Since the driving coil 1-141 is disposed around the holder 1-130, the reference element 1-182 may contact the driving coil 1-141. In the present embodiment, the reference element 1-182 has a pair of magnetic poles 1-182A and 1-182B, an imaginary connecting line that connects the magnetic poles 1-182A and 1-182B is parallel to the main axis 1-O and passes through the sensor 1-181 (shown in FIG. 5). In other embodiments, the reference element 1-182 may be a multiple-pole magnet, and the magnetic poles of the reference element 1-182 may be arranged in a direction that is substantially perpendicular to the main axis 1-O.

As set forth above, the embodiments of the present disclosure provide an optical member driving mechanism including circuit pins that are disposed on different sides of the base. The above design may arrange lines that are connected to different circuit pins on different sides, reducing the size of the base on the X-Y plane. As such, the miniaturization of the optical member driving mechanism may be achieved. In addition, the contact between the holder and the elastic element is disposed to mismatch the housing, and therefore the difficulty of manufacturing the optical member driving mechanism may be decreased.

Figure 8:
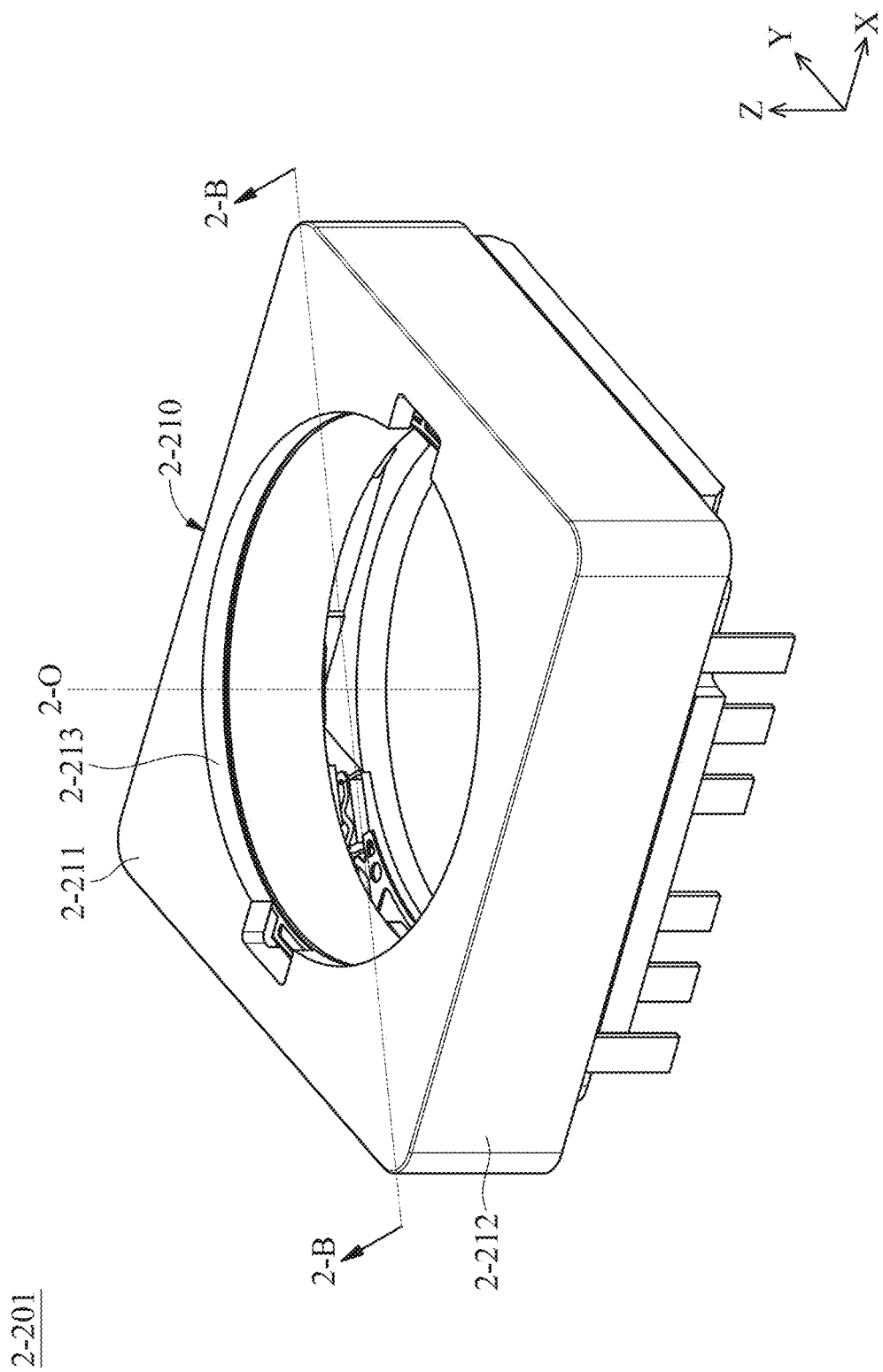
FIG. 8 is a perspective view illustrating an optical member driving mechanism in accordance with an embodiment of the present disclosure.

FIG. 8 is a perspective view illustrating an optical member driving mechanism 2-201 in accordance with an embodiment of the present disclosure. It should be noted that, in this embodiment, the optical member driving mechanism 2-201 may be, for example, a voice coil motor (VCM), which may be disposed in the electronic devices with camera function for driving an optical member (such as a lens), and can perform an autofocus (AF) function. In addition, in the present embodiment, the optical member driving mechanism 2-201 has a substantial rectangular structure. As shown in FIG. 8, a housing 2-210 of the optical member driving mechanism 2-201 has a top surface 2-211 and four sidewalls 2-212 that extend from edges of the top surface 2-211 in a main axis 2-O. An opening 2-213 is formed on the top surface 2-211 and corresponds to the optical member (not shown). That is, light may pass through the opening 2-213 via the main axis 2-O, such that the light may enter into the optical member driving mechanism 2-201. It should be noted that in other embodiments, the optical member driving mechanism 2-201 may have a polygonal structure surrounding the main axis 2-O.

Figure 9:
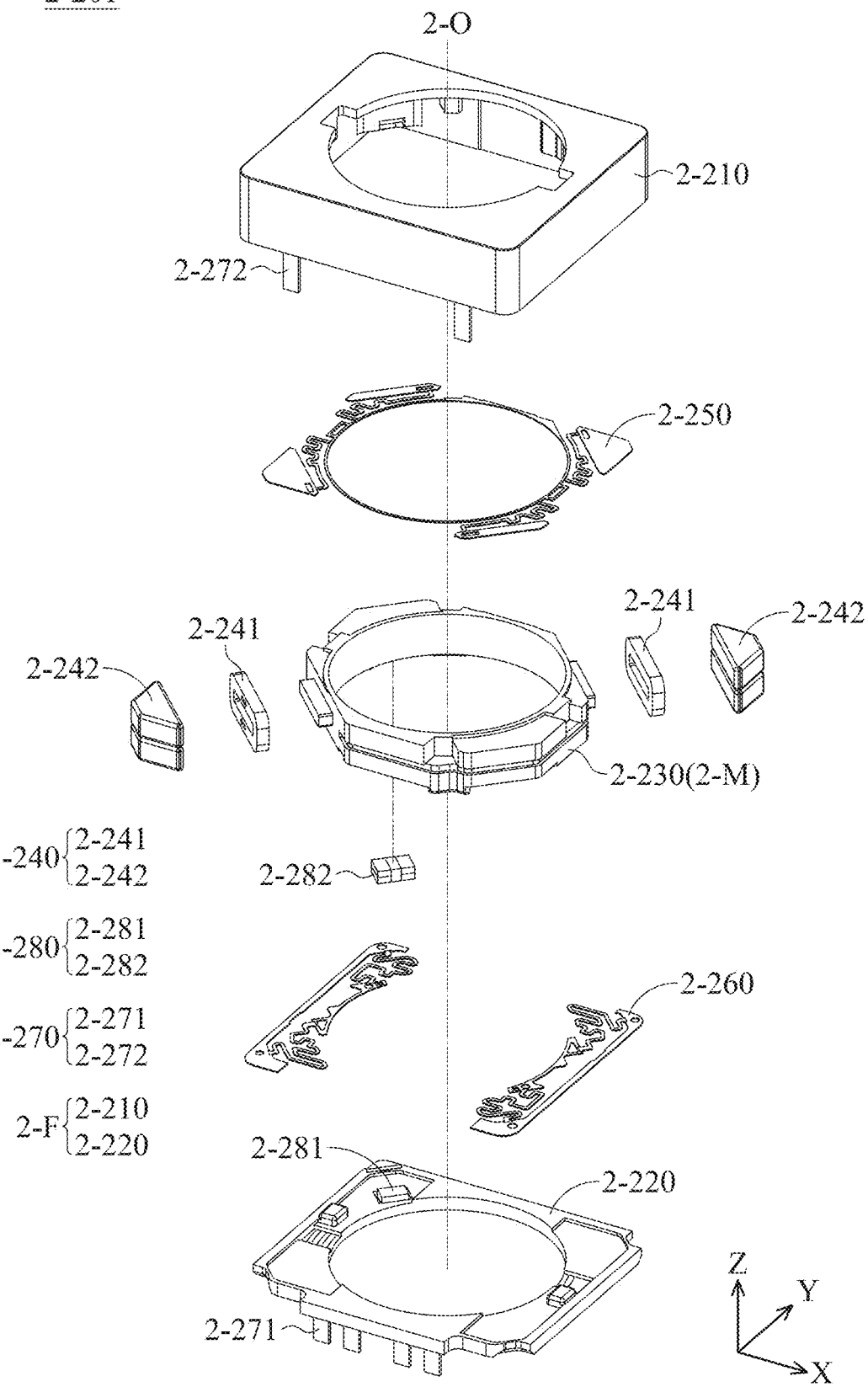
FIG. 9 is an exploded view illustrating the optical member driving mechanism shown in FIG. 8.

FIG. 9 is an exploded view illustrating the optical member driving mechanism 2-201 shown in FIG. 8. As shown in FIG. 9, the optical member driving mechanism 2-201 includes a housing 2-210, a base 2-220, a holder 2-230, a driving assembly 2-240, a first elastic element 2-250, a second elastic element 2-260, and a circuit assembly 2-270. A fixed portion 2-F may include the housing 2-210 and the base 2-220, and the movable portion 2-M may include the holder 2-230 and an optical member held thereon.

The housing 2-210 and the base 2-220 may be connected and assembled as a hollow case. Therefore, the holder 2-230, the driving assembly 2-240, the first elastic element 2-250 and the second elastic element 2-260 may be surrounded by the housing 2-210, and thus may be contained in the case. Accordingly, the housing 2-210, the holder 2-230, and the base 2-220 are sequentially arranged along the main axis 2-O. In other words, the light may sequentially pass through the housing 2-210, the holder 2-230 and the base 2-220, and reach an image sensor (not shown) that is disposed out of the optical member driving mechanism 2-201 such that an image is generated.

The holder 2-230 has a hollow structure, and carries an optical member with an optical axis (which is parallel to the main axis 2-O). In addition, the holder 2-230 is movably connected to the housing 2-210 and the base 2-220. The first elastic element 2-250 is disposed between the housing 2-210 and the holder 2-230, and the second elastic element 2-260 is disposed between the holder 2-230 and the base 2-220. To be more specific, the holder 2-230 may be connected to the housing 2-210 and the base 2-220 through the first elastic element 2-250 and the second elastic element 2-260, which are made of metallic materials. Therefore, the holder 2-230 is movably suspended between the housing 2-210 and the base 2-220, and the holder 2-230 may move along the main axis 2-O between the housing 2-210 and the base 2-220.

The driving assembly 2-240 includes a driving coil 2-241 and magnetic elements 2-242. The driving coil 2-241 may be disposed around the holder 2-230, and the magnetic elements 2-242 may be disposed between the housing 2-210 and the holder 2-230. In some embodiments, the magnetic elements 2-242 are affixed to the housing 2-210. When a current is applied to the driving coil 2-241, an electromagnetic driving force may be generated by the driving coil 2-241 and the magnetic elements 2-242 to drive the holder 2-230 and the optical member carried therein to move along the Z-axis (i.e. the main axis 2-O) relative to the base 2-220. Therefore, the autofocus (AF) function is performed. In other embodiment, the positions of the driving coil 2-241 and the magnetic elements 2-242 are interchangeable. In other words, the driving coil 2-241 may be disposed between the housing 2-210 and the holder 2-230, and the magnetic elements 2-242 may be disposed on the holder 2-230. That way, the autofocus (AF) function may also be achieved.

The circuit assembly 2-270 includes a driving assembly connector 2-271 and a sensing assembly connector 2-272, wherein the driving assembly connector 2-271 is embedded in the base 2-220, and may extend outward (for example, in a direction that is parallel to the main axis 2-O) from the base 2-220. The sensing assembly connector 2-272 is embedded in the housing 2-210, such as embedded in the sidewalls 2-212 of the housing 2-210. In addition, a sensor 2-281 is disposed on the circuit assembly 2-270, and the sensor 2-281 and a reference member 2-282 (shown in FIG. 3) that is disposed on the holder 2-230 constitute a sensing assembly 2-280. For example, the sensor 2-281 may be a Hall effect sensor, a magnetoresistance (MR) sensor (such as a tunnel magnetoresistance (TMR) sensor) or any other suitable sensor.

As shown in FIG. 9, the sensing assembly 2-280 and the driving assembly 2-240 are disposed at different corners of the optical member driving mechanism 2-201. As such, the operation of the sensing assembly 2-280 may not be interfered by the magnetic elements 2-242. In addition, all the elements are evenly distributed in the optical member driving mechanism 2-201, which may effectively reduce the size of the optical member driving mechanism 2-201, and therefore the miniaturization of the optical member driving mechanism 2-201 may be achieved. In the present embodiment, the driving assembly connector 2-271 is electrically connected to the driving assembly 2-240, and the sensing assembly connector 2-272 is electrically connected to the sensing assembly 2-280. Different wiring of the circuit assembly 2-270 are embedded in different parts of the fixed portion 2-F. Accordingly, the difficulty for arranging the wiring may be decreased, and the interior space of the optical member driving mechanism 2-201 may be effectively utilized.

Figure 10:
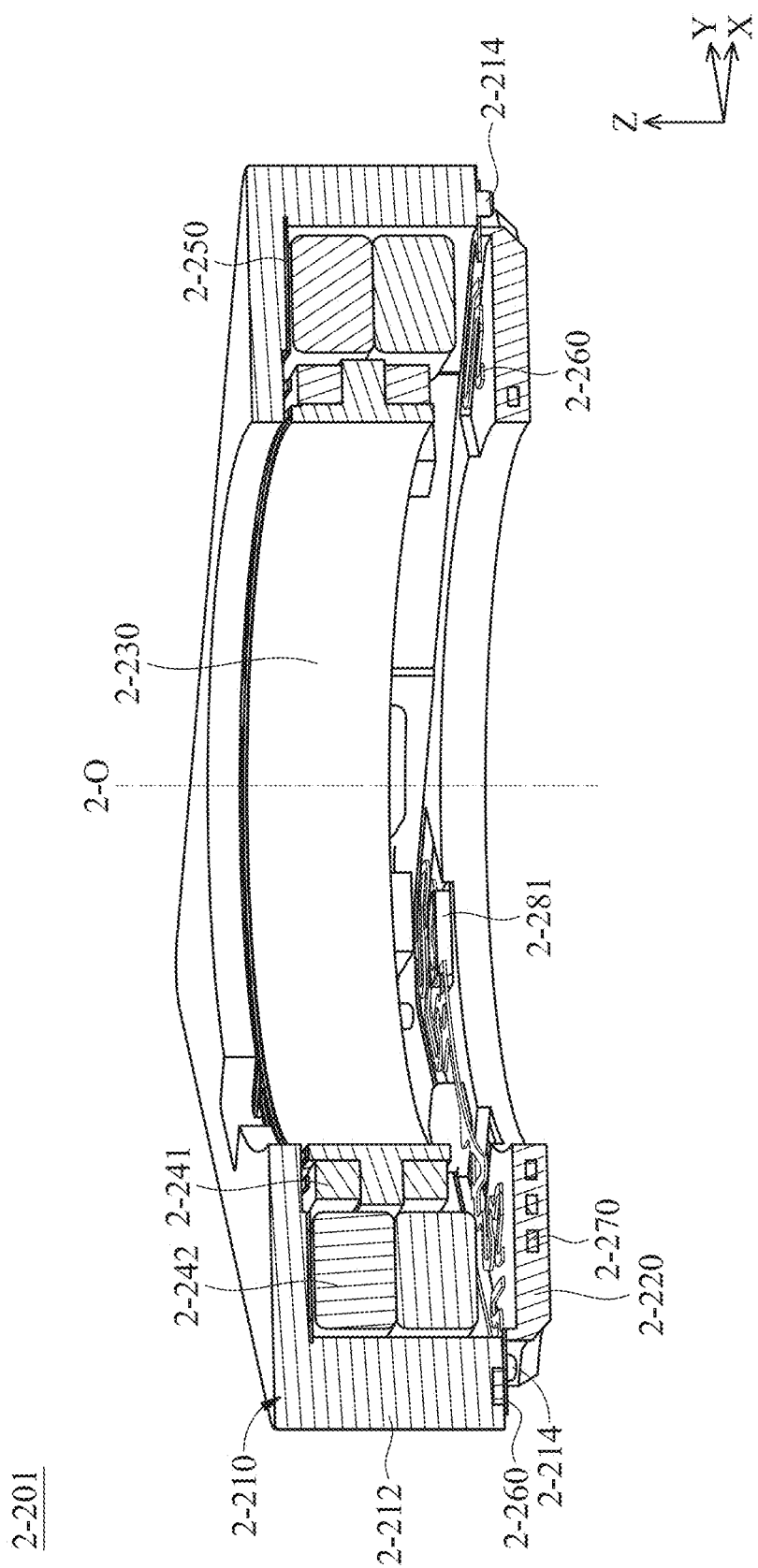
FIG. 10 is a cross-sectional view along line 2-B-2-B shown in FIG. 8.

FIG. 10 is a cross-sectional view along line 2-B-2-B shown in FIG. 8. As shown in FIG. 10, the housing 2-210 further has a positioning column 2-214 that extends toward the base 2-220 in the main axis 2-O (the Z axis), namely, extends downward. The second elastic element 2-260 is disposed corresponding to the positioning column 2-214. In the present embodiment, the second elastic element 2-260 may extend under the sidewalls 2-212 of the housing 2-210. In other words, when viewed along the main axis 2-O, the sidewalls 2-212 of the housing 2-210 and the second elastic element 2-260 overlap.

Figure 11:
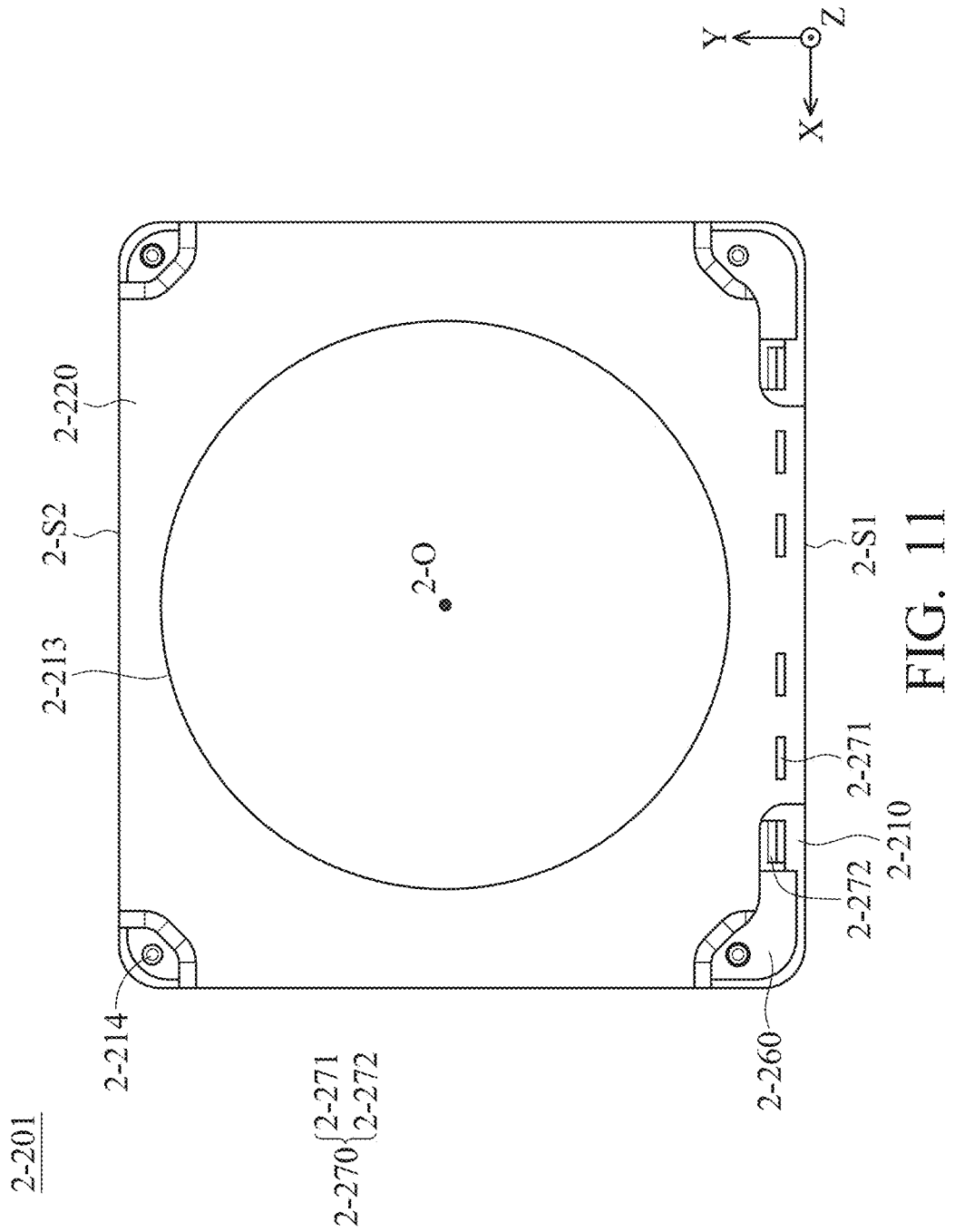
FIG. 11 is a bottom view illustrating the optical member driving mechanism in shown in FIG. 8.

FIG. 11 is a bottom view illustrating the optical member driving mechanism 2-201 in shown in FIG. 8. As shown in FIG. 11, the second elastic element 2-260 is disposed around the positioning column 2-214. The second elastic element 2-260 may be disposed more easily due to the arrangement of the positioning column 2-214. In the present embodiment, when viewed along the main axis 2-O, the base 2-210 and the positioning column 2-214 do not overlap. Therefore, the height of the optical member driving mechanism 2-201 in the Z axis may be reduced, facilitating the miniaturization. Based on the above design, when viewed along the main axis 2-O, the second elastic element 2-260 may be exposed from the base 2-220. It should be noted that the above design merely serves as an example, and those skilled in the art may arrange the base 2-220 to cover the second elastic element 2-260 for good protection.

In addition, as shown in FIG. 11, when viewed along the main axis 2-O, the optical member driving mechanism 2-201 has a first side 2-S1 and an opposite second side 2-S2, wherein the shortest distance between the opening 2-213 and the first side 2-S1 is greater than the shortest distance between the opening 2-213 and the second side 2-S2. In other words, the second side 2-S2 is closer to the opening 2-213 than the first side 2-S1. In the present embodiment, an exposed portion of the circuit assembly 2-270 is disposed on the first side 2-S1. Since the exposed portion of the circuit assembly 2-270 is disposed on the first side 2-S1, where the space is larger, the circuit assembly 2-270 may be disposed more easily.

Figure 12:
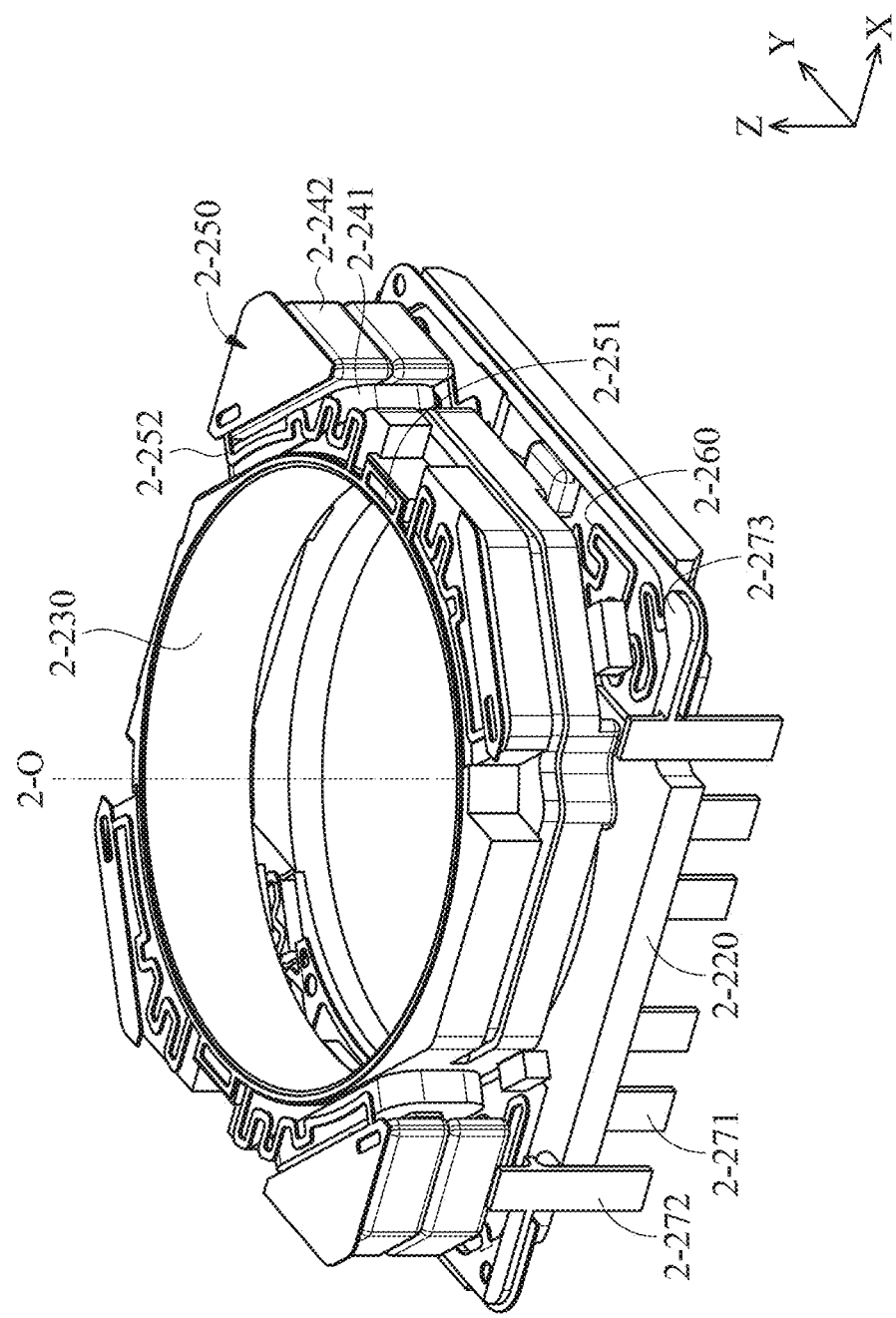
FIG. 12 is a perspective view illustrating the interior structure of the optical member driving mechanism in accordance with an embodiment of the present disclosure.

FIG. 12 is a perspective view illustrating the interior structure of the optical member driving mechanism 2-201 in accordance with an embodiment of the present disclosure. It should be understood that in order to clearly show the interior structure of the optical member driving mechanism 2-201, the housing 2-210 is not illustrated in the present embodiment. As shown in FIG. 12, the circuit assembly 2-270 has a contact 2-273 that is disposed at a corner of the optical member driving mechanism 2-201. The sensing assembly connector 2-272 is electrically connected to the second elastic element 2-260 via the contact 2-273, and further electrically connected to the sensing assembly 2-280 via the second elastic element 2-260.

In addition, the first elastic element 2-250 includes a plurality of glue holes 2-251 and strings 2-252. In the present embodiment, the first elastic element 2-250 has two glue holes 2-251 that are disposed symmetrically, but the present disclosure is not limited thereto. Those skilled in the art may adjust the position of the glue holes 2-251 as required. An adhesive (not shown) may be disposed in the glue holes 2-251 to bond the first elastic element 2-250 and the holder 2-230. Two strings 2-252 may move the holder 2-230 relative to the fixed portion 2-F. At least two strings 2-252 may extend to one of the glue holes 2-251, so as to drive the holder 2-230 to move.

Figure 13:
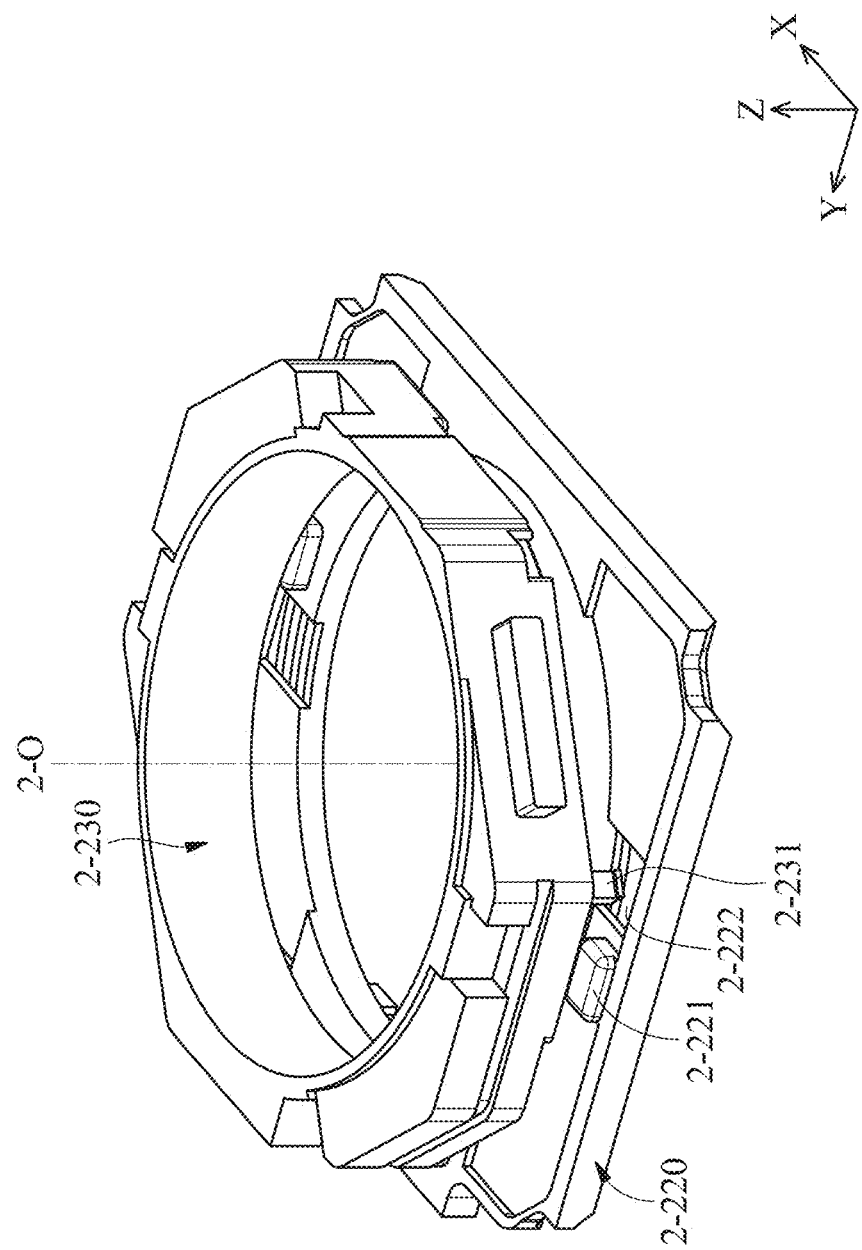
FIG. 13 is a perspective view illustrating the base and the holder in accordance with an embodiment of the present disclosure.

FIG. 13 is a perspective view illustrating the base 2-220 and the holder 2-230 in accordance with an embodiment of the present disclosure. As shown in FIG. 13, the holder 2-230 has a wiring column 2-231 that extends toward the base 2-220 in the main axis 2-O. The wiring column 2-231 is configured to arrange the wiring (not shown) to electrically connect the coil of the driving assembly 2-240 and the circuit assembly 2-270 (such as the driving assembly connector 2-271). The base 2-220 has a stopper portion 2-221 that extends toward the top surface 2-211 of the housing 2-210 (shown in FIG. 1) in the main axis 2-O, and when viewed along the main axis 2-O, the stopper portion 2-221 and the wiring column 2-231 are located on the same side of the optical member driving mechanism 2-201. The arrangement of the stopper portion 2-221 may effectively limit the moving range of the holder 2-230, preventing the sensing assembly 2-280 disposed on the base 2-220 from damage due to collided by the holder 2-230. In addition, the base 2-220 further has a recess 2-222 that is configured to contain the wiring column 2-231. That is, when viewed along the main axis 2-O, the recess 2-222 and the wiring column 2-231 overlap. The arrangement of the recess 2-222 may reduce the height of the optical member driving mechanism 2-201 in the Z axis, facilitating the miniaturization.

Figure 14:
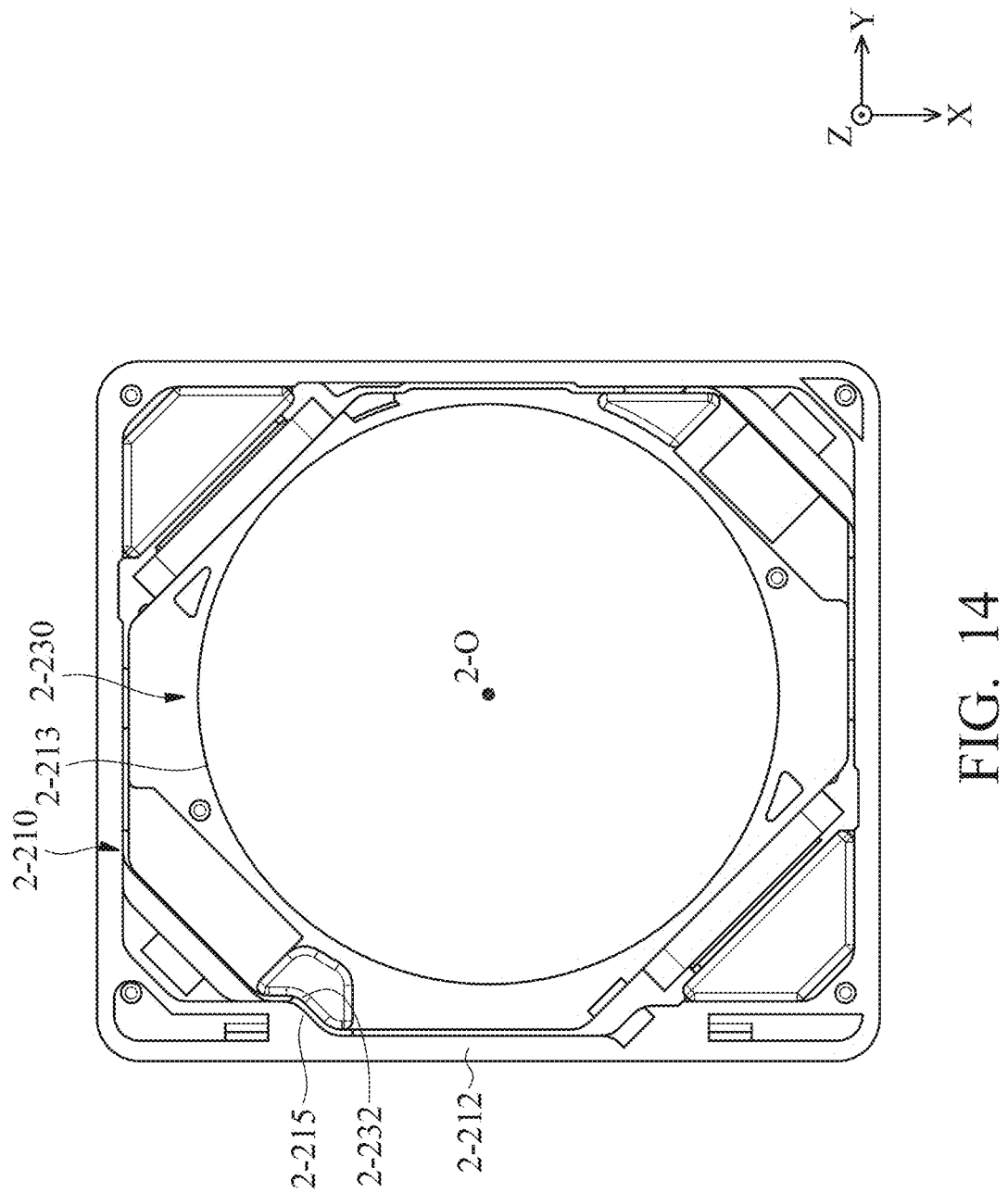
FIG. 14 is a bottom view illustrating the interior structure of the optical member driving mechanism in accordance with an embodiment of the present disclosure.

FIG. 14 is a bottom view illustrating the interior structure of the optical member driving mechanism 2-201 in accordance with an embodiment of the present disclosure. It should be understood that in order to clearly show the interior structure of the optical member driving mechanism 2-201, the base 2-220 is not illustrated in the present embodiment. As shown in FIG. 14, a protruding portion 2-215 is formed on one side of the housing 2-210 and protrudes toward the holder 2-230. The holder 2-230 has a recessed portion 2-232 that is configured to accommodate the protruding portion 2-215 in the recessed portion 2-232. To be more specific, when viewed along the main axis 2-O, the protruding portion 2-215 protrudes inward (i.e. toward the opening 2-213) from the sidewall 2-212 of the housing 2-210. The arrangement of the protruding portion 2-215 and the recessed portion 2-232 may effectively limit the rotating range of the holder 2-230. The excess rotation of the holder 2-230 is avoided, and the durability of the optical member driving mechanism 2-201 may be enhanced. It should be noted that the configuration of the protruding portion 2-215 and the recessed portion 2-232 is merely an example, those skilled in the art may adjust the position of the protruding portion 2-215 and the recessed portion 2-232 without departing from their original function, and it will not repeated in the following description.

Figure 15:
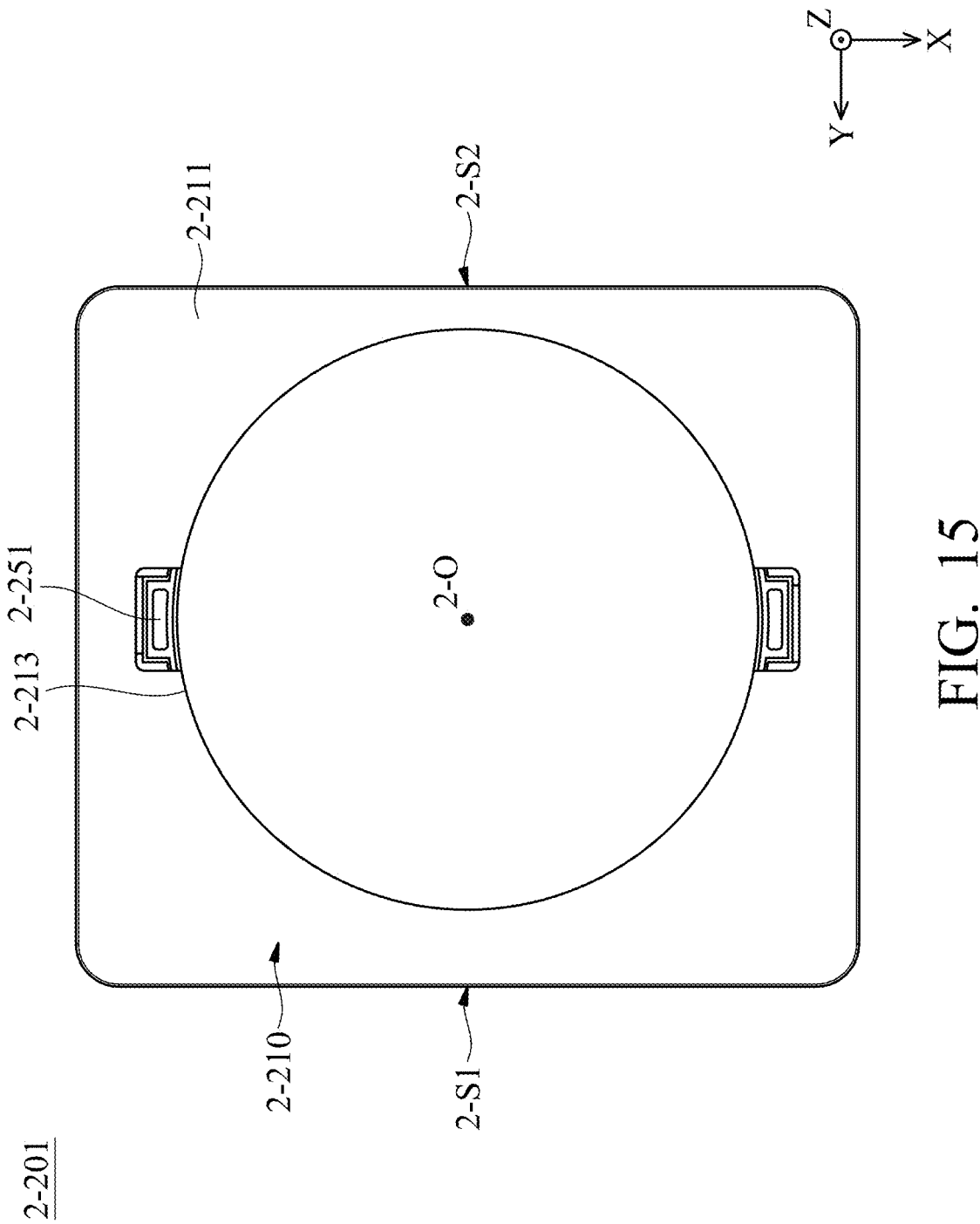
FIG. 15 is a top view illustrating the optical member driving mechanism in accordance with an embodiment of the present disclosure.

FIG. 15 is a top view illustrating the optical member driving mechanism 2-201 in accordance with an embodiment of the present disclosure. As shown in FIG. 15, the glue holes 2-251 of the first elastic element 2-250 are located on two sides of the optical member driving mechanism 2-201. When viewed along the main axis 2-O, the former two sides are substantially perpendicular to the first side 2-S1 and the second side 2-S2. That is, in the present embodiment, the glue holes 2-251 would not be located on the first side 2-S1 and the second side 2-S2. In addition, when viewed along the main axis 2-O, the housing 2-210 and the glue holes 2-251 do not overlap. In other words, in a top view, the housing 2-210 may expose the glue holes 2-251, and therefore the technician may fill the adhesive into the glue hole 2-251 when facing the top surface 2-211 to bond the first elastic element 2-250 and the holder 2-230. The above design may effectively simplify the assembly process of the optical member driving mechanism 2-201, reducing the required time and cost.

As set forth above, the embodiments of the present disclosure provide an optical member driving mechanism including a circuit assembly that is embedded in the fixed portion. Different wirings of the circuit assembly are embedded in different parts of the fixed portion, reducing the difficulty of arranging the wirings and effectively utilizing interior space of the optical member driving mechanism. As such, the miniaturization of the optical member driving mechanism may be achieved. In addition, the housing is design to expose the glue holds of the elastic element. Therefore, the assembly process of the optical member driving mechanism may be simplified, and the required time and cost may be reduced.

Figure 16:
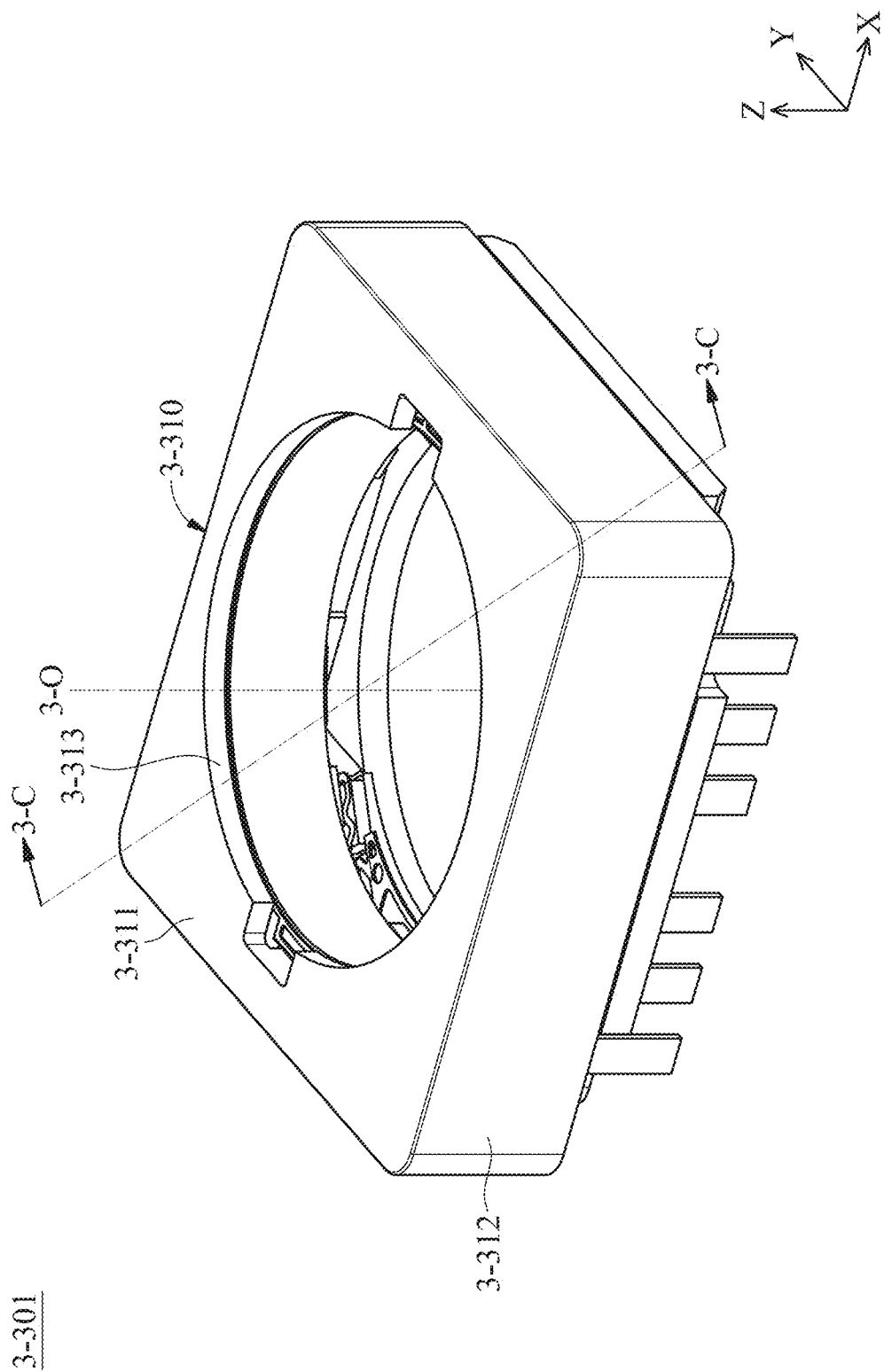
FIG. 16 is a perspective view illustrating an optical member driving mechanism in accordance with an embodiment of the present disclosure.

FIG. 16 is a perspective view illustrating an optical member driving mechanism 3-301 in accordance with an embodiment of the present disclosure. It should be noted that, in this embodiment, the optical member driving mechanism 3-301 may be, for example, a voice coil motor (VCM), which may be disposed in the electronic devices with camera function for driving an optical member (such as a lens), and can perform an autofocus (AF) function. In addition, in the present embodiment, the optical member driving mechanism 3-301 has a substantial rectangular structure. As shown in FIG. 16, a housing 3-310 of the optical member driving mechanism 3-301 has a top surface 3-311 and four sidewalls 3-312 that extend from edges of the top surface 3-311 in a main axis 3-O. An opening 3-313 is formed on the top surface 3-311 and corresponds to the optical member (not shown). That is, light may pass through the opening 3-313 via the main axis 3-O, such that the light may enter into the optical member driving mechanism 3-301. It should be noted that in other embodiments, the optical member driving mechanism 3-301 may have a polygonal structure surrounding the main axis 3-O.

Figure 17:
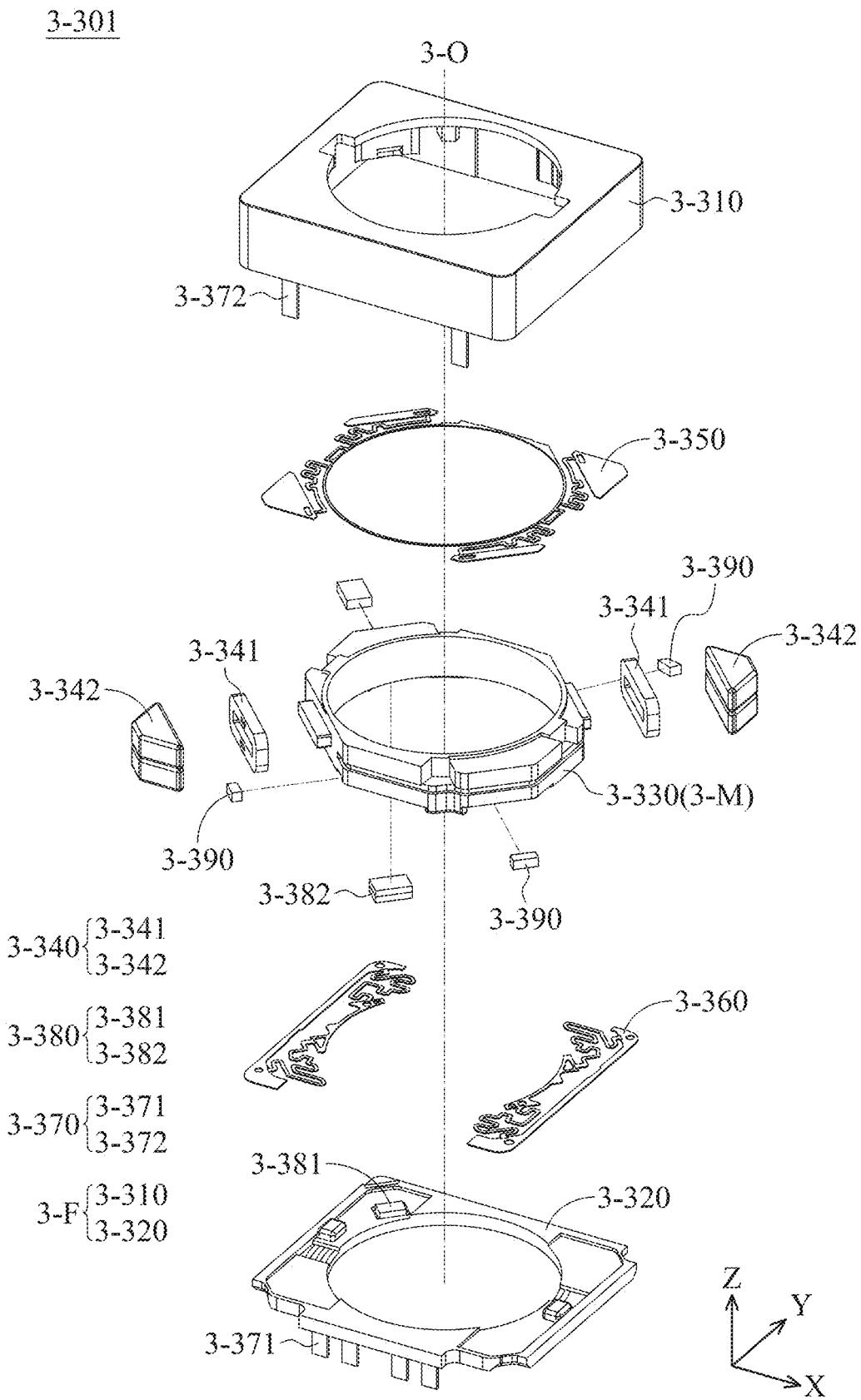
FIG. 17 is an exploded view illustrating the optical member driving mechanism shown in FIG. 16.

FIG. 17 is an exploded view illustrating the optical member driving mechanism 3-301 shown in FIG. 16. As shown in FIG. 17, the optical member driving mechanism 3-301 includes a housing 3-310, a base 3-320, a holder 3-330, a driving assembly 3-340, a first elastic element 3-350, a second elastic element 3-360, and a circuit assembly 3-370. A fixed portion 3-F may include the housing 3-310 and the base 3-320, and the movable portion 3-M may include the holder 3-330 and an optical member held thereon.

The housing 3-310 and the base 3-320 may be connected and assembled as a hollow case. Therefore, the holder 3-330, the driving assembly 3-340, the first elastic element 3-350 and the second elastic element 3-360 may be surrounded by the housing 3-310, and thus may be contained in the case. Accordingly, the housing 3-310, the holder 3-330, and the base 3-320 are sequentially arranged along the main axis 3-O. In other words, the light may sequentially pass through the housing 3-310, the holder 3-330 and the base 3-320, and reach an image sensor (not shown) that is disposed out of the optical member driving mechanism 3-301 such that an image is generated.

The holder 3-330 has a hollow structure, and carries an optical member with an optical axis (which is parallel to the main axis 3-O). In addition, the holder 3-330 is movably connected to the housing 3-310 and the base 3-320. The first elastic element 3-350 is disposed between the housing 3-310 and the holder 3-330, and the second elastic element 3-360 is disposed between the holder 3-330 and the base 3-320. To be more specific, the holder 3-330 may be connected to the housing 3-310 and the base 3-320 through the first elastic element 3-350 and the second elastic element 3-360, which are made of metallic materials. Therefore, the holder 3-330 is movably suspended between the housing 3-310 and the base 3-320, and the holder 3-330 may move along the main axis 3-O between the housing 3-310 and the base 3-320.

The driving assembly 3-340 includes a driving coil 3-341 and magnetic elements 3-342. The driving coil 3-341 may be disposed around the holder 3-330, and the magnetic elements 3-342 may be disposed between the housing 3-310 and the holder 3-330. In some embodiments, the magnetic elements 3-342 are affixed to the housing 3-310. When a current is applied to the driving coil 3-341, an electromagnetic driving force may be generated by the driving coil 3-341 and the magnetic elements 3-342 to drive the holder 3-330 and the optical member carried therein to move along the Z-axis (i.e. the main axis 3-O) relative to the base 3-320. Therefore, the autofocus (AF) function is performed. In other embodiment, the positions of the driving coil 3-341 and the magnetic elements 3-342 are interchangeable. In other words, the driving coil 3-341 may be disposed between the housing 3-310 and the holder 3-330, and the magnetic elements 3-342 may be disposed on the holder 3-330. That way, the autofocus (AF) function may also be achieved.

The circuit assembly 3-370 includes a driving assembly connector 3-371 and a sensing assembly connector 3-372, wherein the driving assembly connector 3-371 is embedded in the base 3-320, and may extend outward (for example, in a direction that is parallel to the main axis 3-O) from the base 3-320. The sensing assembly connector 3-372 is embedded in the housing 3-310, such as embedded in the sidewalls 3-312 of the housing 3-310. In addition, a sensor 3-381 is disposed on the circuit assembly 3-370, and the sensor 3-381 and a reference element 3-382 (shown in FIG. 3) that is disposed on the holder 3-330 constitute a sensing assembly 3-380. For example, the sensor 3-381 may be a Hall effect sensor, a magnetoresistance (MR) sensor (such as a tunnel magnetoresistance (TMR) sensor) or any other suitable sensor. In some embodiments, the sensor 3-381 may be disposed on the holder 3-330, and the reference element 3-382 is disposed on the fixed portion 3-F.

As shown in FIG. 17, the sensing assembly 3-380 and the driving assembly 3-340 are disposed at different corners of the optical member driving mechanism 3-301. As such, the magnetic elements 3-342 may not interfere with the operation of the sensing assembly 3-380. In addition, all the elements are evenly distributed in the optical member driving mechanism 3-301, which may effectively reduce the size of the optical member driving mechanism 3-301, and therefore the miniaturization of the optical member driving mechanism 3-301 may be achieved. In the present embodiment, the driving assembly connector 3-371 is electrically connected to the driving assembly 3-340, and the sensing assembly connector 3-372 is electrically connected to the sensing assembly 3-380. Different wirings of the circuit assembly 3-370 are embedded in different parts of the fixed portion 3-F. Accordingly, the difficulty for arranging the wirings may be decreased, and the interior space of the optical member driving mechanism 3-301 may be effectively utilized.

In addition, in the present embodiment, a damping material 3-390 is disposed between the fixed portion 3-F and the movable portion 3-M. To be more specific, the damping material 3-390 is disposed between the housing 3-310 and the holder 3-330. The arrangement of the damping material 3-390 may make the holder 3-330 move to a predetermined position more rapidly, and reduce the possibility of the collision between the holder 3-330 and the housing 3-310. Therefore, the holder 3-330 and the optical member held thereon may be protected.

Figure 18:
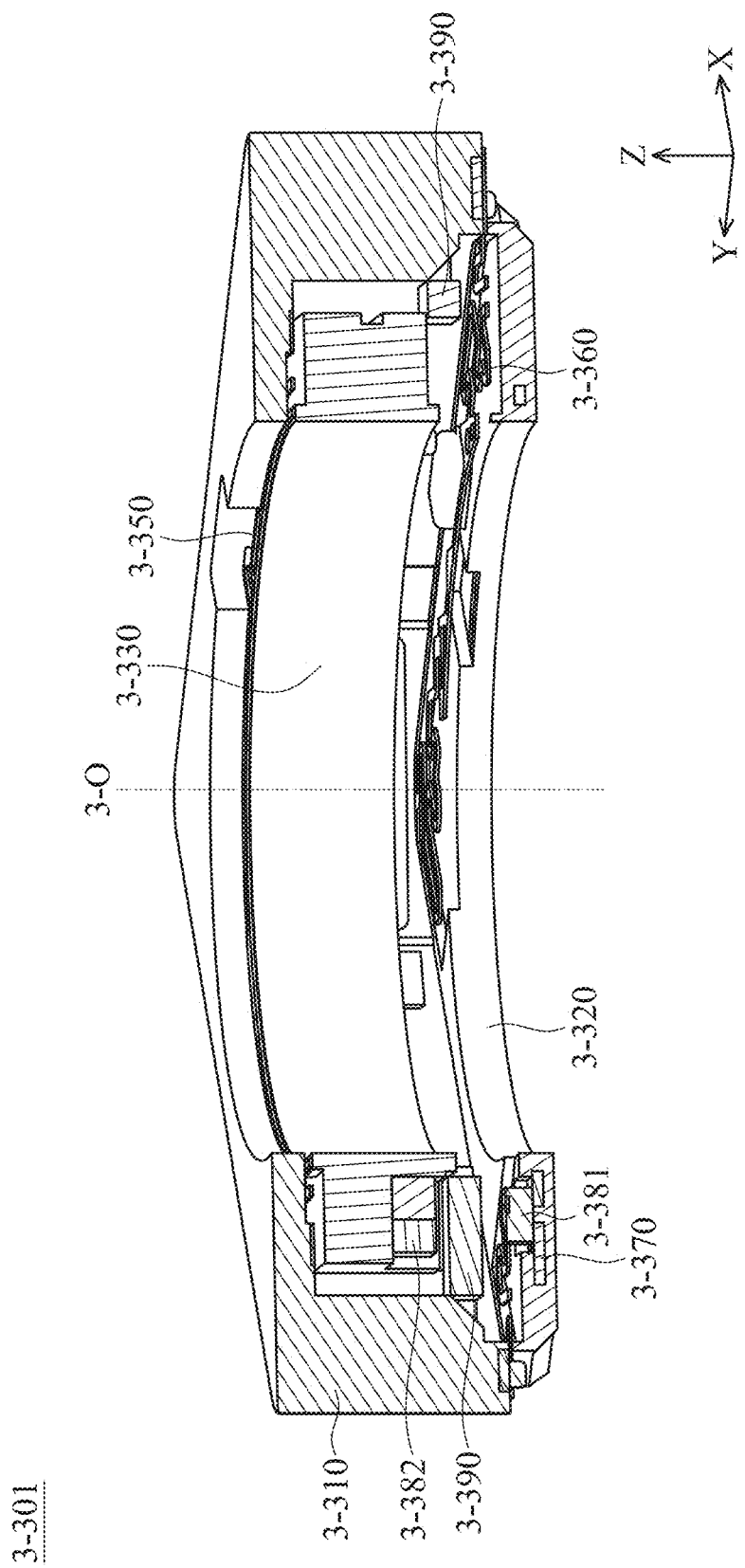
FIG. 18 is a cross-sectional view along line 3-B-3-B shown in FIG. 16.

FIG. 18 is a cross-sectional view along line 3-C-3-C shown in FIG. 16. As shown in FIG. 18, the damping material 3-390 is disposed between the sensor 3-381 and the reference element 3-382. That is, in a vertical direction (the Z axis), the damping material 3-390, the sensor 3-381 and the reference element 3-382 may overlap. It should be noted that the arrangement of the damping material 3-390 in the present embodiment merely serves as an example. Since the damping material 3-390 has fluid-like characteristic, the position of the damping material 3-390 may be different depending on the actual situation every time, as long as the damping material 3-390 is disposed between the housing 3-310 and the holder 3-330.

Figure 19:
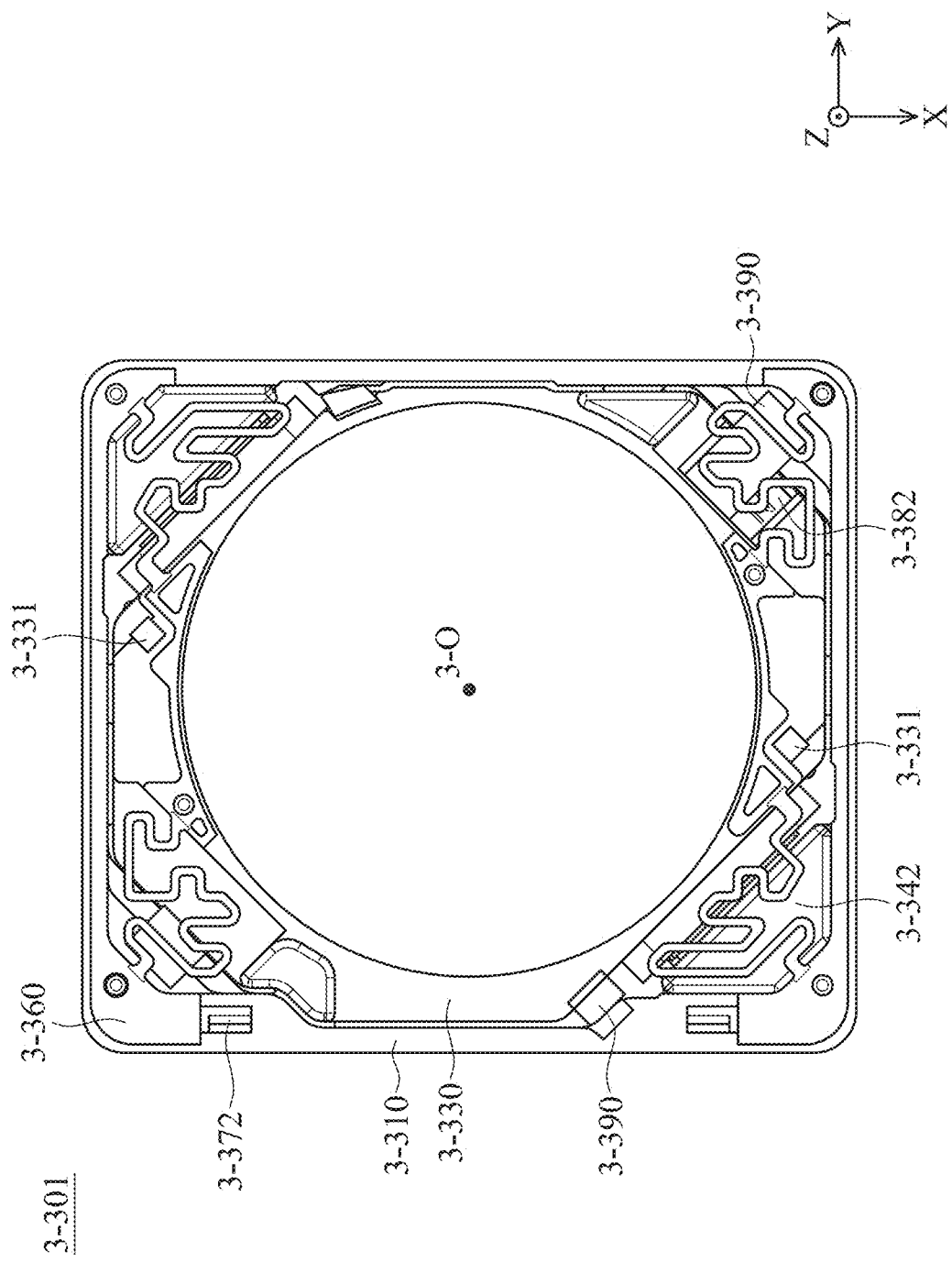
FIG. 19 is a bottom view illustrating the interior structure of the optical member driving mechanism in accordance with an embodiment of the present disclosure.

FIG. 19 is a bottom view illustrating the optical member driving mechanism 3-301 in shown in FIG. 16. It should be understood that in order to clearly show the interior structure of the optical member driving mechanism 3-301, the base 3-320 is not illustrated in the present embodiment. As shown in FIG. 19, the second elastic element 3-360 is connected to the housing 3-310 and the holder 3-330, and makes the holder 3-330 move in the Z axis. The holder 3-330 has a wiring column 3-331 that extends toward the base 3-320 (shown in FIG. 2) in the Z axis. For example, the wiring column 3-331 may be configured to arrange the wiring, electrically connecting the circuit assembly 3-370 and the driving coil 3-341.

In the present embodiment, when viewed along the main axis 3-O, the second elastic element 3-360 and the wiring column 3-331 do not overlap, and therefore there may be less interference on the second elastic element 3-360 from the wiring column 3-331, maintaining the normal operation of the optical member driving mechanism 3-301. In addition, when viewed along the main axis 3-O, the second elastic element 3-360, the damping material 3-390 and the reference element 3-382 of the sensing assembly 3-380 at least partially overlap. In other words, the damping material 3-390 is located between the second elastic element 3-360 and the reference element 3-382. As such, the reference element 3-382 is prevented from damage due to the movement of the second elastic element 3-360.

Figure 20:
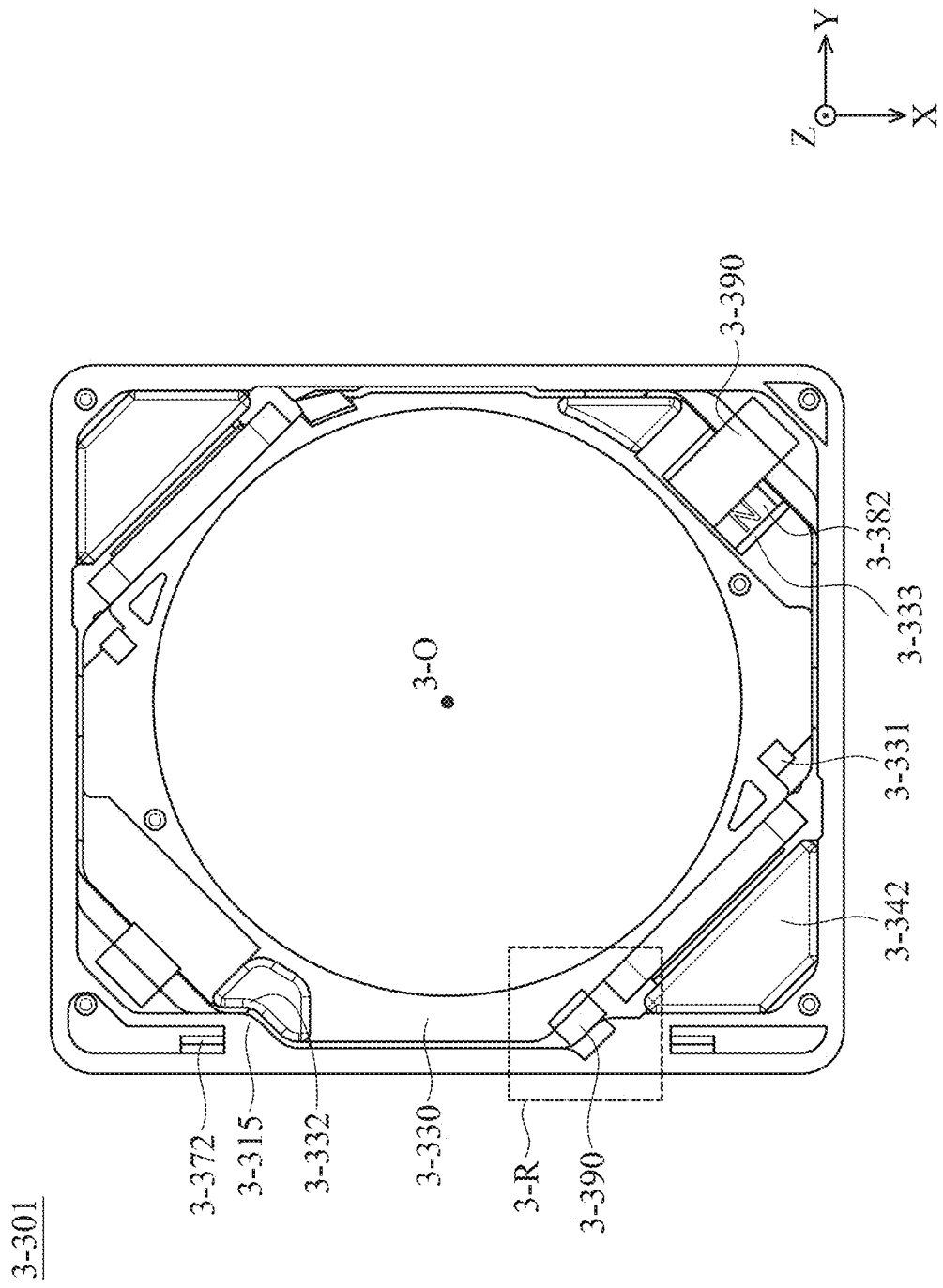
FIG. 20 is a bottom view illustrating the interior structure of the optical member driving mechanism in accordance with an embodiment of the present disclosure.

FIG. 20 is a bottom view illustrating the interior structure of the optical member driving mechanism 3-301 in accordance with an embodiment of the present disclosure. It should be understood that in order to clearly show the interior structure of the optical member driving mechanism 3-301, the base 3-320 and the second elastic element 3-360 are not illustrated in the present embodiment. As shown in FIG. 20, a protruding portion 3-315 is formed on one side of the housing 3-310 and protrudes toward the holder 3-330. Correspondingly, the holder 3-330 has a recessed portion 3-332, and the protruding portion 3-315 is accommodated in the recessed portion 3-332. The above design may avoid the rotation of the holder 3-330 about the main axis 3-O relative to the housing 3-310, maintaining the normal operation of the optical member driving mechanism 3-301. In the present embodiment, when viewed along the main axis 3-O, the damping material 3-390, the protruding portion 3-315, and the recessed portion 3-332 do not overlap.

As shown in FIG. 20, the holder 3-330 further has a groove 3-333 that is configured to accommodate the reference element 3-382 of the sensing assembly 3-380, and the damping material 3-390 is disposed in the groove 3-333 and covers the reference element 3-382. In other words, when viewed along the main axis 3-O, the damping material 3-390 and the sensing assembly 3-380 at least partially overlap. As such, the reference element 3-382 may be protected by the groove 3-333 and the damping material 3-390, reducing the possibility that the reference element 3-382 is damaged.

Figure 21:
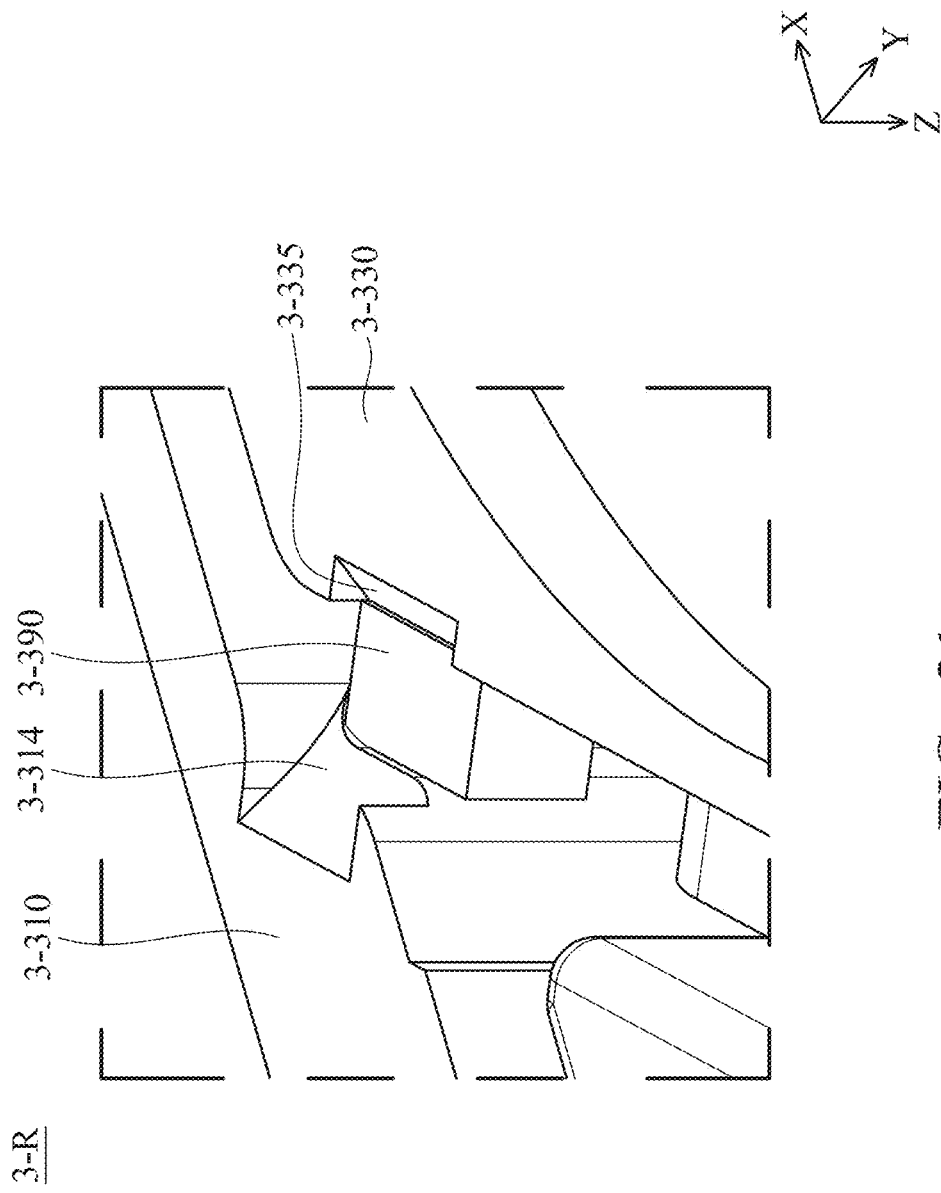
FIG. 21 is a partial enlarged perspective view illustrating the interior structure of the optical member driving mechanism in accordance with an embodiment of the present disclosure.

FIG. 21 is a partial enlarged perspective view illustrating the region R shown in FIG. 20. As shown in FIG. 21, the holder 3-330 and the housing 3-310 each have corresponding recesses 3-335 and 3-314 for containing the damping material 3-390. The recesses 3-335 and 3-314 are widened toward the base 3-320 for facilitating the arrangement of the damping material 3-390. It should be noted that in the present embodiment, the size of the recess 3-335 of the holder 3-330 is different from the size of the recess 3-314 of the housing 3-310. For example, since the bottom surfaces of the holder 3-330 and the housing 3-310 are located on different horizontal surfaces (the X-Y planes), the recess 3-314 may extend lower than the recess 3-335. The present embodiment merely serves as an example, and those skilled in the art may adjust the sizes of the recesses 3-335 and 3-314 as required. In addition, in order to clearly show the structure of the recesses 3-335 and 3-314, the damping material 3-390 is illustrated between the recesses 3-335 and 3-314. In some embodiments, the damping material 3-390 may also be disposed in the recesses 3-335 and 3-314. That is, when viewed along the Z axis (the main axis 3-O), the damping material 3-390, the housing 3-310, and the holder 3-330 at least partially overlap.

Figure 22:
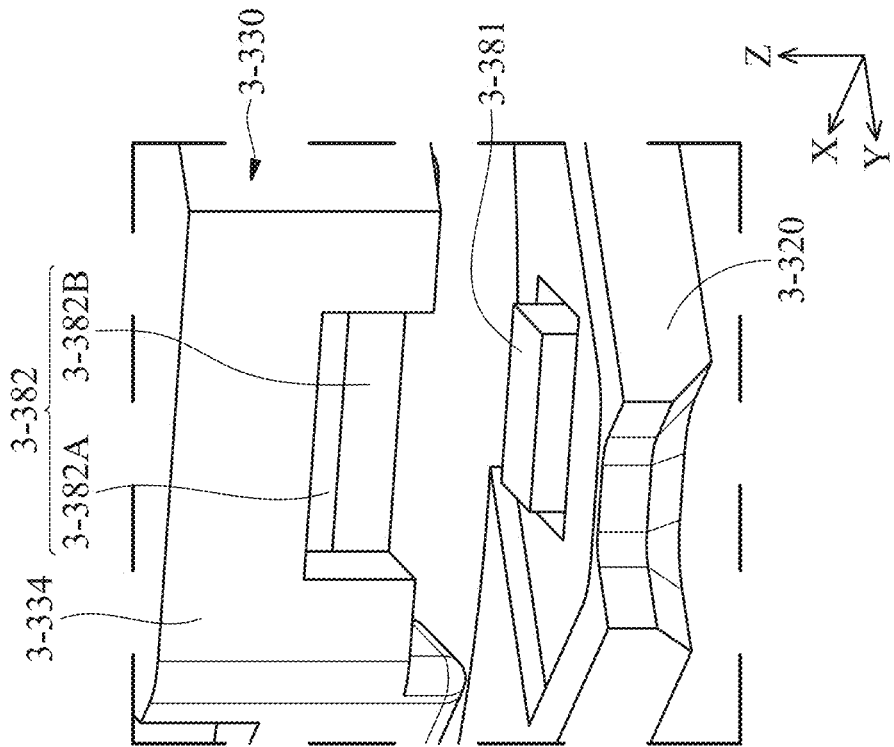
FIG. 22 is partial enlarged perspective view illustrating the interior structure of the optical member driving mechanism in accordance with an embodiment of the present disclosure.

FIG. 22 is partial enlarged perspective view illustrating the interior structure of the optical member driving mechanism 3-301 in accordance with an embodiment of the present disclosure. As shown in FIG. 22, the reference element 3-382 is exposed from the side surface 3-334 of the holder 3-330, and the side surface 3-334 is substantially perpendicular to the X-Y plane (i.e. substantially parallel to the main axis 3-O). In the present embodiment, when viewed in a direction (the Z axis) where the holder 3-330 moves, the reference element 3-382 and the sensor 3-381 at least partially overlap. The reference element 3-382 has two magnetic poles 3-382A and 3-382B, and the magnetic polarity of the magnetic poles 3-382A and 3-382B are opposite. When viewed in the direction (the Z axis) where the holder 3-330 moves, the magnetic poles 3-382A, 3-382B and the sensor 3-381 at least partially overlap.

Figure 23:
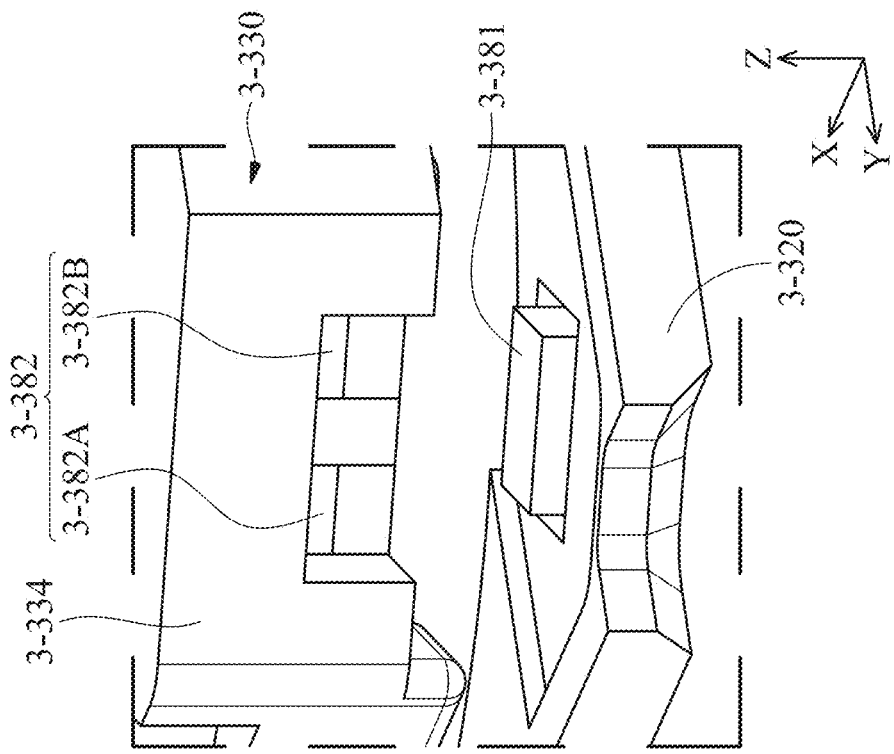
FIG. 23 partial enlarged perspective view illustrating the interior structure of the optical member driving mechanism in accordance with another embodiment of the present disclosure.

FIG. 23 partial enlarged perspective view illustrating the interior structure of the optical member driving mechanism 3-301 in accordance with another embodiment of the present disclosure. As shown in FIG. 23, the reference element 3-382 is a multi-polar magnet. In other words, the magnetic poles 3-382A, 3-382B (the magnetic polarity thereof are opposite) are separated in the reference element 3-382 and generate magnetic fields in different directions. In the present embodiment, the sensor 3-381 detects the change of the magnetic fields (which are generated by the magnetic poles 3-382A, 3-382B) in at least two directions, and the directions are perpendicular to each other. For example, at least one of the directions described above is substantially perpendicular to the direction in which the holder 3-330 moves.

Figure 24:
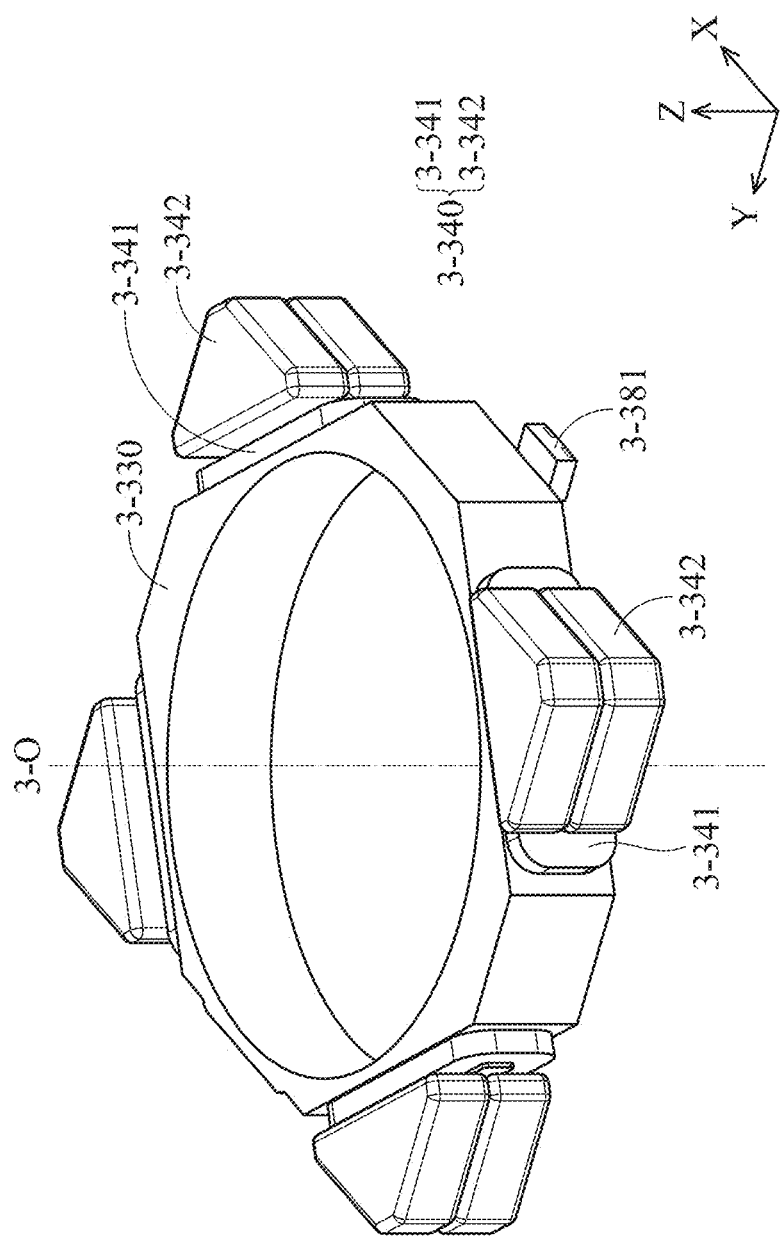
FIG. 24 is a perspective view illustrating the holder and the driving assemblies in accordance with another embodiment of the present disclosure.

FIG. 24 is a perspective view illustrating the holder 3-330 and the driving assemblies 3-340 in accordance with another embodiment of the present disclosure. As shown in FIG. 24, the optical member driving mechanism 3-301 may include a plurality of driving assemblies 3-340, which are each disposed at four corners of the optical member driving mechanism 3-301. The sensor 3-381 is disposed between two of the driving assemblies 3-340 (i.e. located on one side of the optical member driving mechanism 3-301). As such, the operation of the sensing assembly 3-380 may not experience interference from the driving assemblies 3-340. It should be appreciated that although the driving coil 3-341 is disposed on the holder 3-330, and the magnetic elements 3-342 are disposed out of the holder 3-330 in the present embodiment, however, in other embodiments, the magnetic elements 3-342 may be disposed on the holder 3-330, and the driving coil 3-341 may be disposed out of the holder 3-330. It will not be repeated in the following description.

As set forth above, the embodiments of the present disclosure provide an optical member driving mechanism including a damping material. The above design may make the holder move to a predetermined position more rapidly, and reduce the possibility of the collision between the holder and the housing. As such, the holder and the optical member held thereon may be protected. In addition, the reference element is disposed in the groove and covered by the damping material. Therefore, the reference element may be protected by the groove and the damping material, and the possibility that the reference element is damaged may be reduced.

Figure 25:
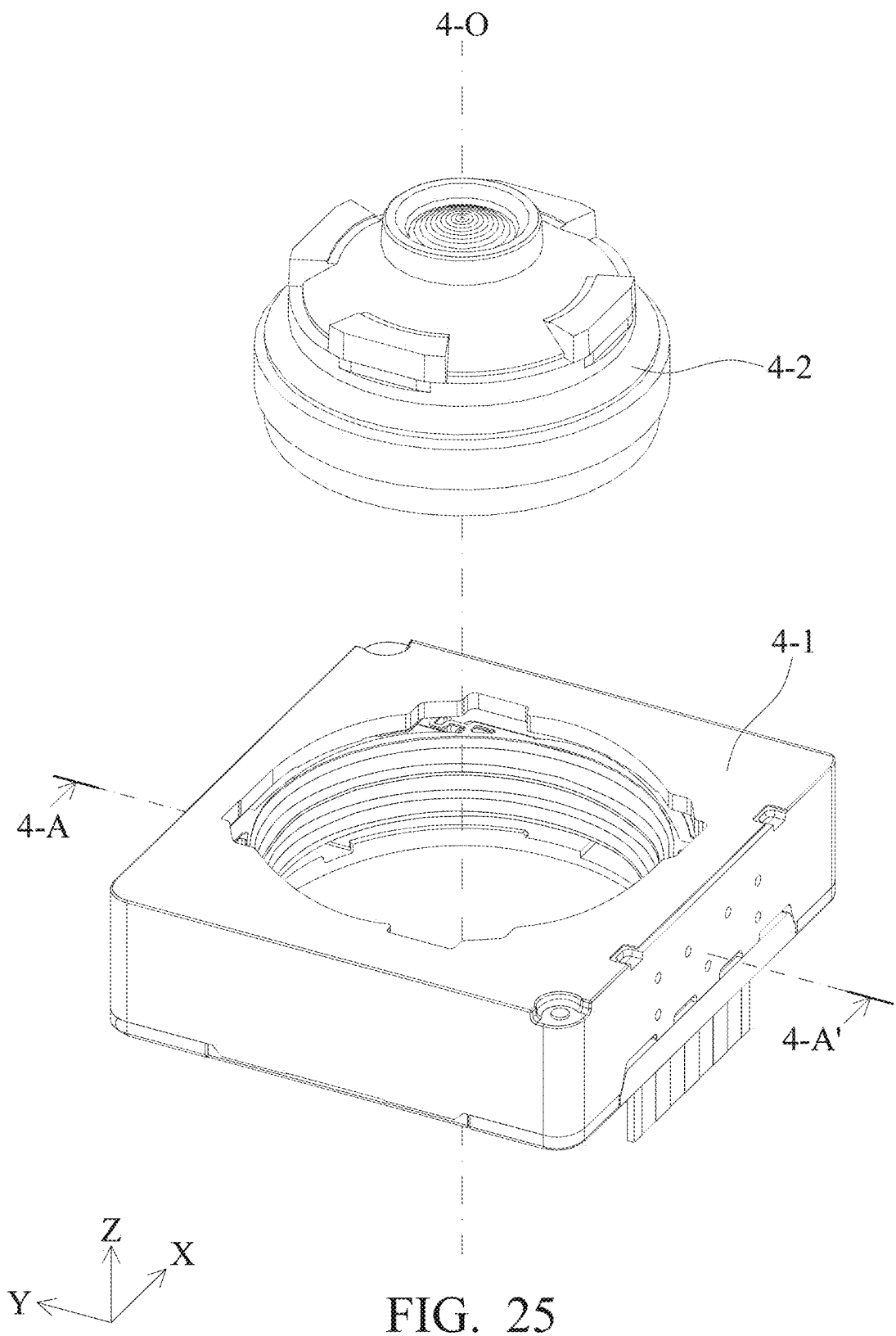
FIG. 25 is a perspective view of an optical element drive mechanism and an optical element in accordance with some embodiments of this disclosure.
Figure 26:
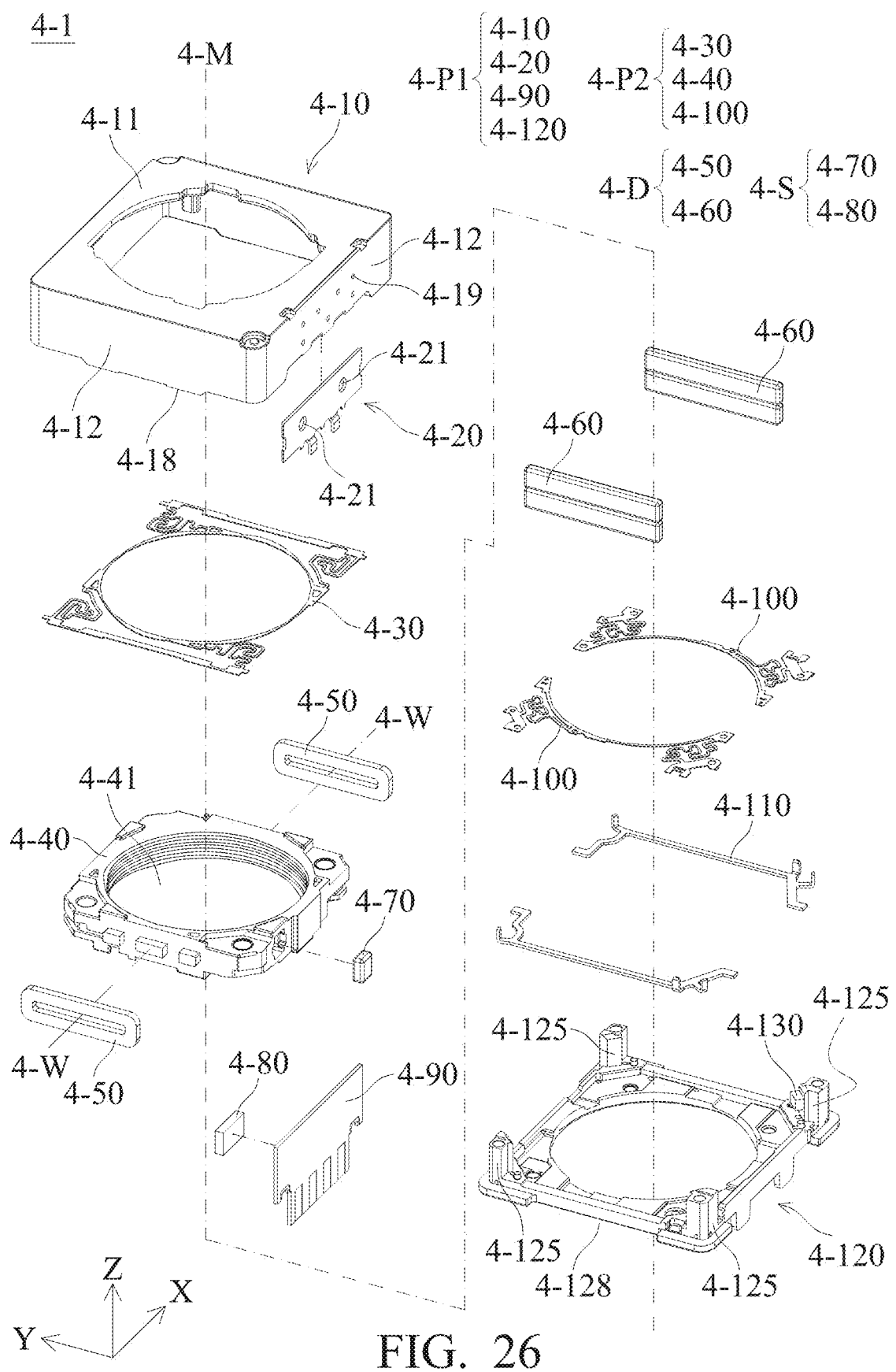
FIG. 26 is an exploded view of the optical element drive mechanism in FIG. 25.

FIG. 25 is a perspective view of an optical element drive mechanism 4-1 and an optical element 4-2 in accordance with some embodiments of this disclosure. The optical element 4-2 includes an optical axis 4-O. The optical axis 4-O is a virtual axis passing through the center of the optical element 4-2. FIG. 26 is an exploded view of the optical element drive mechanism 4-1 in FIG. 25. The optical element drive mechanism 4-1 includes an immovable part 4-P1, a movable part 4-P2, a drive assembly 4-D, and a sensing assembly 4-S. The movable part 4-P2 is movable relative to the immovable part 4-P1. The movable part 4-P2 holds the optical element 4-2. The drive assembly 4-D drives the movable part 4-P2 to move relative to the immovable part 4-P1. The sensing assembly 4-S senses the movement of the movable part 4-P2 relative to the immovable part 4-P1.

The immovable part 4-P1 has a main axis 4-M that passes through the center of the optical element drive mechanism 4-1. When the optical element drive mechanism 4-1, the optical element 4-2, and a light-detection element (not shown) (e.g. a charge-coupled detector, CCD) are aligned, the optical axis 4-O of the optical element 4-2 also passes through the center of the optical element drive mechanism 4-1, so that the optical axis 4-O of the optical element 4-2 coincides with the main axis 4-M of the immovable part 4-P1. However, movement, vibration, rotation, or tilt of the movable part 4-P2 may cause the optical axis 4-O of the optical element 4-2 to not coincide with the main axis 4-M of the immovable part 4-P1 because the optical element 4-2 is disposed in the movable part 4-P2. In the accompanying drawings, either the optical axis 4-O or the main axis 4-M is used to help to describe the features of the optical element drive mechanism 4-1.

In this embodiment, the immovable part 4-P1 includes a case 4-10, a strengthening element 4-20, a circuit assembly 4-90, and a bottom 4-120. The movable part 4-P2 includes a first elastic element 4-30, a holder 4-40, and two second elastic elements 4-100. The drive assembly 4-D includes two coils 4-50 and two magnetic elements 4-60. The sensing assembly 4-S includes a reference element 4-70 and a sensing element 4-80. It should be noted that the elements may be added or omitted according to the requirements of the users.

The case 4-10 and the bottom 4-120 of the immovable part 4-P1 are arranged along the main axis 4-M. The case 4-10 is disposed over the bottom 4-120. The case 4-10 may be made of metal material or non-metal material such as plastics. The case 4-10 made of a non-metal material may isolate electromagnetic wave. In this way, the electromagnetic wave interference generated by an antenna close to the optical element drive mechanism 4-1 may be reduced.

The case 4-10 made of plastic is usually manufactured by injection molding. Corresponding molds are designed according to the actual requirements, such as the structure of the case 4-10. The case 4-10 is manufactured by operations including assembling the molds to generate high pressure (closing the molds), injecting high-temperature melting plastic (injection), maintaining pressure (pressure-maintenance), decreasing the temperature to make the product shaped (cooling), opening the molds, and ejecting the product (ejection). During the process of injection molding, the parameters including the flow properties of the material, the amount of material, the melting temperature should be taken into account.

The case 4-10 includes a top wall 4-11 and four sidewalls 4-12. Each sidewall 4-12 extends from the outer edge (far away from the main axis 4-M) of the top wall 4-11 along the main axis 4-M. The sidewalls 4-12 of the case 4-10 are fixedly connected to the bottom 4-120. After the case 4-10 is connected to the bottom 4-120, the space formed therein may accommodate the movable part 4-P2, the drive assembly 4-D, and the sensing assembly 4-S, etc.

The strengthening element 4-20 is disposed in the case 4-10. The whole strengthening element 4-20 or part of the strengthening element 4-20 is not revealed from the case 4-10. In some embodiments, the whole surface of the strengthening element 4-20 is in direct contact with one of the sidewalls 4-12 of the case 4-10. The strengthening element 4-20 is made of material that has higher hardness than the case 4-10, such as metal. In some embodiments, the strengthening element 4-20 is made of iron. To prevent electromagnetic wave interference, the antenna close to the optical element drive mechanism 4-1 is not disposed on the side that is adjacent to the strengthening element 4-20.

It should be noted that, the sidewall 4-12 that is adjacent to the strengthening element 4-20 has a plurality of holes 4-19. The molds (e.g. cylindrical molds) may pass through the holes 4-19 for affixing the strengthening element 4-20. Additionally, heat may be dissipated via the holes 4-19. Furthermore, the strengthening element 4-20 has two hollows 4-21. During the manufacture of the optical element drive mechanism 4-1, melting plastic material for forming the case 4-10 may enter the hollows 4-21 under high temperature, thereby forming the bond between the case 4-10 and the strengthening element 4-20. That is, the hollows 4-21 may increase the contact area between the case 4-10 and the strengthening element 4-20 and strengthen the connection between the case 4-10 and the strengthening element 4-20.

The circuit assembly 4-90 is disposed on one side of the optical element drive mechanism 4-1. The circuit assembly 4-90 may be a circuit board, such as a flexible printed circuit (FPC) or a flexible-hard composite board. The bottom 4-120 further comprises two circuit members 4-110. The whole circuit members 4-110 or part of the circuit members 4-110 are embedded in the bottom 4-120 for electrical connection to other elements. For example, the bottom 4-120 includes four pillars 4-125. Part of the circuit members 4-110 is embedded in the pillars 4-125. Therefore, the circuit member 4-110 is not only electrically connected to the bottom 4-120 but also increases the mechanical strength of the optical element drive mechanism 4-1.

In some embodiments, the optical element drive mechanism 4-1 further includes four damping elements 4-130 disposed on the pillars 4-125. For clarity of illustration, only one damping element 4-130 is shown here. The damping elements 4-130 are disposed between the holder 4-40 and the pillars 4-125. The pillars 4-125 may include step-like shape to prevent the flow of the damping elements 4-130. The damping elements 4-130 are made of material that may absorb shock and may inhibit vibration, such as a gel. When the optical element drive mechanism 4-1 is impacted by an external force, the damping elements 4-130 may prevent a severe collision between the movable part 4-P2 and the immovable part 4-P1. Furthermore, the damping elements 4-130 may help the holder 4-40 to return to its original position quickly when it is impacted and may prevent the optical element 4-2 in the holder 4-40 from being unstable. Therefore, the damping elements 4-130 may improve the reaction time and the accuracy of the holder 4-40 during its movement.

The first elastic element 4-30, the holder 4-40, and the second elastic elements 4-100 of the movable part 4-P2 are sequentially arranged along the main axis 4-M. The holder 4-40 includes a through hole 4-41 for holding the optical element 4-2. A screw and its corresponding threaded structure may be configured between the through hole 4-41 and the optical element 4-2, so that the optical element 4-2 may be affixed in the holder 4-40.

The first elastic element 4-30 and the second elastic elements 4-100 may be made of metal. The holder 4-40 is movably connected to the case 4-10 and the bottom 4-120 of the immovable part 4-P1 by the first elastic element 4-30 and the second elastic element 4-100. In detail, part of the bottom 4-120 is connected to the top surface of the holder 4-40 via the first elastic element 4-30 and part of the bottom 4-120 is connected to the bottom surface of the holder 4-40 via the second elastic element 4-100.

Held between the first elastic element 4-30 and the second elastic elements 4-100, the holder 4-40 is not in direct contact with the case 4-10 and the bottom 4-120. Additionally, the range of movement of the holder 4-40 is restricted to prevent the holder 4-40 and the optical element 4-2 therein from being damaged because of collision with the case 4-10 or the bottom 4-120 when the optical element drive mechanism 4-1 moves or is impacted.

The positions of the coils 4-50 of the drive assembly 4-D correspond to the positions of the magnetic elements 4-60 of the drive assembly 4-D. The coils 4-50 and the magnetic elements 4-60 are disposed close to the holder 4-40. The magnetic elements 4-60 may be permanent magnets. The magnetic elements 4-60 may be multi-poles magnets or may be formed by adhesion between multiple magnets. The arrangement direction of two pairs of magnetic poles (N-pole and S-pole) of each of the magnetic elements 4-60 is perpendicular to the main axis 4-M. The profile of each of the coils 4-50 and the profile of each of the magnetic elements 4-60 are substantially rectangular. The long sides of the coils 4-50 correspond to the long sides of the magnetic elements 4-60. When the current is supplied to the coils 4-50, magnetic force is generated between the coils 4-50 and the magnetic elements 4-60. The magnetic force drives the holder 4-40 and the optical element 4-2 therein to move in a direction that is parallel with the optical axis 4-O to achieve auto focus (AF) to focus on the object in the image to be captured. Each of the coils 4-50 has a wind axis 4-W. The wind axis 4-W is substantially perpendicular to the main axis 4-M. Each of the coils 4-50 is formed by surrounding the wind axis 4-W. Comparing to the configuration that the wind axis 4-W is parallel with the main axis 4-M, the coils 4-50 of this embodiment may reduce the size of the optical element drive mechanism 4-1 in a direction that is perpendicular to the main axis 4-M.

Figure 34:
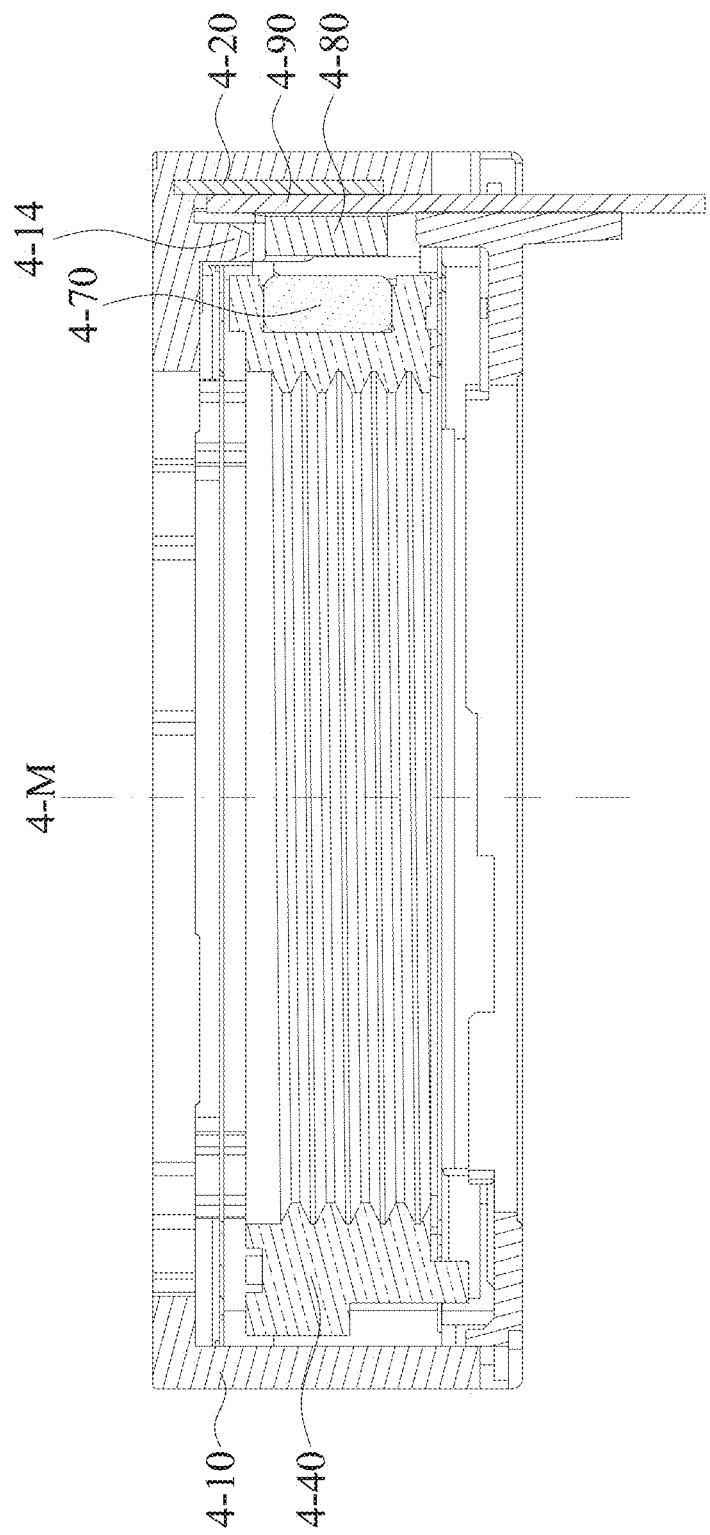
FIG. 34 is a cross-sectional view of the optical element drive mechanism along line 4-A-4-A' in FIG. 25.

The position of the reference element 4-70 of the sensing assembly 4-S corresponds to the position of the sensing element 4-80 of the sensing assembly 4-S (as shown in FIG. 34). The reference element 4-70 is received in the holder 4-40. The sensing element 4-80 is mounted on the circuit assembly 4-90 by methods such as surface mount technology (SMT), and the sensing element 4-80 is electrically connected to the circuit assembly 4-90. The reference element 4-70 may be a magnetic element such as a magnet. The sensing element 4-80 may be a Hall sensor, a giant magneto resistance (GMR) sensor, a tunneling magneto resistance (TMR) sensor, and the like. When the holder 4-40 moves, the reference element 4-70 disposed on the holder 4-40 also moves. Therefore, the magnetic field of the reference element 4-70 changes. The sensing element 4-80 may sense the change of the magnetic field of the reference element 4-70 to know the position of the holder 4-40. Furthermore, the position of the holder 4-40 may be further adjusted, so that the displacement of the holder 4-40 may be accurately controlled.

Figure 27:
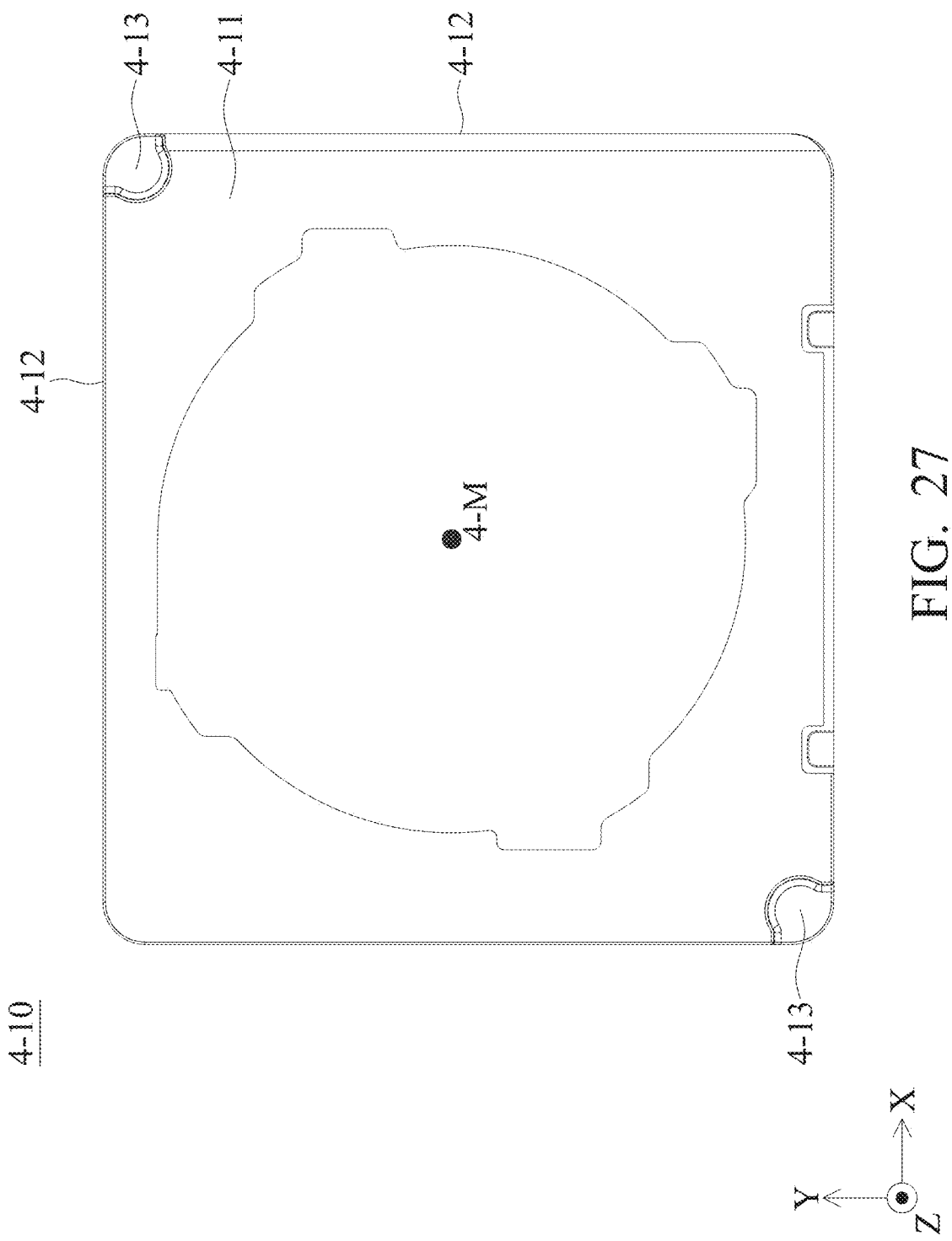
FIG. 27 is a top view of a case.

FIG. 27 is a top view of the case 4-10. The case 4-10 is polygonal. In this embodiment, the case 4-10 is rectangular. The case 4-10 includes two concavities 4-13. Two concavities 4-13 are formed on different corners of the case 4-10 when viewed from the main axis 4-M. During the injection molding of the case 4-10, the concavities 4-13 are used as sprues. The material is injected via the concavities 4-13. If there is only one sprue, the flow of the material may not be uniform.

Figure 28:
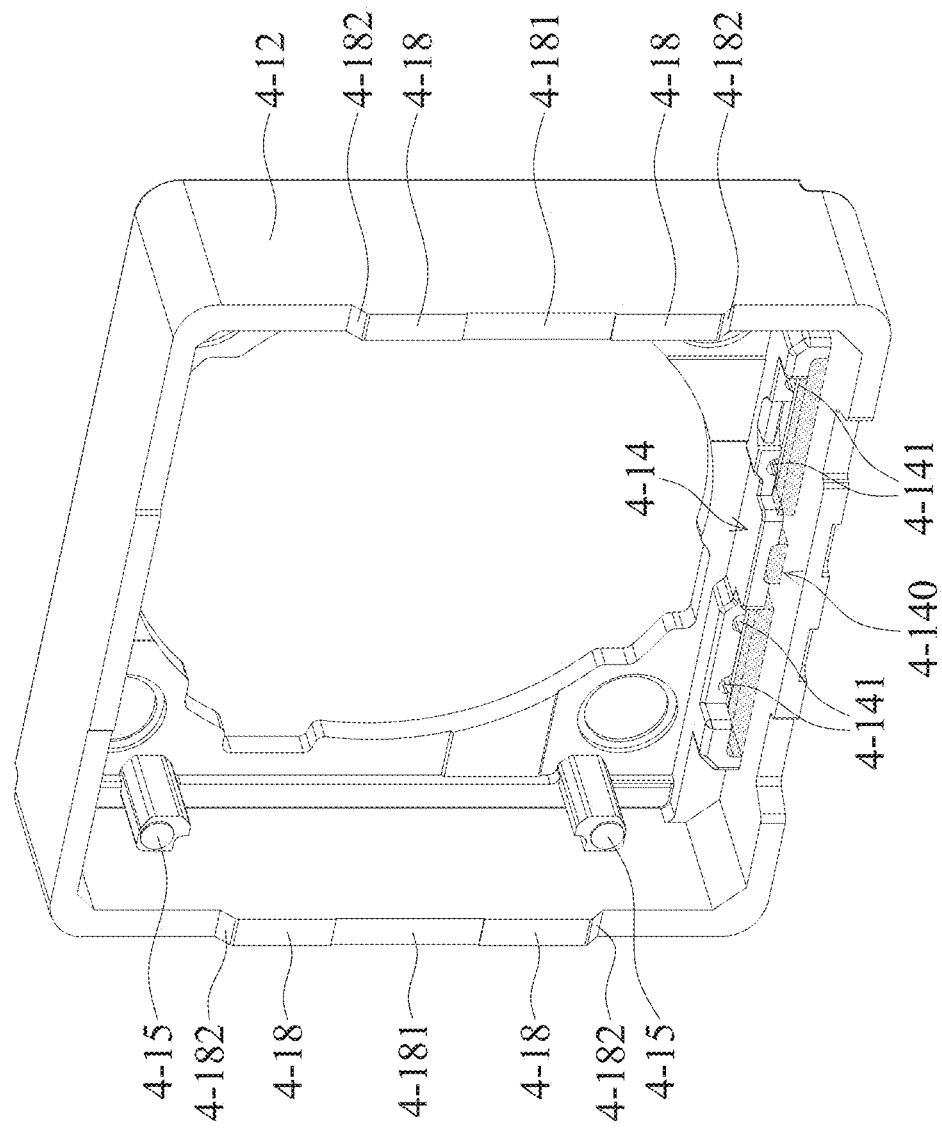
FIG. 28 and FIG. 29 are perspective views of the case from different perspectives.
Figure 29:
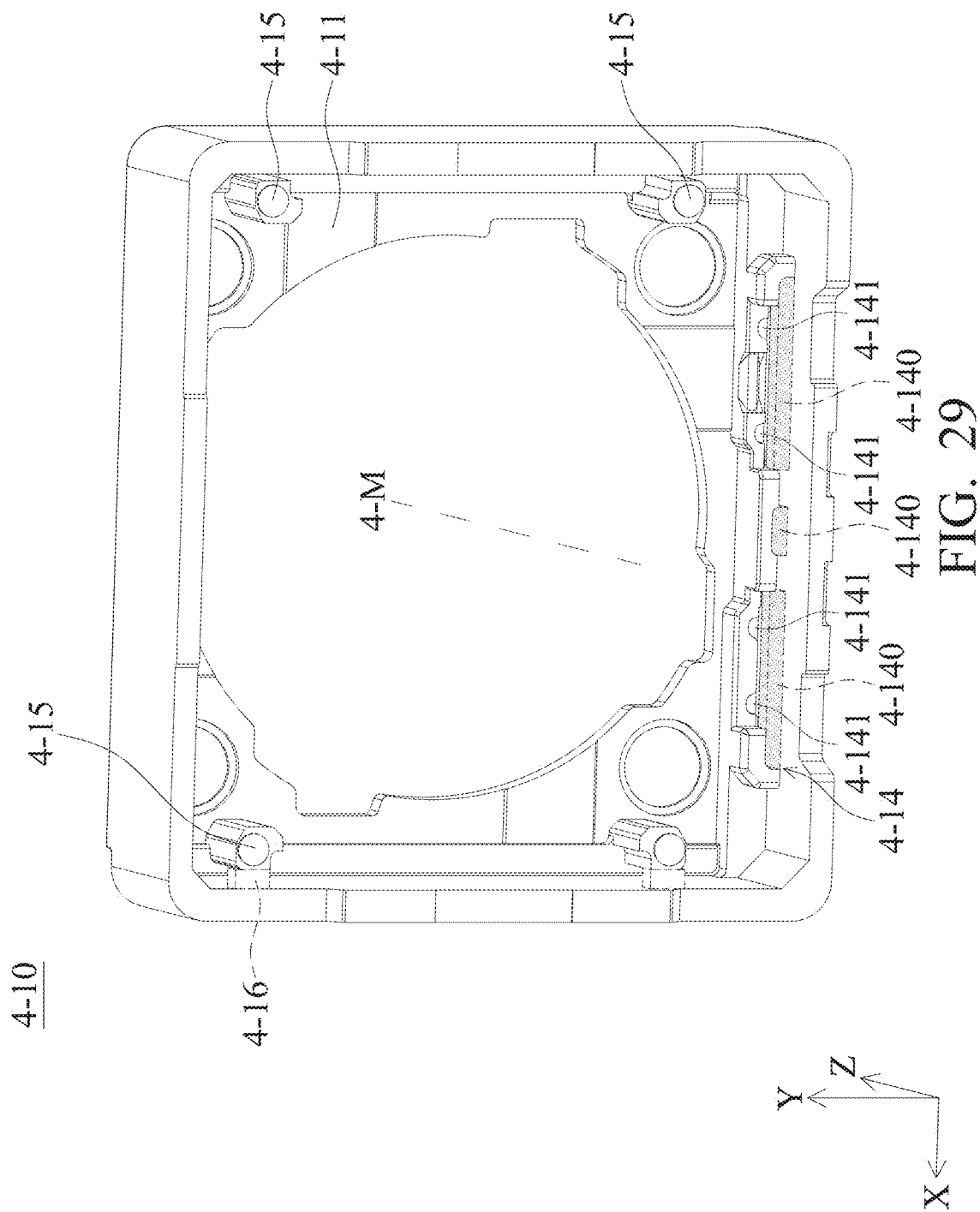

FIG. 28 and FIG. 29 are perspective views of the case 4-10 from different perspectives. The case 4-10 includes a receiving structure 4-14 for receiving the circuit assembly 4-90. To clearly show the receiving structure 4-14, the circuit assembly 4-90 is not shown in FIG. 28 and FIG. 29. Please refer to FIG. 34 and FIG. 39 to understand how the receiving structure 4-14 receives the circuit assembly 4-90. Please refer to FIG. 28 and FIG. 29 again. The receiving structure 4-14 extends from the top wall 4-11 of the case 4-10. The receiving structure 4-14 includes at least one narrow portion 4-141 corresponding to the circuit assembly 4-90. The receiving structure 4-14 may affix the circuit assembly 4-90. The narrow portion 4-141 is advantageous for increasing the structural strength of the molds during the shaping of the product. It is because that molds with specific shape are required to form the receiving structure 4-14. If there is no narrow portion 4-141 formed on the receiving structure 4-14, then the space inside the receiving structure 4-14 is substantially cuboid, the molds for forming the receiving structure 4-14 should also be cuboid. The cuboid molds may be more likely to break or become damaged with repeated use. However, if a bump-like structure is formed on the cuboid molds, such molds have stronger strength during the shaping of the product and thus the narrow portion 4-141 is formed on the receiving structure 4-14.

The optical element drive mechanism 4-1 may further include an adhesion element 4-140. The adhesion element 4-140 may be adhesion material or insulation material, such as resin. Different elements may be adhered to each other by the adhesion element 4-140. Furthermore, the adhesion element 4-140 generally has good elasticity and good covering ability and thus the adhesion element 4-140 may protect the elements. Additionally, the adhesion element 4-140 may reduce the probability of particles such as dust or mist entering the elements. If the adhesion element 4-140 is made of insulation material, insulation may be achieved. The operation for applying the adhesion element 4-140 is generally referred to as "glue dispensing", which may be conducted manually or mechanically.

After the circuit assembly 4-90 is disposed in the receiving structure 4-14, the adhesion element 4-140 may be applied on the circuit assembly 4-90. For example, the adhesion element 4-140 may be applied on three positions (including the center and the two sides of the circuit assembly) to strengthen the connection between the circuit assembly 4-90 and the case 4-10. In some embodiments, the adhesion element 4-140 is in direct contact with the circuit assembly 4-90, the sidewalls 4-12 of the case 4-10, and the receiving structure 4-14, so that the circuit assembly 4-90 does not move or collide with other elements.

Figure 30:
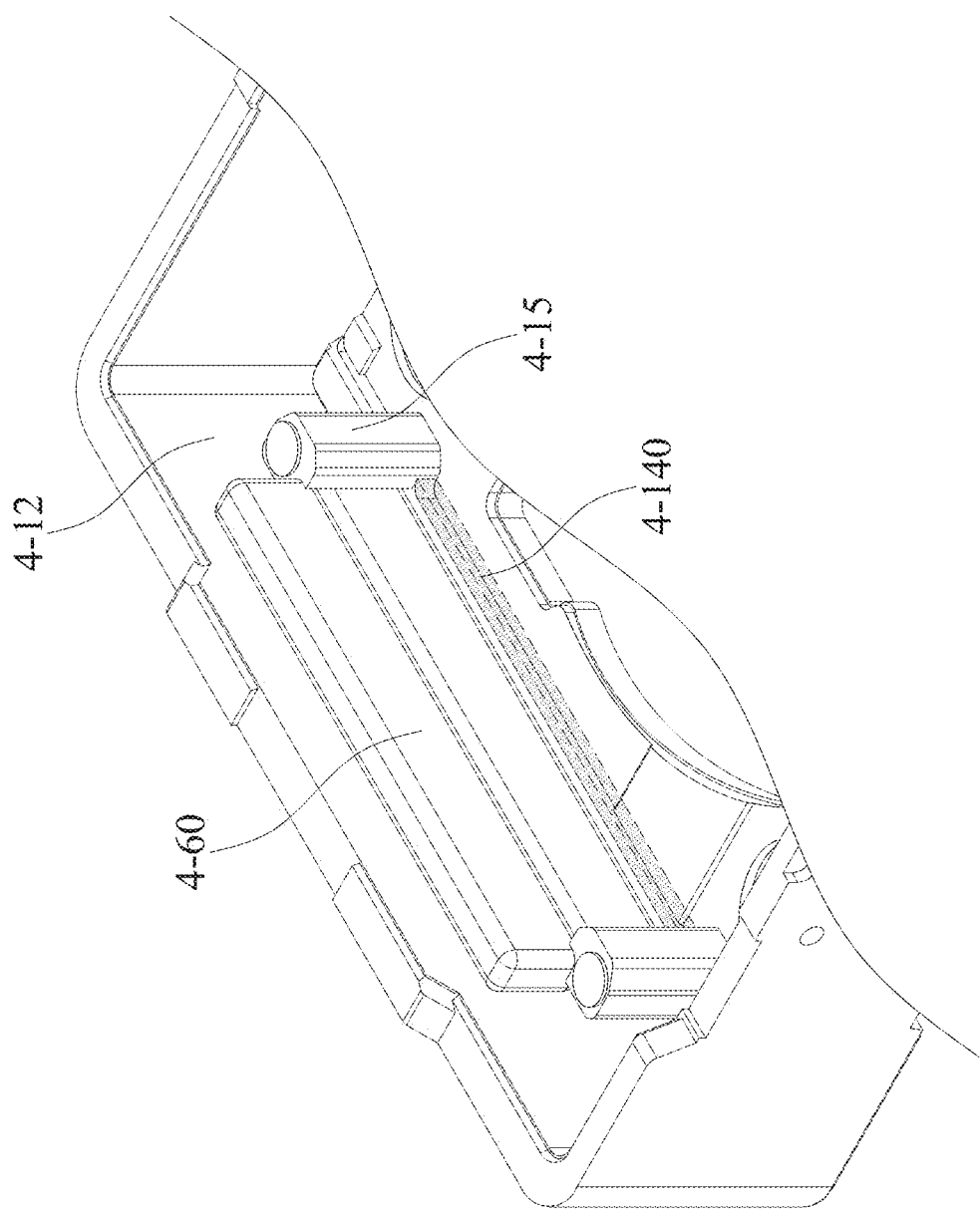
FIG. 30 is a perspective view of part of the case.

As shown in FIG. 29, the case 4-10 includes four affixing structures 4-15 for affixing the magnetic elements 4-60 of the drive assembly 4-D. If the case 4-10 is made of metal material or magnetic material, magnetic force may be generated between the case 4-10 and the magnetic elements 4-60 for affixing the magnetic elements 4-60. However, if the generated magnetic force is not enough or the case 4-10 is made of a non-metal material, the case 4-10 with the affixing structures 4-15 may affix the magnetic elements 4-70 better. FIG. 30 is a perspective view of part of the case 4-10, illustrating how the affixing structures 4-15 affix the magnetic elements 4-60. Also, the adhesion element 4-140 may be applied between the magnetic elements 4-60 and the case 4-10.

Figure 31:
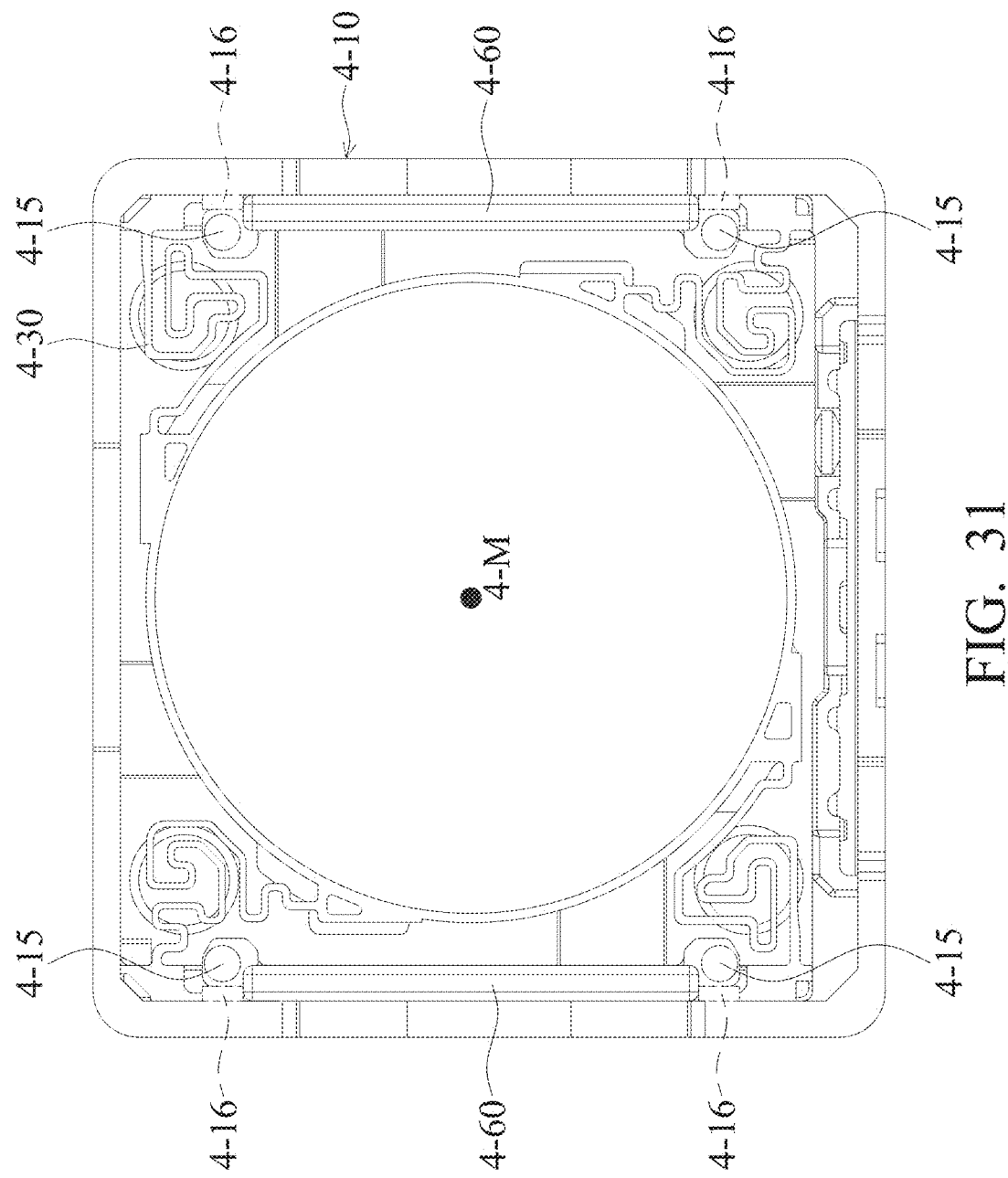
FIG. 31 is a bottom view of the case.
Figure 32:
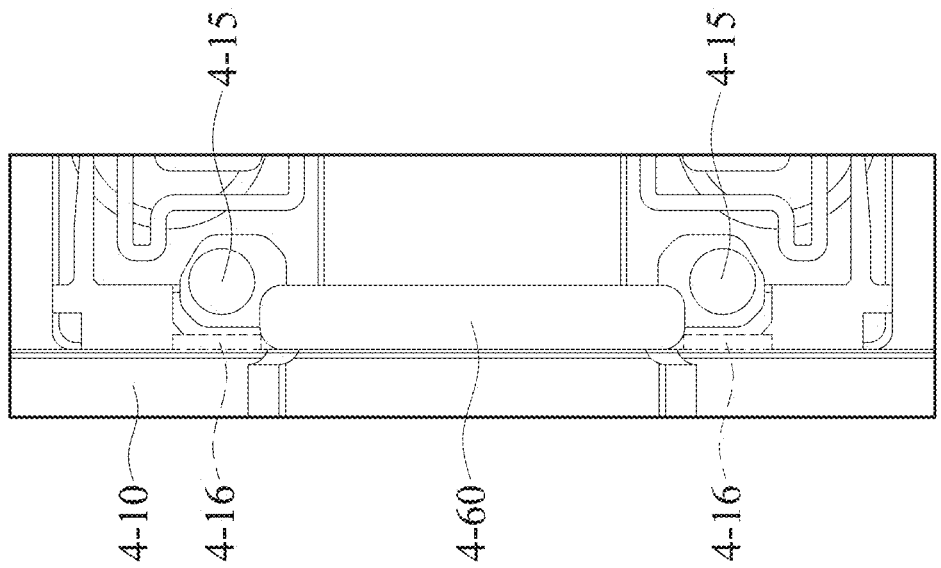
FIG. 32 is a bottom view of part of the case.

In FIG. 31 and FIG. 32, the first elastic element 4-30 is further shown. FIG. 31 is a bottom view of the case 4-10. FIG. 32 is a bottom view of part of the case 4-10. As shown in FIG. 31 and FIG. 32, the affixing structures 4-15 are not in direct contact with the sidewalls 4-12. A gap 4-16 (shown in dotted lines) is formed between the affixing structures 4-15 and the sidewalls 4-12. For consideration of the first elastic element 4-30 to be complete and prevent the first elastic element 4-30 from broken, part of the first elastic element 4-30 is disposed in the gap 4-16.

It should be noted that, the adhesion element 4-140 may be disposed in the gap 4-16, so that the adhesion element 4-140 is in contact with the case 4-10, the first elastic element 4-30, and the magnetic elements 4-60. Since the adhesion element 4-140 is able to flow, the adhesion element 4-140 may be distributed on the surface of the first elastic element 4-30 and the surface of the magnetic elements 4-60. In this way, the adhesion element 4-140 is only applied (i.e. glue dispensing) at one time and the case 4-10, the first elastic element 4-30, and the magnetic elements 4-60 are adhered to each other at the same time. Comparing to the circumstances that the adhesion between the case 4-10 and the first elastic element 4-30 and the adhesion between the case 4-10 and the magnetic elements 4-60 are conducted respectively, multiple elements that are adhered to each other at the same time may simplify the process, enhance the production efficiency, and increase the adhesion strength.

Figure 33:
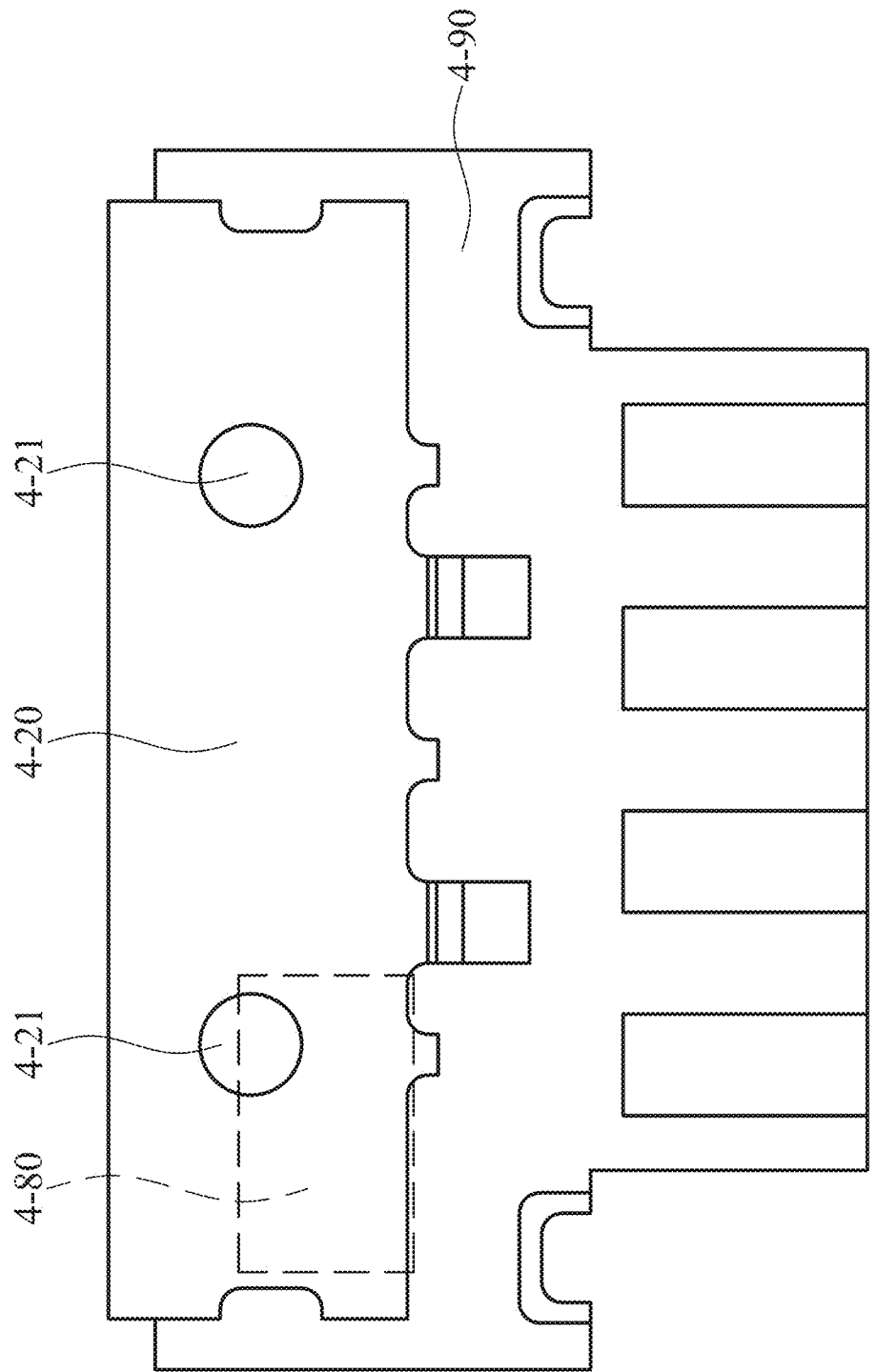
FIG. 33 is a schematic view of a strengthening element and a circuit assembly.

FIG. 33 is a schematic view of the strengthening element 4-20 and the circuit assembly 4-90. The strengthening element 4-20 corresponds to the sensing element 4-80 on the circuit assembly 4-90. That is, the strengthening element 4-20 at least partially overlaps the sensing element 4-80 when viewed from a direction that is perpendicular to the main axis. Therefore, the strengthening element 4-20 may protect the sensing element 4-80.

FIG. 34 is a cross-sectional view of the optical element drive mechanism 4-1 along line 4-A-4-A' in FIG. 25. The case 4-10 at least partially overlaps the circuit assembly 4-90 when viewed from a direction that is perpendicular to the main axis 4-M. Also, the strengthening element 4-20 may also increase the structural strength of the case 4-10. In this embodiment, the strengthening element 4-20, the reference element 4-70, the sensing element 4-80, and the circuit assembly 4-90 at least partially overlap to each other when viewed from a direction that is perpendicular to the main axis 4-M.

Figure 35:
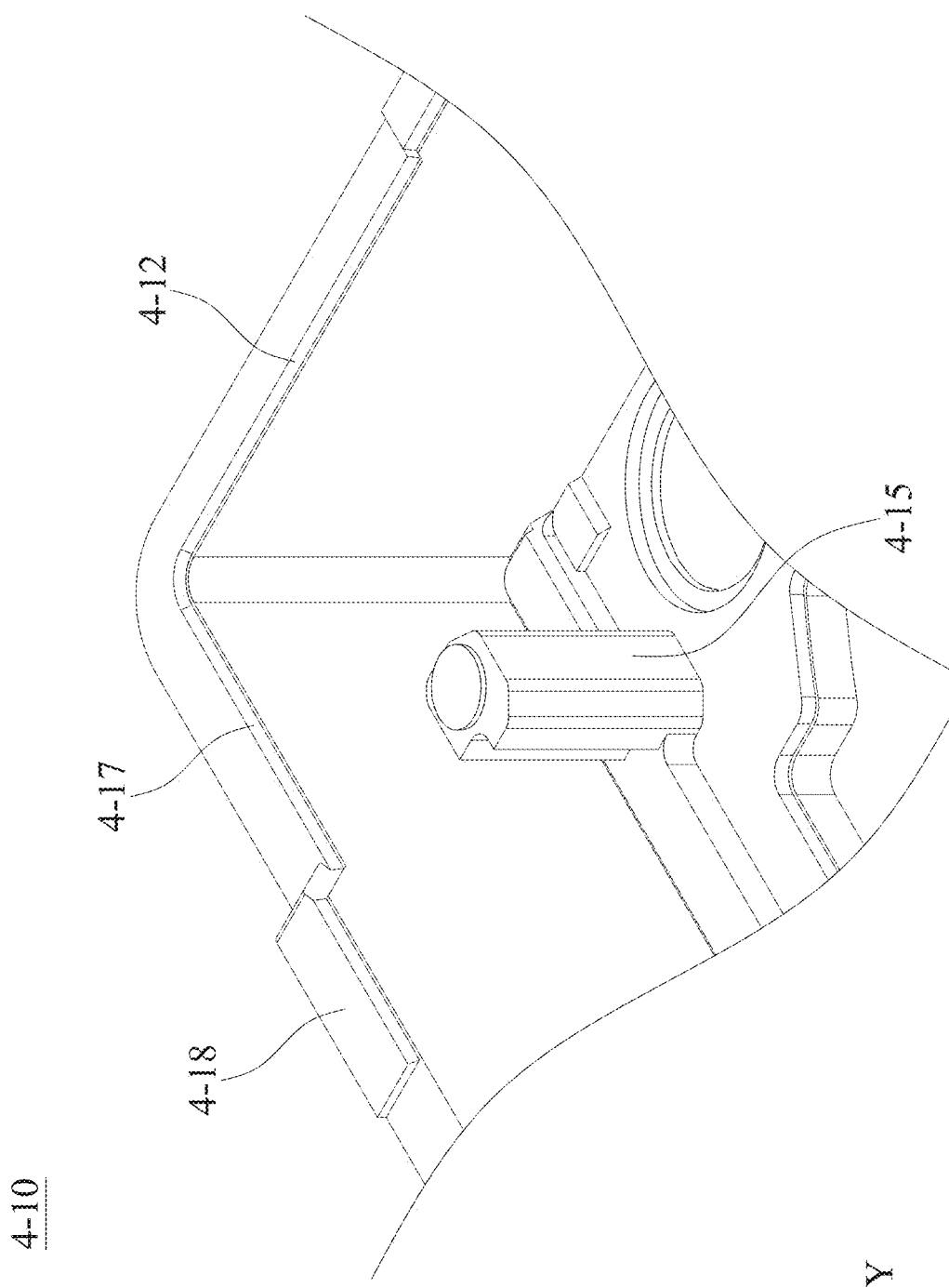
FIG. 35 is a perspective view of part of the case.
Figure 36:
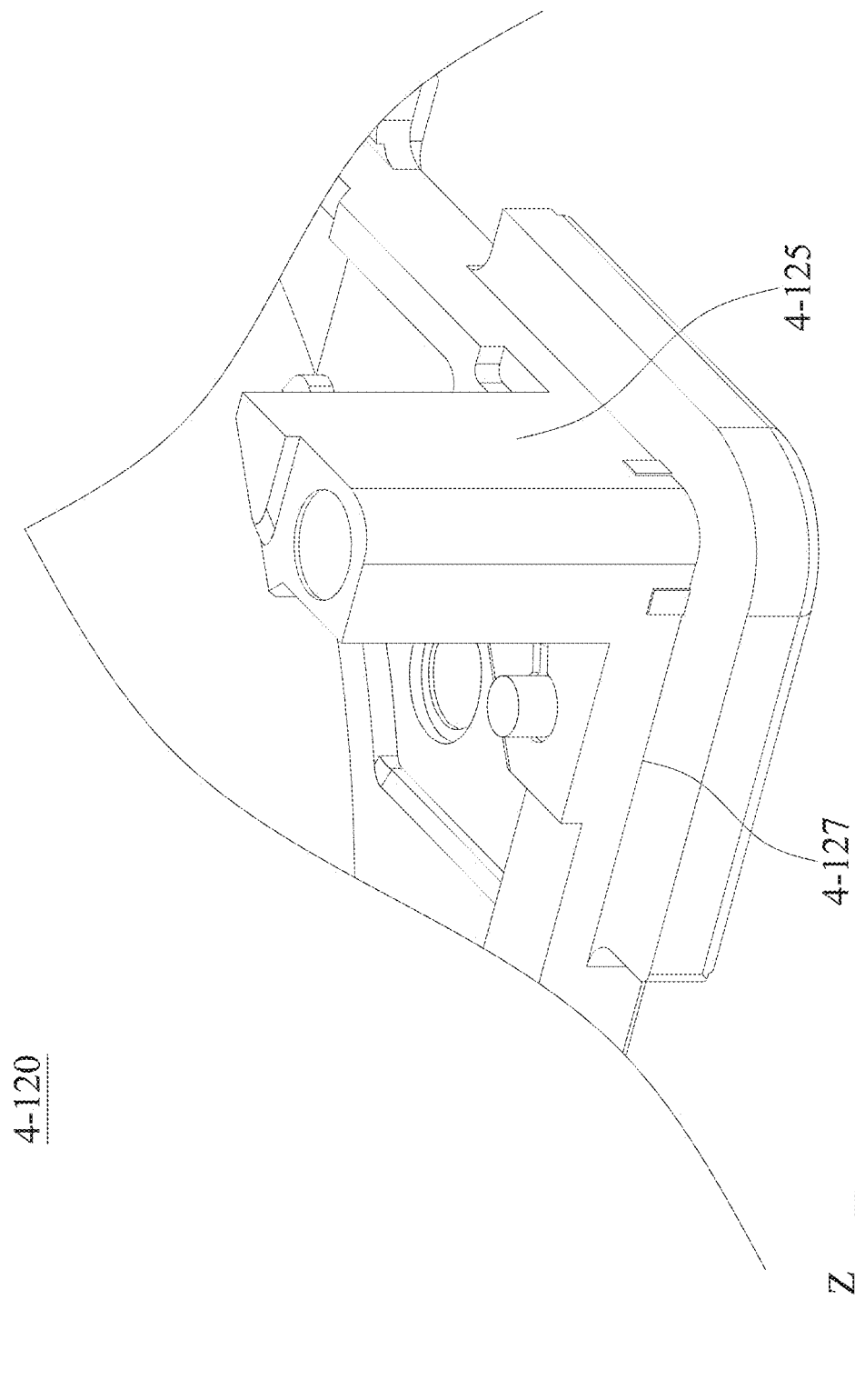
FIG. 36 is a perspective view of part of the bottom.
Figure 37:
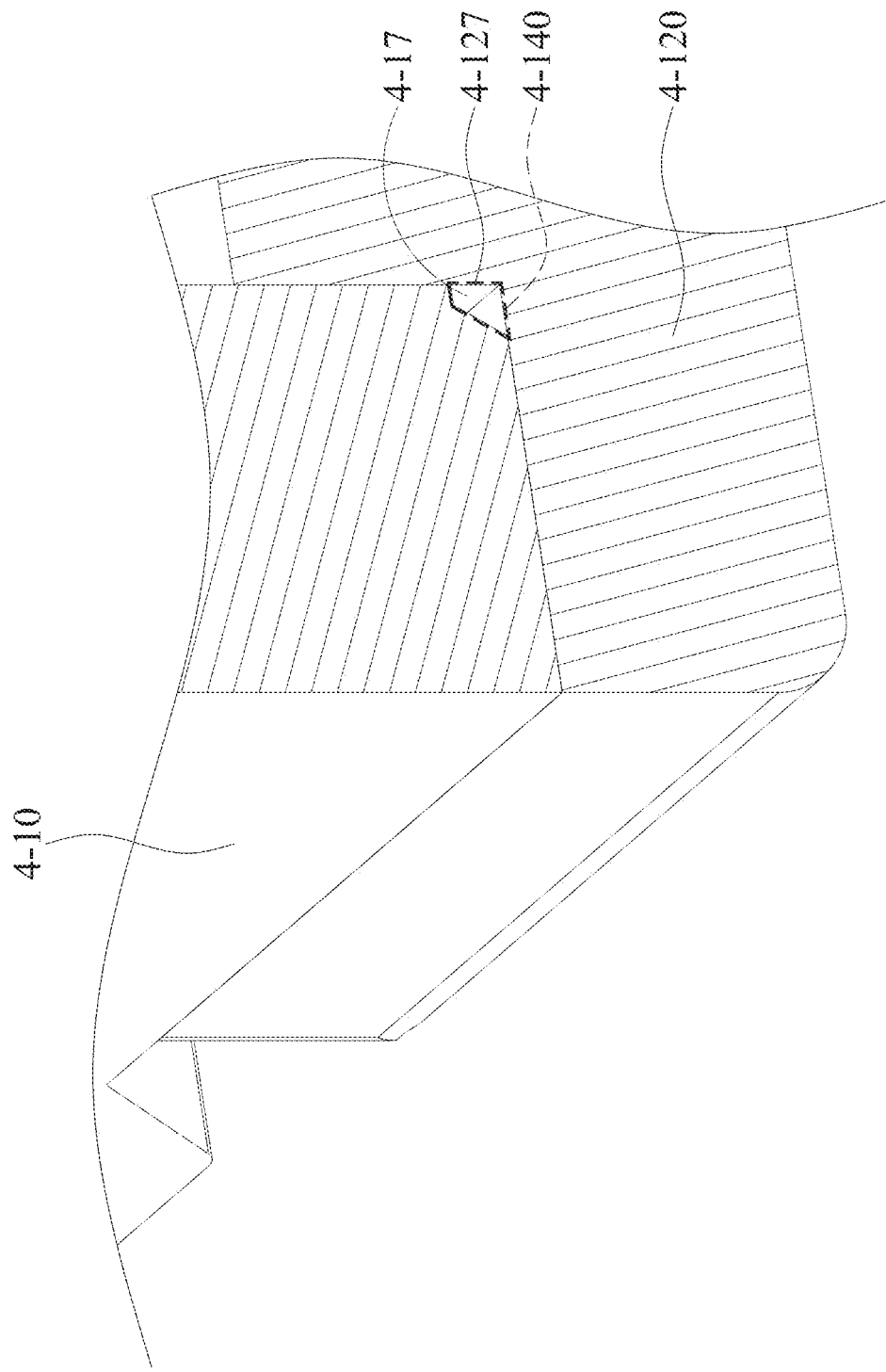
FIG. 37 is a schematic view of part of the case and part of the bottom.

Next, please refer to FIG. 35 to FIG. 37. FIG. 35 is a perspective view of part of the case 4-10. FIG. 36 is a perspective of part of the bottom 4-120. FIG. 37 is a schematic view of part of the case 4-10 and part of the bottom 4-120. At least one of the sidewalls 4-12 of the case 4-10 includes a groove 4-17 close to the bottom 4-120. The bottom 4-120 includes a recess 4-127 corresponding to the groove 4-17. When the case 4-10 is connected to the bottom 4-120, space is formed between the groove 4-17 and the bottom 4-120, so that the case 4-10 and the bottom 4-120 do not belong to close fit. When manufactured, the case 4-10 made of plastic may generate some flock or burr. The groove 4-17 is formed by cutting part of the case 4-10, so as to prevent flock or burr exceeds the assembly surface of the case 4-10 and the bottom 4-120 when the case 4-10 assembled to the bottom 4-120. Also, it is difficult for the plastic parts to generate a right angle that is exactly 4-90 degrees. The existence of the groove 4-17 is advantageous for the assembling process. Additionally, the adhesion element 4-140 may be disposed in the groove 4-17 to strengthen the connection between the case 4-10 and the bottom 4-120.

Figure 38:
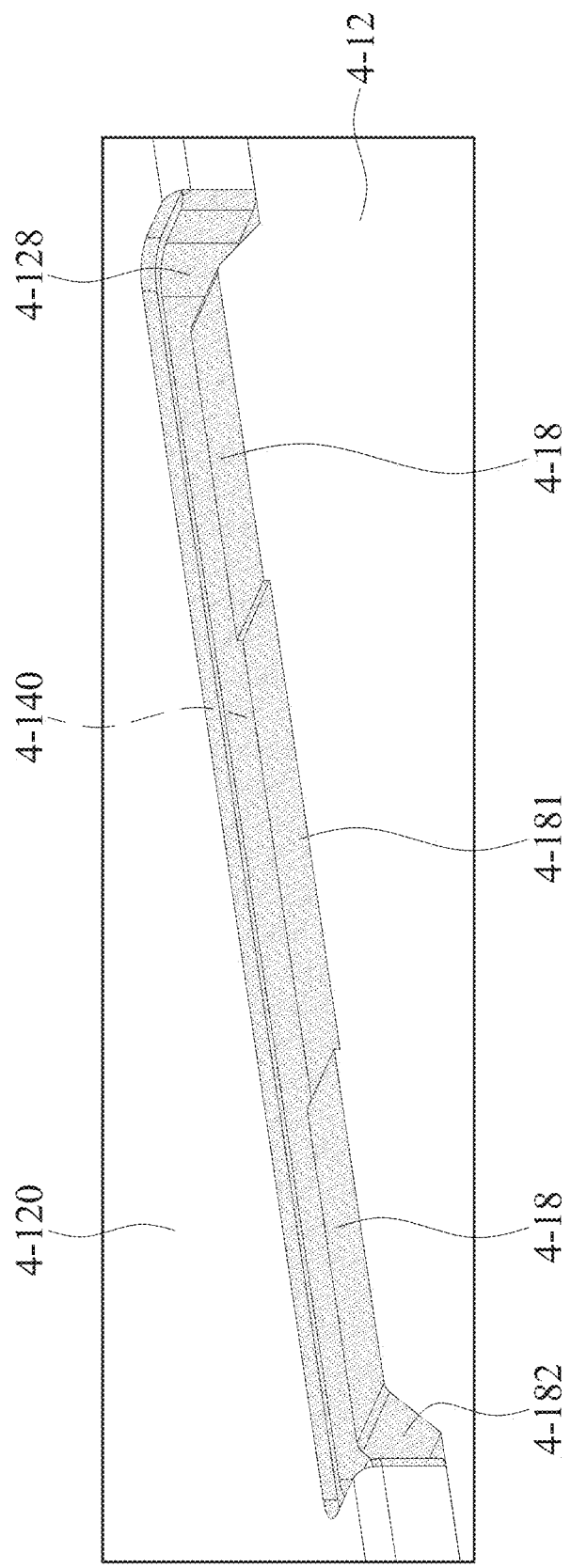
FIG. 38 is a perspective view of part of the case and part of the bottom.

FIG. 38 is a perspective view of part of the case 4-10 and part of the bottom 4-120. Please refer to FIG. 28 again. The case 4-10 includes four protrusions 4-18. Two of the protrusions 4-18 are disposed on one side of the sidewalls 4-12 while the other two of the protrusions 4-18 are disposed on the opposite side of the sidewalls 4-12. The case 4-10 includes an inwardly sunken portion 4-181 located on the center of each of the protrusions 4-18. An inclined surface 4-182 is located on the edge of each of the protrusions 4-18. The inwardly sunken portion 4-181 may be the position that the case 4-10 is ejected during the manufacture of the case 4-10. Please refer to FIG. 38 again. The bottom 4-120 includes two openings 4-128, and only one of the openings 4-128 is shown here. The shape of the protrusion 4-18 of the case 4-10 correspond to that of the opening 4-128 of the bottom 4-120 and the protrusion 4-18 and the inwardly sunken portion 4-181 are located in the opening 4-128. The protrusion 4-18 at least partially overlaps the opening 4-128 when viewed from a direction that is perpendicular to the main axis 4-M. This design allows the case 4-10 to be connected to the bottom 4-120 more closely.

The adhesion element 4-140 may be disposed on the protrusion 4-18 of the sidewall 4-12 of the case 4-10 and in the opening 4-128 of the bottom 4-120, so that the adhesion element 4-140 is in contact with the sidewall 4-12 of the case 4-10, the protrusion 4-18 of the case 4-10, and the opening 4-128 of the bottom 4-120. As described above, since the adhesion element 4-140 is able to flow, the adhesion element 4-140 may flow to the inwardly sunken portion 4-181 located on the center of the protrusion 4-18 and the inclined surface 4-182 located on the edge of the protrusion 4-18. Since the inclined surface 4-182 is inclined, which is advantageous for the flow of the adhesion element 4-140, the inclined surface 4-182 may receive the adhesion element 4-140. Also, when the amount of adhesion element 4-140 is excessive, the adhesion element 4-140 may accumulate on the inclined surface 4-182. Then, the excessive adhesion element 4-140 may be removed manually or mechanically.

Figure 39:
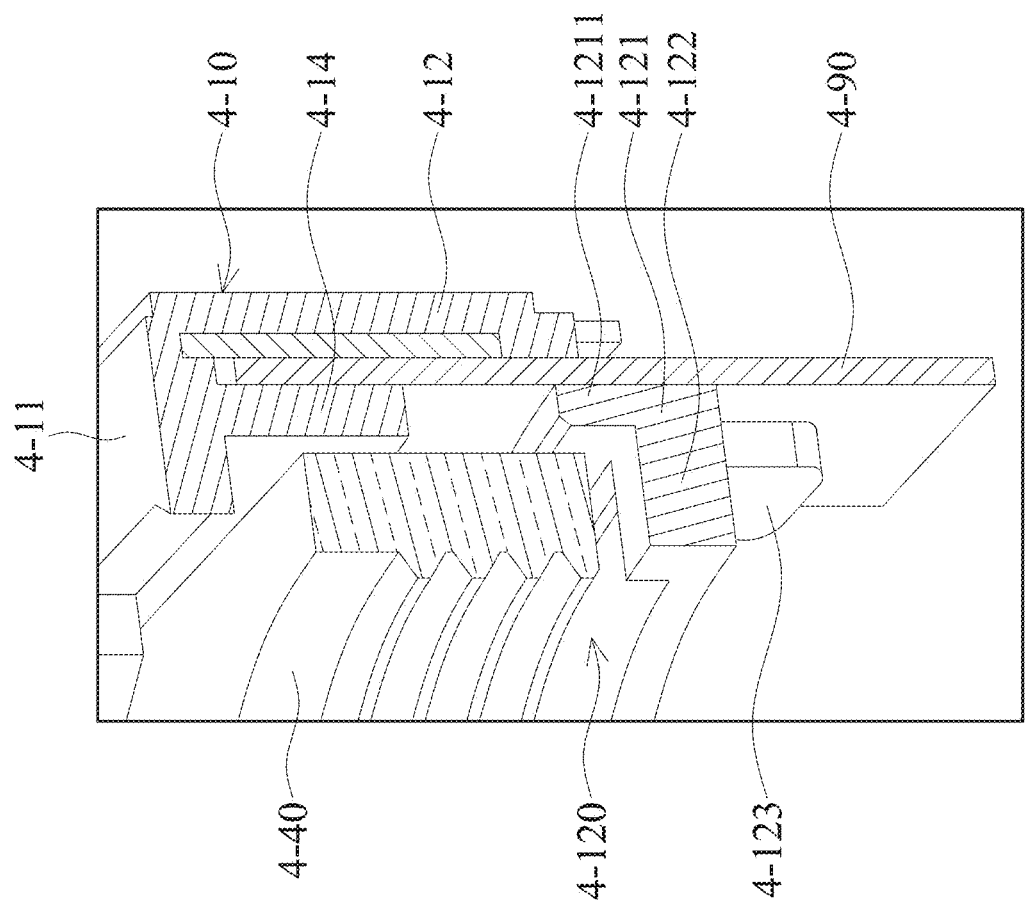
FIG. 39 is a cross-sectional view of part of the optical element drive mechanism along line 4-A-4-A' in FIG. 25.

FIG. 39 is a cross-sectional view of part of the optical element drive mechanism 4-1 along line 4-A-4-A' in FIG. 25. Although the holder 4-40 is elastically held by the first elastic element 4-30 and the second elastic element 4-100, the gravity and the external force may still cause the holder 4-40 to vibrate and collide with the bottom 4-120. The bottom 4-120 includes a first stop assembly 4-121 and a second stop assembly for restricting the range of movement of the holder 4-40 relative to the bottom 4-120. In detail, the first stop assembly 4-121 extends in a direction that is parallel with the main axis 4-M for restricting the range of movement of the holder 4-40 relative to the bottom 4-120 in the direction that is parallel with the main axis 4-M. The second stop assembly 4-122 extends in a direction that is perpendicular to the main axis 4-M for restricting the range of movement of the holder 4-40 relative to the bottom 4-120 in the direction that is perpendicular to the main axis 4-M.

Additionally, the bottom 4-120 may further include a third stop assembly (not shown) on the side where the first stop assembly 4-121 is located when viewed from the main axis 4-M. The third stop assembly is spaced apart from the first assembly 4-121. Similarly, the third stop assembly is used to restrict the range of movement of the holder 4-40 relative to the bottom 4-120.

The first stop assembly 4-121 includes a projecting portion 4-1211. The projecting portion 4-1211 extends toward the top wall 4-11 of the case 4-10 and is adjacent to the sidewalls 4-12 of the case 4-10. The sidewalls 4-12 are at least partially overlap the projecting portion 4-1211 when viewed from a direction that is perpendicular to the main axis 4-M.

The circuit assembly 4-90 is received in the receiving structure 4-14 and is located between one of the sidewalls 4-12 and the projecting portion 4-1211. It should be noted that, the adhesion element 4-140 (not shown in FIG. 39) may be applied between the projecting portion 4-1211 and the circuit assembly 4-90 or between the projecting portion 4-1211 and the sidewall 4-12 of the case 4-10 to further affix the circuit assembly 4-90.

The bottom 4-120 further includes a support structure 4-123 in contact with the circuit assembly 4-90. The support structure 4-123 extends toward a direction that is far away from the top wall 4-11 of the case 4-10. The farther away from the top wall 4-11 of the case 4-10, the less the width of the support structure 4-123 in the main axis 4-M is. However, the shape of the support structure 4-123 is not limited thereto. The projecting portion 4-1211 and the support structure 4-123 are disposed on the same side of the bottom 4-120. Also, the projecting portion 4-1211 at least partially overlaps the support structure 4-123 when viewed from the main axis 4-M. Additionally, the projecting portion 4-1211 and the support structure 4-123 are disposed on different sides of the bottom 4-120 when viewed from a direction that is perpendicular to the main axis 4-M.

The circuit assembly 4-90 may be a FPC and thus is bendable or flexural. The support structure 4-123 may support the circuit assembly 4-90 and prevent the circuit assembly 4-90 from deformation. There may be more than one support structure 4-123. The support structure 4-123 at least partially overlaps the circuit assembly 4-90 when viewed from a direction that is perpendicular to the main axis 4-M.

Figure 40:
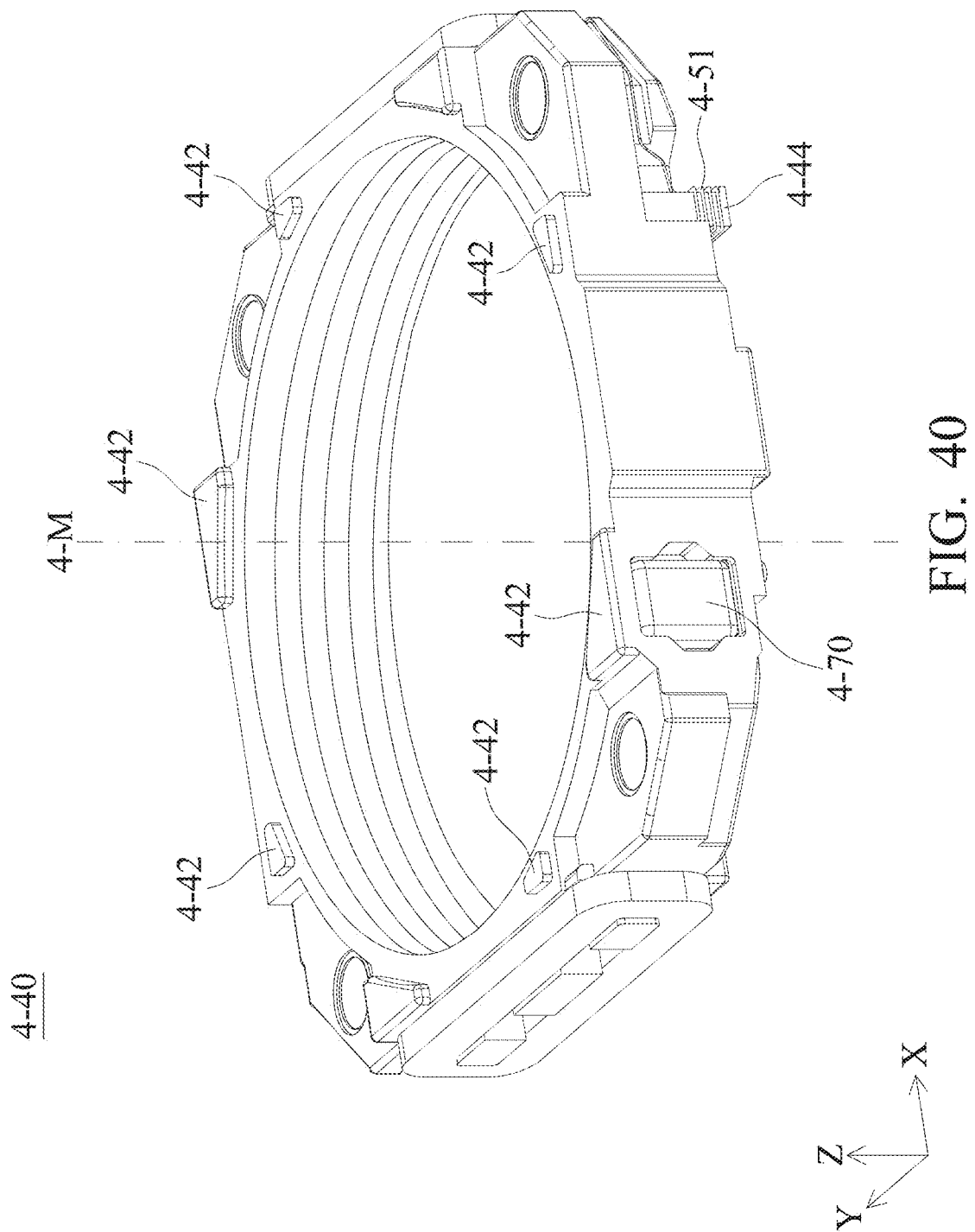
FIG. 40 and FIG. 41 are perspective views of a holder from different perspectives.
Figure 41:
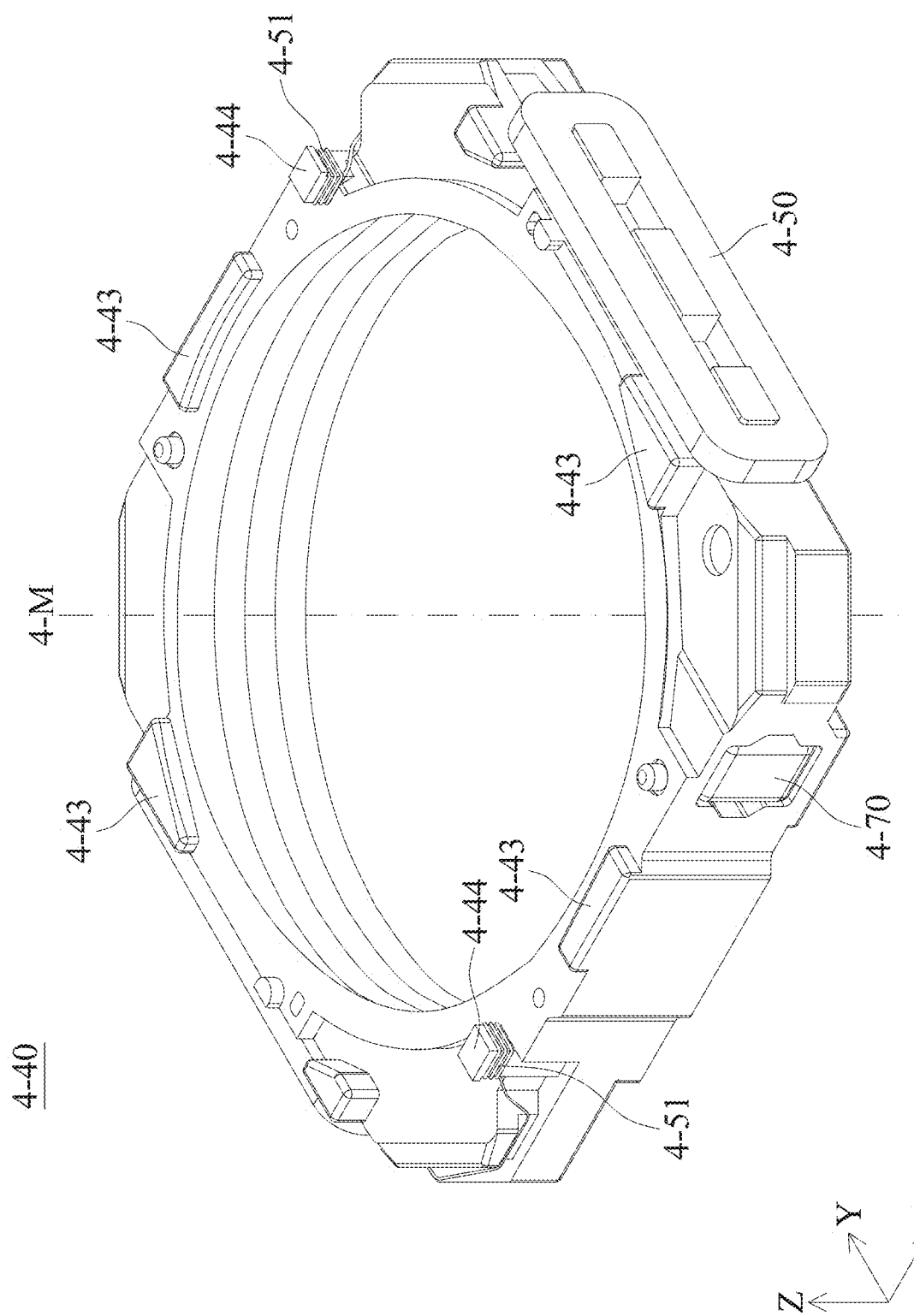

FIG. 40 and FIG. 41 are perspective views of the holder 4-40 from different perspectives. The holder 4-40 includes a plurality of upper stop portions 4-42, a plurality of lower stop portions 4-43, and two electrical connection portions 4-44. The upper stop portions 4-42 and the lower stop portions 4-43 are located on different sides of the holder 4-40 when viewed from a direction that is perpendicular to the main axis 4-M. In detail, the upper stop portions 4-42 are close to the position where the light enters than the lower stop portions 4-43. The upper stop portions 4-42 and the lower stop portions 4-43 may restrict the range of movement of the holder 4-40 relative to the case 4-10 and the bottom 4-120, respectively. The upper stop portions 4-42 correspond to part of the top wall 4-11 of the case 4-10 while the lower stop portions 4-42 correspond to the second stop assembly 4-122 of the bottom 4-120. Yet, the top wall 4-11 of the case 4-10 may also include structures similar to the second stop assembly 4-122 to correspond to the upper stop portions 4-42.

When the drive assembly 4-D drives the holder 4-40 to move and the holder 4-40 reaches the limit, the upper stop portions 4-42 may be in contact with the top wall 4-11 of the case 4-10 or the lower stop portions 4-43 may be in contact with the second stop assembly 4-122 of the bottom 4-120. Therefore, the rest portions of the holder 4-40 are not in contact with the case 4-10 or the bottom 4-120, thereby preventing the rest portions of the holder 4-40 from colliding with the case 4-10 or the bottom 4-120.

As described above, the upper stop portions 4-42 and the lower stop portions 4-43, the first stop assembly 4-121, and the second stop assembly 4-122 may prevent the holder 4-40 and the optical element 4-2 therein from damage because of collision with the case 4-10 or the bottom 4-120. Additionally, the number and the positions of the upper stop portions 4-42, the lower stop portions 4-43, the first stop assembly 4-121, and the second stop assembly 4-122 may be adjusted according to the actual requirements. For example, to effectively distribute collision force and enhance the stability of the optical element drive mechanism 4-1, there may be more than three upper stop portions 4-42, more than three lower stop portions 4-43, more than three first stop assemblies 4-121, and more than three second stop assemblies 4-122.

The electrical connection portions 4-44 are used to be electrically connected to the coils 4-50 of the drive assembly 4-D. The two coils 4-50 are located on opposite sides of the holder 4-40. Also, the two electrical connection portions 4-44 are located on opposite sides of the holder 4-40. Each of the coils 4-50 includes a lead 4-51. The lead 4-51 extends from the coil 4-50 and winds around the electrical connection portions 4-44. Each of the coils 4-50 may be electrically connected to other elements by methods such as welding Tin on the electrical connection portions 4-44. The lower stop portions 4-43 and the electrical connection portions 4-44 are located on the same side of the holder 4-40 when viewed from a direction that is perpendicular to the main axis 4-M. Also, the lower stop portions 4-43 at least partially overlap the electrical connection portions 4-44 when viewed from a direction that is perpendicular to the main axis 4-M.

It should be noted that, as shown in FIG. 40, the reference element 4-70 received by the holder 4-40 is located beneath one of the upper stop portions 4-42. The upper stop portion 4-42 at least partially overlaps the reference element 4-70 when viewed from the main axis 4-M. In this way, there is no need to reserve space on the holder 4-40 for receiving the reference element 4-70, thereby reducing the thickness of the holder 4-40 in the main axis 4-M.

Figure 42:
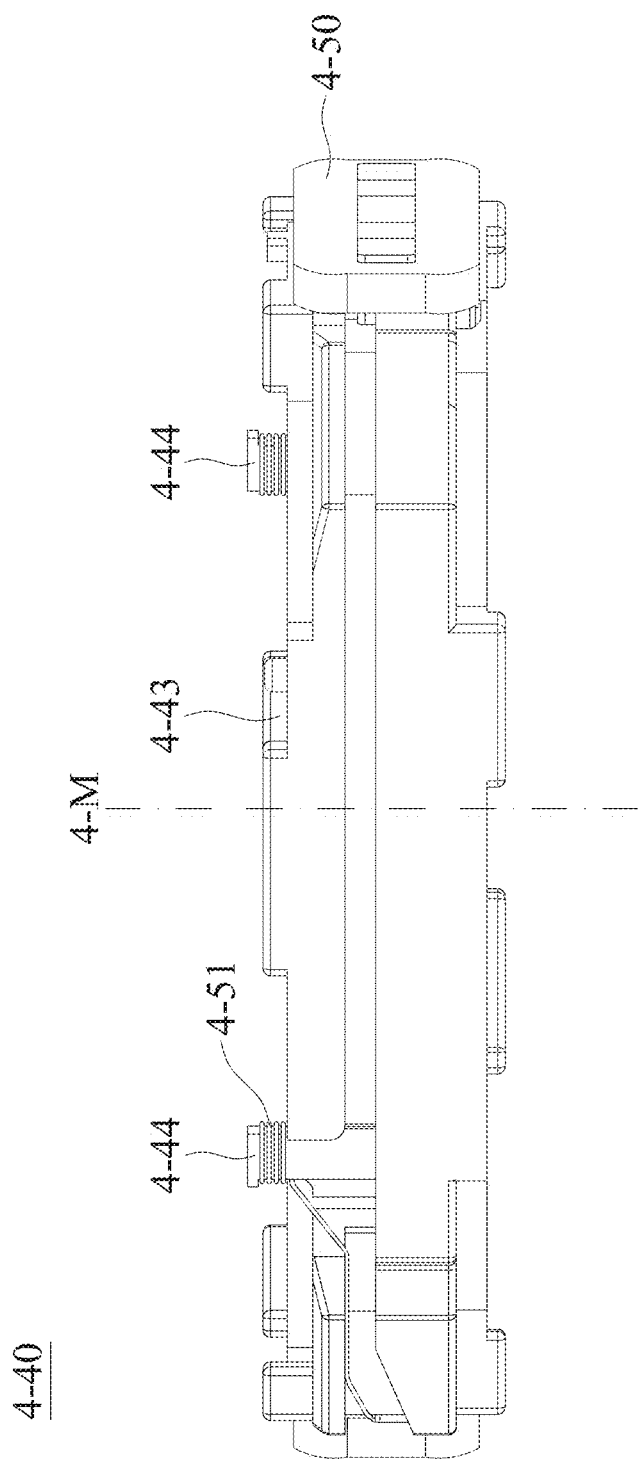
FIG. 42 is a side view of the holder.
Figure 43:
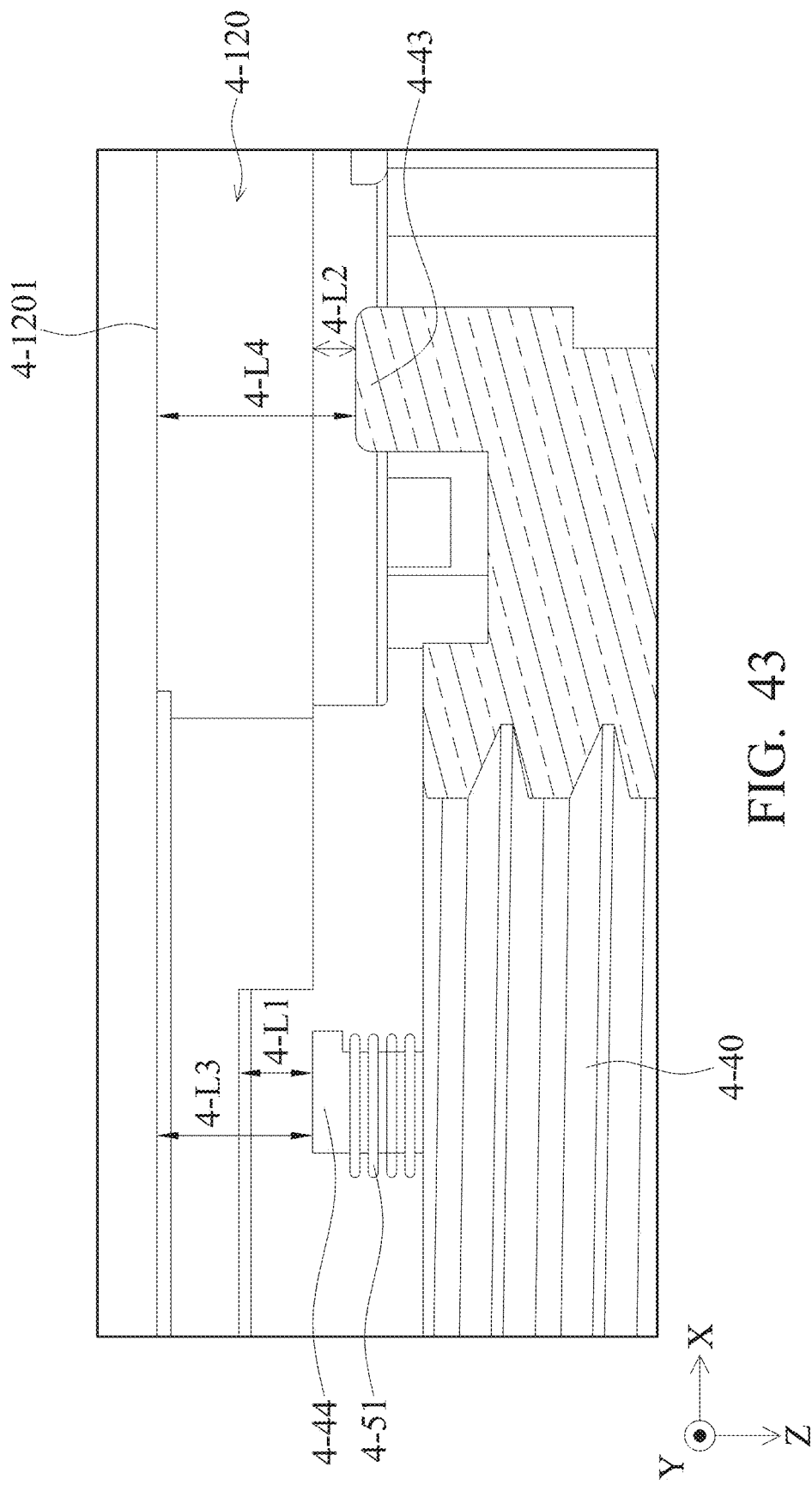
FIG. 43 is a schematic view of part of the holder and part of the bottom.

FIG. 42 is a side view of the holder 4-40. FIG. 43 is a schematic view of part of the holder 4-40 and part of the bottom 4-120. As shown in FIG. 42, the electrical connection portions 4-44 are more protruding than the lower stopping portions 4-43, so that the lead 4-51 may wind around the electrical connection portions 4-44 with more turns, thereby preventing the coils 4-50 from poor contact with other elements (e.g. the second elastic element 4-100). However, the electrical connection portions 4-44 should be prevented from colliding with other elements. Because of the configuration of the second stop assembly 4-122 on the bottom 4-120, when the holder 4-40 moves and reaches the limit, the lower stop portions 4-43 are in contact with the second stop assembly 4-122, which ensures that the electrical connection portions 4-44 are not in contact with the bottom 4-120.

The bottom 4-120 includes a bottom surface 4-1201. The bottom surface 4-1201 is the surface of the bottom 4-120 that is farthest away from the holder 4-40 in the main axis 4-M. As shown in FIG. 43, the minimum distance 4-L1 between any of the electrical connection portions 4-44 and the bottom 4-120 is greater than the minimum distance 4-L2 between any of the lower stop portions 4-43 and the bottom 4-120. However, the minimum distance 4-L3 between any of the electrical connection portions 4-44 and the bottom surface 4-1201 of the bottom 4-120 is less than the minimum distance 4-L4 between any of the lower stop portions 4-43 and the bottom surface 4-1201 of the bottom 4-120.

Figure 44:
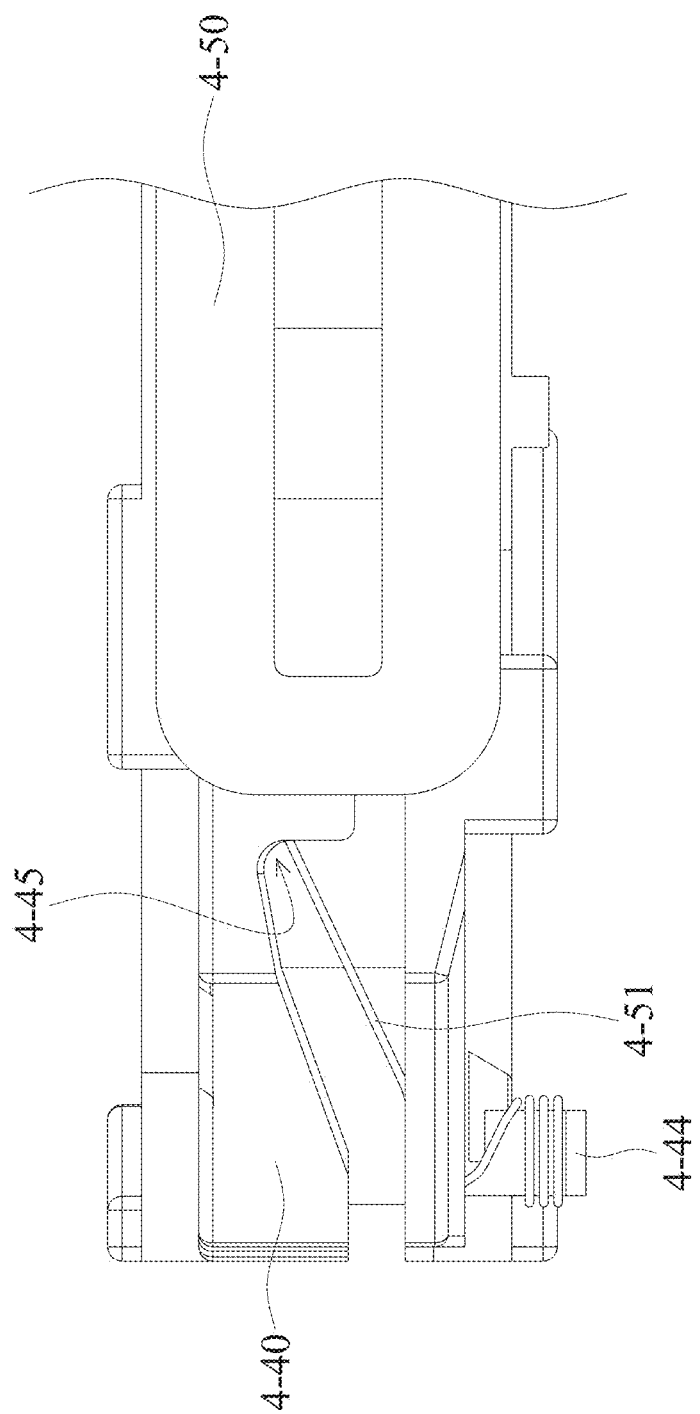
FIG. 44 is a schematic view of a guidance structure.

The holder 40 includes a guidance structure 4-45. FIG. 44 is a schematic view of the guidance structure 4-45. The guidance structure 4-45 is adjacent to one of the coils 4-50 of the drive assembly 4-D. Additionally, the guidance structure 4-45 includes a concaved portion. The coil 4-50 does not overlap the guidance structure 4-45 when viewed from a direction that is perpendicular to the main axis 4-M except for the lead 4-51. The lead 4-51 extends from the coil 4-50, passes through the guidance structure 4-45, and connects to one of the electrical connections portion 44. The guidance structure 4-45 may protect the lead 4-51 and prevent the lead 4-51 from damage. Furthermore, although the optical element drive mechanism 4-1 includes two coils 4-50, the two leads 51 extend from the upper half and the lower half of the coils 4-50, respectively. Only the lead 4-51 extends from the upper half of the coil 4-50 need the guidance structure 4-45.

As described above, an optical element drive mechanism is provided. When the case is made of a non-metal material, the electromagnetic wave interference is reduced. Also, there is special design on the case to correspond to other elements such as the drive assembly, the circuit assembly, etc. Additionally, the strengthening element may be provided to strengthen the structure. The case, the holder, and the bottom may include portions to restrict the range of movement of the holder to prevent the movable part from colliding with the immovable part. The drive assembly is protected by the guidance structure.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical member driving mechanism, having a main axis, comprising:

a fixed portion comprising a housing and a base, wherein a rectangular structure surrounding the main axis is formed by the housing and the base, and the housing covers a plurality of edges of the base;

a movable portion for connecting an optical member, movable relative to the fixed portion;

a driving assembly driving the movable portion to move relative to the fixed portion, wherein the driving assembly has a plurality of magnetic elements affixed to the housing;

a circuit assembly disposed in the fixed portion and electrically connected to the driving assembly, a first elastic element disposed between a top surface of the housing and the movable portion along the main axis, wherein the movable portion is connected to the housing through the first elastic element; and a second elastic element disposed between the movable portion and the base along the main axis, wherein the movable portion is connected to the base through the second elastic element, wherein the housing comprises a plurality of sidewalls connected to the top surface, the top surface is perpendicular to the main axis and covers the movable portion in a direction parallel to the main axis, and a portion of the circuit assembly is embedded inside one of the sidewalls of the housing, wherein the sidewalls are integrally formed with the top surface, the top surface has an opening and a plurality of recesses extending from an edge of the opening; and wherein a plurality of glue holes are formed in the first elastic element, the recesses expose the glue holes from the top surface and have a shape corresponding to a shape of the glue holes, wherein when viewed along the main axis, the housing and the glue holes do not overlap, wherein when viewed along the main axis, the first elastic element is disposed between the magnetic elements and the top surface of the housing, and contacts the driving assembly and the sidewalls.

2. The optical member driving mechanism as claimed in claim 1, wherein the sidewalls of the housing are not parallel to the top surface.

3. The optical member driving mechanism as claimed in claim 1, wherein the circuit assembly is disposed in at least one corner of the rectangular structure.

4. The optical member driving mechanism as claimed in claim 1, wherein when viewed along the main axis, the sidewalls of the housing and the second elastic element overlap.

5. The optical member driving mechanism as claimed in claim 4, wherein when viewed along the main axis, the second elastic element is exposed from the base.

6. The optical member driving mechanism as claimed in claim 4, wherein the housing further has a positioning column extending toward the base in the direction parallel to the main axis, and the second elastic element corresponds to the positioning column.

7. The optical member driving mechanism as claimed in claim 6, wherein when viewed along a direction perpendicular to the main axis, the base and the positioning column overlap.

8. The optical member driving mechanism as claimed in claim 1, wherein the movable portion comprises a holder for holding the optical member, the holder has a wiring column extending toward the base in the direction parallel to the main axis, the base has another recess, and when viewed along the main axis, the recess of the base and the wiring column overlap.

9. The optical member driving mechanism as claimed in claim 8, wherein the base has a stopper portion extending toward the housing in the direction parallel to the main axis, and when viewed along the main axis, the stopper portion and the wiring column are located on the same side of the rectangular structure.

10. The optical member driving mechanism as claimed in claim 8, wherein a protruding portion is disposed on one of the sidewalls of the housing and protrudes toward the holder, the holder has a recessed portion, and the protruding portion is accommodated in the recessed portion.

11. The optical member driving mechanism as claimed in claim 10, wherein when viewed along the main axis, the protruding portion protrudes inward from a sidewall of the housing.

12. The optical member driving mechanism as claimed in claim 1, wherein the driving assembly comprises a magnetic element and a driving coil, the magnetic element or the driving coil is disposed on the fixed portion, and the other of the magnetic element or the driving coil is disposed on the movable portion.

13. The optical member driving mechanism as claimed in claim 1, further comprising a sensing assembly detecting the movement of the movable portion relative to the fixed portion, wherein the driving assembly is disposed at a corner of the rectangular structure, the sensing assembly is disposed at another corner of the rectangular structure, and the corner and the another corner are different corners of the rectangular structure.

14. The optical member driving mechanism as claimed in claim 13, wherein the circuit assembly further comprises:

a driving assembly connector embedded in the base and electrically connected to the driving assembly; and a sensing assembly connector embedded in the housing and electrically connected to the sensing assembly.

15. The optical member driving mechanism as claimed in claim 1, wherein when viewed along the main axis, the rectangular structure has a first side and a second side, the second side is opposite the first side, and the shortest distance between the opening and the first side is greater than the shortest distance between the opening and the second side.

16. The optical member driving mechanism as claimed in claim 15, wherein an exposed portion of the circuit assembly is disposed on the first side of the rectangular structure.

17. The optical member driving mechanism as claimed in claim 15, wherein the glue holes are located on two sides of the rectangular structure, and when viewed along the main axis, the sides are perpendicular to the first side and the second side.

18. The optical member driving mechanism as claimed in claim 17, wherein the first elastic element further comprises a plurality of strings, and at least two of the strings extend to one of the glue holes.

\* \* \* \* \*